US012649074B2

(12) United States Patent
Archer et al.

(10) Patent No.: US 12,649,074 B2
(45) **Date of Patent: *Jun. 9, 2026**

(54) ELECTRIFIED FIRE FIGHTING VEHICLE

(71) Applicant: Oshkosh Corporation, Oshkosh, WI (US)

(72) Inventors: David Archer, Hortonville, WI (US); Eric Linsmeier, Larson, WI (US)

(73) Assignee: Oshkosh Corporation, Oshkosh, WI (US)

( * ) Notice: Subject to any disclaimer, the term of this patent is extended or adjusted under 35 U.S.C. 154(b) by 287 days.

This patent is subject to a terminal disclaimer.

(21) Appl. No.: 18/501,214

(22) Filed: Nov. 3, 2023

(65) Prior Publication Data

US 2024/0149089 A1 May 9, 2024

Related U.S. Application Data

(60) Provisional application No. 63/422,718, filed on Nov. 4, 2022, provisional application No. 63/422,773, filed on Nov. 4, 2022, provisional application No. 63/422,760, filed on Nov. 4, 2022, provisional application No. 63/422,788, filed on Nov. 4, 2022, provisional application No. 63/422,751, filed on Nov.

(Continued)

(51) Int. Cl.
*A62C 27/00* (2006.01)
*E06C 5/04* (2006.01)

(52) U.S. Cl.
CPC ................ *A62C 27/00* (2013.01); *E06C 5/04* (2013.01)

(58) Field of Classification Search
CPC ......... A62C 27/00; A62C 31/24; A62C 31/28; E06C 5/04; E06C 5/32; B60L 50/60; B60L 50/64; B60L 50/66; B60L 2200/40; B60K 6/28; B60K 2001/0405; B60K 2001/0438; B60Y 2400/112; H01M 50/204; H01M 50/249; H01M 50/271; H01M 50/298; B60R 16/0207; B60R 16/0215; B60R 16/0238
See application file for complete search history.

(56) References Cited

U.S. PATENT DOCUMENTS 1,217,702 A 2/1917 Bulley
1,953,390 A * 4/1934 Bosch ....................... E06C 5/04 182/216

(Continued)

FOREIGN PATENT DOCUMENTS

CN 106730529 A * 5/2017 ............ A62C 33/00
CN 109364406 A * 2/2019 ............ A62C 27/00

(Continued)

*Primary Examiner* — Darren W Gorman
(74) *Attorney, Agent, or Firm* — Foley & Lardner LLP

(57) ABSTRACT

An electrified fire fighting vehicle includes a chassis, a cab coupled to the chassis, a body coupled to the chassis rearward of the cab, an aerial ladder, an energy storage system positioned between the cab and the body, and a ladder support. The energy storage system includes a rack and a battery pack. The rack is coupled to and extends upward from the chassis. The rack defines an interior chamber. The battery pack is positioned within the interior chamber. The ladder support is positioned above the rack. The ladder support is configured to engage with the aerial ladder when the aerial ladder is in a stowed orientation.

19 Claims, 72 Drawing Sheets

Related U.S. Application Data 4, 2022, provisional application No. 63/422,833, filed on Nov. 4, 2022.

(56) References Cited

U.S. PATENT DOCUMENTS 3,346,052 A * 10/1967 Moore .................. A62C 31/24 239/281
3,605,943 A * 9/1971 Beaudet .................... E06C 5/04 182/127
3,675,721 A * 7/1972 Davidson ............. F16L 27/125 239/165
3,789,869 A * 2/1974 Morris ................. B66C 23/701 D12/13
4,317,504 A * 3/1982 Artaud ...................... E06C 5/04 182/66.2
4,970,351 A 11/1990 Kirlin
5,392,873 A 2/1995 Masuyama et al.
6,092,911 A * 7/2000 Baker, III ............. A62C 27/00 362/543
6,094,927 A 8/2000 Anazawa et al.
6,127,805 A 10/2000 Kikuchi et al.
6,229,446 B1 5/2001 Lloyd-Jones et al.
6,411,063 B1 6/2002 Kouzu et al.
6,583,599 B1 6/2003 Phillips et al.
7,661,370 B2 2/2010 Pike et al.
8,862,296 B2 10/2014 Kurakawa et al.
8,925,640 B2 1/2015 Mccoige
9,327,600 B1 5/2016 Nehmeh
9,460,862 B2 10/2016 Kobayashi et al.
9,515,359 B2 12/2016 Taniyama et al.
9,523,237 B2 * 12/2016 Lauterjung ............... E06C 5/32
10,020,470 B2 7/2018 Ito et al.
10,086,705 B2 10/2018 Chow
10,112,488 B2 10/2018 Kobayashi
10,456,610 B1 10/2019 Betz et al.
10,573,863 B2 2/2020 Sweazey et al.
10,756,401 B2 8/2020 Inoue et al.
11,345,331 B2 5/2022 Mckibben et al.
12,154,705 B2 11/2024 Maruchi
2003/0230412 A1 12/2003 Archer
2003/0230863 A1 12/2003 Archer
2004/0002794 A1 1/2004 Pillar et al.
2004/0039510 A1 2/2004 Archer et al.
2004/0199302 A1 10/2004 Pillar et al.
2005/0001400 A1 1/2005 Archer et al.
2005/0199402 A1 9/2005 Moses
2005/0234622 A1 10/2005 Pillar et al.
2005/0264427 A1 12/2005 Zeng et al.
2006/0021764 A1 2/2006 Archer et al.
2006/0022001 A1 2/2006 Linsmeier et al.
2006/0032701 A1 2/2006 Linsmeier et al.
2006/0032702 A1 2/2006 Linsmeier et al.
2006/0037760 A1 2/2006 Froland et al.
2006/0065411 A1 3/2006 Linsmeier et al.
2006/0071466 A1 4/2006 Rowe et al.
2006/0086566 A1 4/2006 Linsmeier et al.
2006/0180322 A1 8/2006 Archer et al.
2008/0114513 A1 5/2008 Pillar et al.
2009/0033044 A1 2/2009 Linsmeier
2009/0129044 A1 5/2009 Tsuchiya et al.
2009/0167078 A1 7/2009 Watanabe
2010/0138089 A1 6/2010 James
2011/0256431 A1 10/2011 Tenhouten et al.
2011/0259614 A1 10/2011 Ver Steeg et al.
2012/0056474 A1 3/2012 Larson et al.
2012/0193109 A1 8/2012 Moore et al.
2013/0096744 A1 4/2013 Sah et al.
2014/0012450 A1 1/2014 Laing
2014/0042806 A1 2/2014 Gless
2014/0246265 A1 9/2014 Archer et al.
2014/0262355 A1 9/2014 Linsmeier
2014/0306563 A1 10/2014 Oyama et al.
2015/0061594 A1 3/2015 Anders et al.
2015/0084412 A1 3/2015 Matano et al.
2015/0114711 A1 4/2015 Dew et al.
2015/0217707 A1 8/2015 Tanigaki et al.
2015/0239474 A1 8/2015 Nakamura
2015/0330146 A1 * 11/2015 Kraemer .................. E06C 5/38 182/18
2015/0345220 A1 * 12/2015 Speck ....................... E06C 5/04 182/67.4
2016/0023652 A1 1/2016 Soo et al.
2016/0144211 A1 5/2016 Betz et al.
2016/0145941 A1 5/2016 Betz et al.
2016/0176306 A1 6/2016 Outwater et al.
2016/0304051 A1 10/2016 Archer et al.
2017/0036628 A1 2/2017 Nelson et al.
2017/0050063 A1 2/2017 Shively et al.
2017/0072813 A1 3/2017 Martin et al.
2017/0136864 A1 5/2017 Ito et al.
2018/0006545 A1 1/2018 Fullmer et al.
2018/0017611 A1 1/2018 Radun et al.
2018/0086192 A1 3/2018 Ishihara et al.
2018/0162377 A1 6/2018 Colavincenzo
2018/0201246 A1 7/2018 Kashiwai et al.
2018/0215354 A1 8/2018 Linsmeier et al.
2018/0215597 A1 8/2018 Linsmeier et al.
2018/0221694 A1 8/2018 Shively et al.
2018/0221697 A1 8/2018 Shively et al.
2018/0222484 A1 8/2018 Shively et al.
2018/0289999 A1 10/2018 Kay et al.
2018/0293818 A1 10/2018 Linsmeier et al.
2018/0297597 A1 10/2018 Linsmeier et al.
2018/0370522 A1 12/2018 Collins et al.
2018/0370523 A1 12/2018 Geller et al.
2019/0015692 A1 * 1/2019 Fieber .................... A62C 5/002
2019/0016219 A1 1/2019 Groãÿet al.
2019/0054828 A1 2/2019 Doi
2019/0071190 A1 3/2019 Nestel et al.
2019/0106083 A1 4/2019 Archer et al.
2019/0157858 A1 5/2019 Patel et al.
2019/0232895 A1 8/2019 Yamada et al.
2019/0262643 A1 8/2019 Shively et al.
2019/0262646 A1 8/2019 Linsmeier et al.
2019/0263408 A1 8/2019 Linsmeier et al.
2019/0359184 A1 11/2019 Linsmeier et al.
2019/0359460 A1 11/2019 Linsmeier et al.
2020/0017097 A1 1/2020 Money et al.
2020/0038700 A1 2/2020 Betz et al.
2020/0039804 A1 2/2020 Betz et al.
2020/0047013 A1 2/2020 Betz et al.
2020/0056426 A1 2/2020 Betz et al.
2020/0056735 A1 2/2020 Scott
2020/0102145 A1 4/2020 Nelson et al.
2020/0108285 A1 4/2020 Kay et al.
2020/0130653 A1 4/2020 Betz et al.
2020/0231131 A1 7/2020 Archer et al.
2020/0238115 A1 7/2020 Linsmeier et al.
2020/0262328 A1 8/2020 Nelson et al.
2020/0279444 A1 9/2020 Linsmeier et al.
2020/0348764 A1 11/2020 Clifton et al.
2020/0360752 A1 11/2020 Shively et al.
2021/0023406 A1 1/2021 Shively et al.
2021/0106856 A1 4/2021 Shively et al.
2021/0107361 A1 4/2021 Linsmeier et al.
2021/0107446 A1 4/2021 Shively et al.
2021/0107483 A1 4/2021 Shively et al.
2021/0139237 A1 5/2021 Nelson et al.
2021/0143377 A1 5/2021 Probert et al.
2021/0178206 A1 6/2021 Betz et al.
2021/0196998 A1 7/2021 Shively et al.
2021/0206372 A1 7/2021 Shively et al.
2021/0229628 A1 7/2021 Archer et al.
2021/0244982 A1 8/2021 Betz et al.
2021/0245604 A1 8/2021 Murakami
2021/0248891 A1 8/2021 Klapper
2021/0253102 A1 8/2021 Linsmeier et al.
2021/0339065 A1 11/2021 Linsmeier et al.
2021/0362664 A1 11/2021 Yang et al.
2022/0009761 A1 1/2022 Archer et al.
2022/0017048 A1 1/2022 Betz et al.
2022/0024425 A1 1/2022 Linsmeier et al.
2022/0063738 A1 3/2022 Nelson et al.

(56) References Cited

U.S. PATENT DOCUMENTS

2022/0072736 A1 3/2022 Steffens et al.
2022/0074417 A1 3/2022 Linsmeier et al.
2022/0080944 A1 3/2022 Linsmeier et al.
2022/0097527 A1 3/2022 Koga et al.
2022/0097961 A1 3/2022 Koga et al.
2022/0097964 A1 3/2022 Koga et al.
2022/0111717 A1 4/2022 Hendriks et al.
2022/0112060 A1 4/2022 Archer et al.
2022/0112061 A1 4/2022 Archer et al.
2022/0161998 A1 5/2022 Turner et al.
2022/0169126 A1* 6/2022 Borghi .................. B62D 21/09
2022/0177055 A1 6/2022 Archer
2022/0185582 A1 6/2022 Koga et al.
2022/0193473 A1 6/2022 Kay et al.
2022/0242713 A1 8/2022 Betz et al.
2022/0260193 A1 8/2022 Scott
2022/0274494 A1 9/2022 Mckibben et al.
2022/0309844 A1 9/2022 Linsmeier et al.
2022/0324643 A1 10/2022 Giere et al.
2022/0355140 A1 11/2022 Linsmeier et al.
2022/0355141 A1 11/2022 Linsmeier et al.
2022/0355142 A1 11/2022 Linsmeier et al.
2022/0355690 A1 11/2022 Linsmeier et al.
2022/0371820 A1 11/2022 Nelson et al.
2022/0379892 A1 12/2022 Archer et al.
2022/0382388 A1 12/2022 Clifton et al.
2023/0024953 A1 1/2023 Shively et al.
2023/0040276 A1 2/2023 Shively et al.
2023/0089417 A1 3/2023 Koga et al.
2023/0092133 A1 3/2023 Shively et al.
2023/0141456 A1 5/2023 Archer et al.
2023/0149754 A1 5/2023 Linsmeier et al.
2023/0150387 A1 5/2023 Nakamura
2023/0159104 A1 5/2023 Archer
2023/0166144 A1 6/2023 Linsmeier et al.
2023/0226394 A1 7/2023 Betz et al.
2023/0227040 A1 7/2023 Linsmeier et al.
2023/0234498 A1 7/2023 Linsmeier
2023/0241968 A1 8/2023 Linsmeier et al.
2023/0249665 A1 8/2023 Shively et al.
2023/0278531 A1 9/2023 Betz et al.
2023/0294915 A1 9/2023 Koga et al.
2023/0303321 A1 9/2023 Koga et al.
2023/0315219 A1 10/2023 Clifton et al.
2023/0327277 A1 10/2023 Lee et al.
2023/0356936 A1 11/2023 Giere et al.
2023/0356941 A1 11/2023 Wente et al.
2023/0378852 A1 11/2023 Holland et al.
2023/0398387 A1 12/2023 Laskaris
2023/0415725 A1 12/2023 Shively et al.
2023/0416065 A1 12/2023 Betz et al.
2024/0001748 A1 1/2024 Vreede
2024/0001764 A1 1/2024 Koga et al.
2024/0149089 A1 5/2024 Archer et al.
2024/0149709 A1 5/2024 Archer et al.
2025/0214454 A1 7/2025 Verhagen
2025/0325856 A1 10/2025 Kay

FOREIGN PATENT DOCUMENTS

CN 109980838 A 7/2019
CN 111450453 A * 7/2020 ............. A62C 27/00
CN 112140908 A 12/2020
CN 212034865 U 12/2020
KR 100792915 B1 1/2008
WO WO-2023028636 A1 * 3/2023 ................ B60L 7/10

* cited by examiner

1020

| | Startability % (20% Target) | Speed on 6% Grade (mph) | Speed on 0.25% Grade (mph) | %Grade @ 50 mph | %Grade @ 20 mph | 0 - 35 mph Time (sec) |
|---|---|---|---|---|---|---|
| X12-500 | 82 | 49.7 | 74.9 | 5.9 | 18.6 | 9.6 |
| L9-450 | 44 | 43.8 | 70.4 | 5.1 | 14 | 11.1 |
| AXE100D 310kW 550 V Cont | 19.6 | 48.0 | 84.0 | 5.7 | 17.7 | 9.3 |
| AXE100D 310kW 550 V Peak | 40.3 | 48.0 | 88.0 | 5.7 | 17.7 | 8.7 |
| AXE100D Continuous | 41 | 53.7 | 86.6 | 6.8 | 20.7 | 9.0 |
| AXE100D Peak | 56 | 73.9 | 106 | 13.2 | 35.7 | 5.4* |

FIG. 34

| | Startability % (20% Target) | 0 - 35 mph Time (sec) | 0 - 65 mph Time (sec) |
|---|---|---|---|
| Enforcer X12-500 | 82 | 9.6 | 36 |
| Enforcer L9-450 | 44 | 11.1 | 44 |
| 14XE Continuous | 15 | 18.9 | 92.7 |
| 14XE Peak | 30 | 11.2 | 53.5 |

| | Startability % (20% Target) | 0 - 35 mph Time (sec) | 0 - 65 mph Time (sec) |
|---|---|---|---|
| Enforcer X12-500 | 82 | 9.6 | 36 |
| Enforcer L9-450 | 44 | 11.1 | 44 |
| Eaton MD + 250kW | 33 | 13.5 | 55 |

ELECTRIFIED FIRE FIGHTING VEHICLE

CROSS-REFERENCE TO RELATED PATENT APPLICATIONS

This application claims the benefit of and priority to (a) U.S. Provisional Patent Application No. 63/422,718, filed Nov. 4, 2022, (b) U.S. Provisional Patent Application No. 63/422,751, filed Nov. 4, 2022, (c) U.S. Provisional Patent Application No. 63/422,760, filed Nov. 4, 2022, (d) U.S. Provisional Patent Application No. 63/422,773, filed Nov. 4, 2022, (e) U.S. Provisional Patent Application No. 63/422,788, filed Nov. 4, 2022, and (f) U.S. Provisional Patent Application No. 63/422,833, filed Nov. 4, 2022, all of which are incorporated herein by reference in their entireties.

BACKGROUND

A fire fighting vehicle is a specialized vehicle designed to respond to fire scenes that can include various components to assist fire fighters with battling and extinguishing fires. Such components can include a pumping system, an onboard water tank, and an aerial ladder. Fire fighting vehicles traditionally include an internal combustion engine that provides power to both drive the vehicle and well as to drive the various components of the vehicle to facilitate the operation thereof.

SUMMARY

One embodiment relates to an electrified fire fighting vehicle. The electrified fire fighting vehicle includes a chassis, a cab coupled to the chassis, a body coupled to the chassis rearward of the cab, an aerial ladder, an energy storage system positioned between the cab and the body, and a ladder support. The energy storage system includes a rack and a battery pack. The rack is coupled to and extends upward from the chassis. The rack defines an interior chamber. The battery pack is positioned within the interior chamber. The ladder support is positioned above the rack. The ladder support is configured to engage with the aerial ladder when the aerial ladder is in a stowed orientation.

Another embodiment relates to an electrified fire fighting response vehicle. The electrified fire fighting vehicle includes a chassis, a cab coupled to the chassis, a body coupled to the chassis rearward of the cab, an electric motor coupled to the chassis, a torque box coupled to the chassis, an aerial ladder coupled to the torque box, and an energy storage system positioned between the cab and the body. The energy storage system includes a rack, a battery, a power distribution system, and a ladder support. The rack is coupled to and extends upward from the chassis. The rack defines an interior chamber. The battery pack is positioned within the interior chamber. The power distribution system is positioned within the interior chamber. The power distribution system is electrically coupled to the battery pack and the electric motor. The ladder support is coupled to an upper end of the rack. The ladder support is positioned to engage with the aerial ladder when the aerial ladder is in a stowed orientation. The ladder support includes a plurality of rollers.

Still another embodiment relates to an electrified fire fighting vehicle. The electrified fire fighting vehicle includes a chassis, a cab coupled to the chassis, a body coupled to the chassis rearward of the cab, an electric motor coupled to the chassis, a torque box coupled to the chassis, an aerial ladder coupled to the torque box, an energy storage system positioned between the cab and the body, and a ladder support. The energy storage system includes a rack, a first battery pack, a second battery pack, and a power distribution system. The rack is coupled to and extends upward from the chassis. The rack defines an interior chamber. The first battery pack is positioned within the interior chamber. The second battery pack is positioned within the interior chamber. The power distribution system is positioned within the interior chamber between the first battery pack and the second battery pack. The power distribution system is electrically coupled to the first battery pack, the second battery pack, and the electric motor. The ladder support is positioned above the rack. The ladder support is configured to engage with the aerial ladder when the aerial ladder is in a stowed orientation.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 34 is a table providing different properties of the fire fighting vehicle of FIG. 1 having the E-axle driveline of FIGS. 31-33, according to an exemplary embodiment.

DETAILED DESCRIPTION

Figure 1:
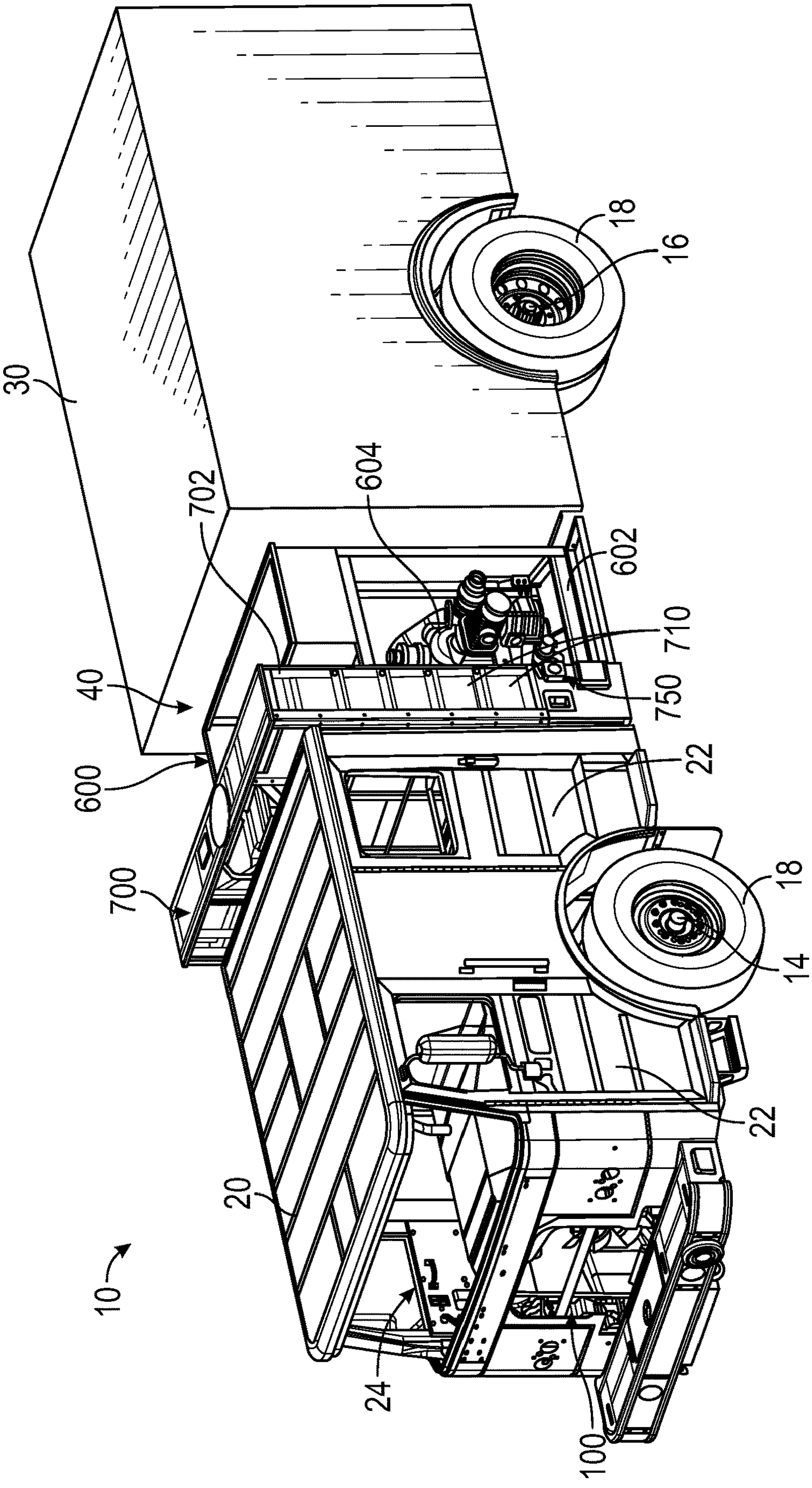
FIG. 1 is a front, left perspective view of a fire fighting vehicle, according to an exemplary embodiment.
Figure 2:
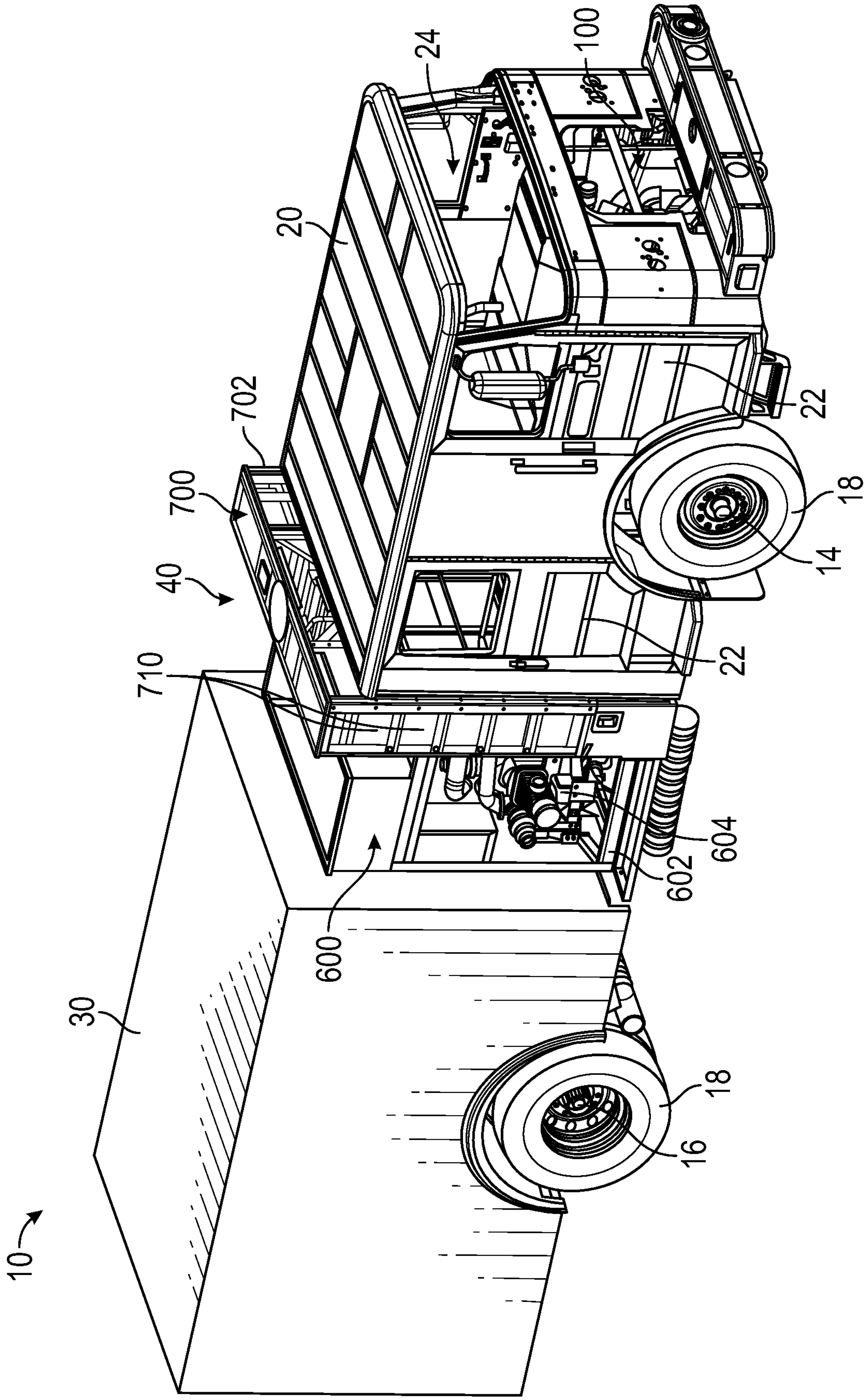
FIG. 2 is a front, right perspective view of the fire fighting vehicle of FIG. 1, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle (e.g., a fire fighting vehicle, etc.) of the present disclosure includes a front axle, a rear axle, and a driveline having an engine, an electromechanical transmission, an energy storage system, a clutched accessory drive positioned between the engine and the electromechanical transmission, a subsystem (e.g., a pump system, an aerial ladder assembly, etc.) coupled to the electromechanical transmission, and at least one of the front axle or the rear axle coupled to the electromechanical transmission. In one embodiment, the driveline is configured a non-hybrid or "dual drive" driveline where electromechanical transmission does not generate energy for storage by the energy storage system. Rather, the energy storage system is chargeable from an external power source and not chargeable using the electromechanical transmission. In such a dual drive configuration, (i) the engine may mechanically drive (a) the clutched accessory drive directly and/or (b) the subsystem, the front axle, and/or the rear axle through the electromechanical transmission, (ii) the electromechanical transmission may mechanically drive (a) the clutched accessory drive, (b) the subsystem, (c) the front axle, and/or (d) the rear axle using stored energy in the energy storage system, or (iii) the engine may mechanically drive (a) the clutched accessory drive and (b) the electromechanical transmission directly and the electromechanical transmission may (a) generate electricity and (b) use the generated electricity (and, optionally, the stored electricity) to mechanically drive the subsystem, the front axle, and/or the rear axle. In another embodiment, the driveline is configured as a "hybrid" driveline where the electromechanical transmission is driven by the engine and generates energy for storage by the energy storage system.

According to an exemplary embodiment, the driveline is designed, arranged, and packaged such that the vehicle looks and operates identical or substantially identical to a non-electrified predecessor of the vehicle (i.e., an internal combustion engine only driven predecessor). Maintaining the looks and controls between the vehicle and its predecessor allows for easier adaptation of electrified vehicles into consumer fleets by mitigating the need for operators to learn a new control interface for controlling the vehicle and learn a new component/compartment layout, which leads to increased consumer satisfaction and vehicle uptime.

According to an exemplary embodiment, the vehicle includes a control system that is configured to operate the driveline in a plurality of modes of operations. The plurality of modes of operation (depending on whether the driveline is a "dual drive" driveline, is a "hybrid" driveline," or operable as a "dual drive" and a "hybrid" driveline) can include a pure engine mode, a pure electric mode, a charging mode, an electric generation drive mode, a boost mode, a distributed drive mode, a roll-out mode, a roll-in mode, a stop-start mode, a location tracking mode, a scene mode, a pump-and-roll mode, and/or still other modes, as described in greater detail herein.

According to an exemplary embodiment, the vehicle includes a charging assembly configured to interface with a charging plug to facilitate coupling the energy storage system to an external power source (e.g., a high voltage power source, etc.). The charging assembly includes a charging port, a retainer, and a disconnect system. The charging port is configured to interface with (e.g., receive, etc.) a charging interface of the charging plug and the retainer is configured to interface with a retaining interface (e.g., a latch, etc.) of the plug to prevent inadvertent disengagement of the charging interface from the charging port. Such retention, however, can lead to instances where an operator forgets to disconnect the charging plug from the charging assembly and drives away, but the charging plug does not disconnect, potentially causing damage to the charging plug and/or the external power source, as well as potentially causing a high voltage output being exposed to the surrounding environment. In some embodiments, the disconnect system includes one or more actuators controllable by the control system to facilitate ejecting the charging plug under various circumstances. In some embodiments, the control system is configured to prevent the vehicle from starting and/or driving away if the charging plug is connected thereto. In some embodiments, the control system is configured to prepare the vehicle to respond to a scene by performing a start sequence and/or ejecting the charging plug without requiring operator input.

Overall Vehicle

According to the exemplary embodiment shown in FIGS. 1-6, a machine, shown vehicle 10, is configured as a fire fighting vehicle. In the embodiment shown, the fire fighting vehicle is a pumper fire truck. In another embodiment, the fire fighting vehicle is an aerial ladder truck. The aerial ladder truck may include a rear-mount aerial ladder or a mid-mount aerial ladder. In some embodiments, the aerial ladder truck is a quint fire truck. In other embodiments, the aerial ladder truck is a tiller fire truck. In still another embodiment, the fire fighting vehicle is an airport rescue fire fighting ("ARFF") truck. In various embodiments, the fire fighting vehicle (e.g., a quint, a tanker, an ARFF, etc.) includes an on-board water storage tank, an on-board agent storage tank, and/or a pumping system. In other embodiments, the fire fighting vehicle is still another type of fire fighting vehicle. In an alternative embodiment, the vehicle 10 is another type of vehicle other than a fire fighting vehicle. For example, the vehicle 10 may be a refuse truck, a concrete mixer truck, a military vehicle, a tow truck, an ambulance, a farming machine or vehicle, a construction machine or vehicle, and/or still another vehicle.

As shown in FIGS. 1-26, the vehicle 10 includes a chassis, shown as a frame 12; a plurality of axles, shown as front axle 14 and rear axle 16, supported by the frame 12 and that couple a plurality of tractive elements, shown as wheels 18, to the frame 12; a cab, shown as front cabin 20, supported by the frame 12; a body assembly, shown as a rear section 30, supported by the frame 12 and positioned rearward of the front cabin 20; and a driveline (e.g., a powertrain, a drivetrain, an accessory drive, etc.), shown as driveline 100. While shown as including a single front axle 14 and a single rear axle 16, in other embodiments, the vehicle 10 includes two front axles 14 and/or two rear axles 16. In an alternative embodiment, the tractive elements are otherwise structured (e.g., tracks, etc.).

According to an exemplary embodiment, the front cabin 20 includes a plurality of body panels coupled to a support (e.g., a structural frame assembly, etc.). The body panels may define a plurality of openings through which an operator accesses an interior 24 of the front cabin 20 (e.g., for ingress, for egress, to retrieve components from within, etc.). As shown in FIGS. 1, 2, 4, and 5, the front cabin 20 includes a plurality of doors, shown as doors 22, positioned over the plurality of openings defined by the plurality of body panels. The doors 22 may provide access to the interior 24 of the front cabin 20 for a driver and/or passengers of the vehicle 10. The doors 22 may be hinged, sliding, or bus-style folding doors.

The front cabin 20 may include components arranged in various configurations. Such configurations may vary based on the particular application of the vehicle 10, customer requirements, or still other factors. The front cabin 20 may be configured to contain or otherwise support a number of occupants, storage units, and/or equipment. For example, the front cabin 20 may provide seating for an operator (e.g., a driver, etc.) and/or one or more passengers of the vehicle 10. The front cabin 20 may include one or more storage areas for providing compartmental storage for various articles (e.g., supplies, instrumentation, equipment, etc.). The interior 24 of the front cabin 20 may further include a user interface (e.g., user interface 820, etc.). The user interface may include a cabin display and various controls (e.g., buttons, switches, knobs, levers, joysticks, etc.). In some embodiments, the user interface within the interior 24 of the front cabin 20 further includes touchscreens, a steering wheel, an accelerator pedal, and/or a brake pedal, among other components. The user interface may provide the operator with control capabilities over the vehicle 10 (e.g., direction of travel, speed, etc.), one or more components of driveline 100, and/or still other components of the vehicle 10 from within the front cabin 20.

In some embodiments, the rear section 30 includes a plurality of compartments with corresponding doors positioned along one or more sides (e.g., a left side, right side, etc.) and/or a rear of the rear section 30. The plurality of compartments may facilitate storing various equipment such as oxygen tanks, hoses, axes, extinguishers, ladders, chains, ropes, straps, boots, jackets, blankets, first-aid kits, and/or still other equipment. One or more of the plurality of compartments may include various storage apparatuses (e.g., shelving, hooks, racks, etc.) for storing and organizing the equipment.

In some embodiments (e.g., when the vehicle 10 is an aerial ladder truck, etc.), the rear section 30 includes an aerial ladder assembly. The aerial ladder assembly may have a fixed length or may have one or more extensible ladder sections. The aerial ladder assembly may include a basket or implement (e.g., a water turret, etc.) coupled to a distal or free end thereof. The aerial ladder assembly may be positioned proximate a rear of the rear section 30 (e.g., a rear-mount fire truck) or proximate a front of the rear section 30 (e.g., a mid-mount fire truck).

In some embodiments (e.g., when the vehicle 10 is an ARFF truck, a tanker truck, a quint truck, etc.), the rear section 30 includes one or more fluid tanks. By way of example, the one or more fluid tanks may include a water tank and/or an agent tank. The water tank and/or the agent tank may be corrosion and UV resistant polypropylene tanks. In a municipal fire truck implementation (i.e., a non-ARFF truck implementation), the water tank may have a maximum water capacity ranging between 50 and 1000 gallons (e.g., 50, 100, 150, 200, 250, 300, 350, 400, 450, 500, 550, 600, 650, 700, 750, 800, 850, 900, 950, 1000, etc. gallons). In an ARRF truck implementation, the water tank may have a maximum water capacity ranging between 1,000 and 4,500 gallons (e.g., at least 1,250 gallons; between 2,500 gallons and 3,500 gallons; at most 4,500 gallons; at most 3,000 gallons; at most 1,500 gallons; etc.). The agent tank may have a maximum agent capacity ranging between 25 and 750 gallons (e.g., 25, 50, 75, 100, 150, 200, 250, 300, 350, 400, 450, 500, 550, 600, 650, 700, 750, etc. gallons). According to an exemplary embodiment, the agent is a foam fire suppressant, an aqueous film forming foam ("AFFF"). A low-expansion foam, a medium-expansion foam, a high-expansion foam, an alcohol-resistant foam, a synthetic foam, a protein-based foams, a fluorine-free foam, a film-forming fluoro protein ("FFFP") foam, an alcohol resistant aqueous film forming foam ("AR-AFFF"), and/or still another suitable foam or a foam yet to be developed. The capacity of the water tank and/or the agent tank may be specified by a customer. It should be understood that water tank and the agent tank configurations are highly customizable, and the scope of the present disclosure is not limited to a particular size or configuration of the water tank and the agent tank.

Driveline

As shown in FIGS. 1-26, the driveline 100 includes an engine assembly, shown as engine system 200, coupled to the frame 12; a clutched transmission accessory drive ("TAD") including a first component, shown as clutch 300, coupled to the engine system 200 and a second component (e.g., an accessory module, etc.), shown as TAD 400, coupled to the clutch 300; an electromechanical transmission or electromechanical transmission device ("ETD"), shown as ETD 500, coupled to the TAD 400; one or more subsystems including a first subsystem, shown as pump system 600, coupled to the frame 12 and the ETD 500; and an on-board energy storage system ("ESS"), shown as ESS 700, coupled to the frame 12 and electrically coupled to the ETD 500. According to an exemplary embodiment, the engine system 200, the clutch 300, the ETD 500, and/or the ESS 700 are controllable to drive the vehicle 10, the TAD 400, the pump system 600, and/or other accessories or components of the vehicle 10 (e.g., an aerial ladder assembly, etc.).

In one embodiment, the driveline 100 is configured or selectively operable as a non-hybrid or "dual drive" driveline where the ETD 500 is configured or controlled such that the ETD 500 does not generate electricity for storage in the ESS 700. By way of example, the driveline 100 may be operable in a pure electric mode where the engine system 200 is turned off and the ETD 500 uses stored energy from the ESS 700 to drive one or more component of the vehicle 10 (e.g., the front axle 14, the rear axle 16, the pump system 600, an aerial ladder assembly, the TAD 400, etc.). By way of another example, the driveline 100 may be operable in a pure engine mode where the ETD 500 functions as a mechanical conduit or power divider between the engine system 200 and one or more components of the vehicle 10 (e.g., the front axle 14, the rear axle 16, the pump system 600, an aerial ladder assembly, etc.) when the engine system 200 is in operation. By way of yet another example, the driveline 100 may be operable in an electric generation drive mode where the engine system 200 drives the ETD 500 to generate electricity and the ETD 500 uses the generated electricity to drive one or more component of the vehicle 10 (e.g., the front axle 14, the rear axle 16, the pump system 600, an aerial ladder assembly, etc.). By way of yet another example, the driveline 100 may be operable in a boost mode that is similar to the electric generation drive mode, but the ETD 500 draws additional power from the ESS 700 to supplement the generated electricity. By way of still yet another example, the driveline 100 may be operable in distributed drive mode where both the engine system 200 and the ETD 500 are simultaneously operable to drive one or more components of the vehicle 10 (i.e., the engine system 200 consumes fuel in a fuel tank and the ETD 500 consumes stored energy in the ESS 700). For example, the engine system 200 may drive the TAD 400 and the ETD 500 may drive the front axle 14, the rear axle 16, the pump system 600, and/or an aerial ladder assembly. In such operation, the ETD 500 may include an ETD clutch that facilitates decoupling the ETD 500 from the TAD 400. In another embodiment, the driveline 100 is configured or selectively operable as a "hybrid" driveline where the ETD 500 is configured or controlled such that the ETD 500 generates electricity for storage in the ESS 700. By way of example, the driveline 100 may be operable in a charging mode where the engine system 200 drives the ETD 500 to generate electricity for storage in the ESS 700 and, optionally, to power one or more electrically-operated accessories or components of the vehicle 10 and/or for use by the ETD 500 to drive one or more component of the vehicle 10 (e.g., the front axle 14, the rear axle 16, the pump system 600, an aerial ladder assembly, etc.).

Engine System

As shown in FIGS. 3 and 8-12, the engine system 200 is coupled to the frame 12 and positioned beneath the front cabin 20. In another embodiment, the engine system 200 is otherwise positioned (e.g., beneath or within the rear section 30, etc.). As shown in FIGS. 13-16, the engine system 200 includes a prime mover, shown as engine 202, and a first cooling assembly, shown as engine cooling system 210. According to an exemplary embodiment, the engine 202 is a compression-ignition internal combustion engine that utilizes diesel fuel. In alternative embodiments, the engine 202 is a spark-ignition engine that utilizes one of a variety of fuel types (e.g., gasoline, compressed natural gas, propane, etc.).

As shown in FIGS. 13-16, the engine 202 includes a first interface (e.g., a first output, etc.), shown as clutch interface 204, coupled to the clutch 300 (e.g., an input shaft thereof, etc.) and a second interface (e.g., a second output, etc.), shown as cooling system interface 206, coupled to the engine cooling system 210. According to an exemplary embodiment, the clutch 300 is controllable (e.g., engaged, disengaged, etc.) to facilitate selectively mechanically coupling the engine 202 to and selectively mechanically decoupling the engine 202 from the TAD 400. Accordingly, the engine 202 may be operated to drive the TAD 400 when the clutch 300 is engaged to couple the engine 202 to the TAD 400. According to an exemplary embodiment, the engine cooling system 210 includes various components such as a fan, a pulley assembly, a radiator, conduits, etc. to provide cooling to the engine 202. The fan may be coupled to the cooling system interface 206 of the engine 202 (e.g., directly, indirectly via a pulley assembly, etc.) and driven thereby.

Accessory Drive

As shown in FIGS. 13-17, the TAD 400 includes (i) a base or frame, shown as accessory base 402, coupled to a housing, shown as clutch housing 302, of the clutch 300, (ii) a pulley assembly, shown as accessory pulley assembly 404, coupled to (e.g., supported by, extending from, etc.) the accessory base 402, and (iii) a plurality of accessories, shown as accessories 412, coupled to the accessory pulley assembly 404 and supported by the accessory base 402. The accessory pulley assembly 404 includes a plurality of pulleys, shown as accessory pulleys 406, coupled to the accessory base 402 and the accessories 412; a belt, shown as accessory belt 408; and an input pulley, shown as drive pulley 410, coupled to (i) the clutch 300 (e.g., an output shaft thereof, etc.) and (ii) the accessory pulleys 406 by the accessory belt 408. Accordingly, the drive pulley 410 can be selectively driven by the engine 202 through the clutch 300 and, thereby, the engine 202 can selectively drive the accessory pulley assembly 404 to drive the accessories 412. According to an exemplary embodiment, the accessories 412 include an air-conditioning compressor, an air compressor, a power steering pump, and/or an alternator. In some embodiments, the accessories include additional, fewer, and/or different accessories that are capable of being mechanically driven.

Electromechanical Transmission Device

As shown in FIGS. 4, 5, 8, 9, 11, and 12, the ETD 500 is coupled to the frame 12 and positioned beneath the front cabin 20, rearward of the engine 202, the clutch 300, and the TAD 400. In another embodiment, the ETD 500 is otherwise positioned (e.g., beneath or within the rear section 30, etc.). As shown in FIGS. 7 and 15-18, the ETD 500 includes a first interface (e.g., a first input/output, etc.), shown as accessory drive interface 502, coupled to the drive pulley 410 of the TAD 400 (e.g., via an accessory drive shaft, etc.); a second interface (e.g., a second output, etc.), shown as axle interface 504, coupled (e.g., directly, indirectly, etc.) to the front axle 14 (e.g., a front differential thereof via a front drive shaft, etc.) and/or the rear axle 16 (e.g., a rear differential thereof via a rear drive shaft, etc.); and a third interface (e.g., a third output, a power-take-off ("PTO"), etc.), shown as subsystem interface 506, coupled to the pump system 600 (e.g., via a subsystem drive shaft, etc.) and/or a second subsystem 610.

Figure 7:
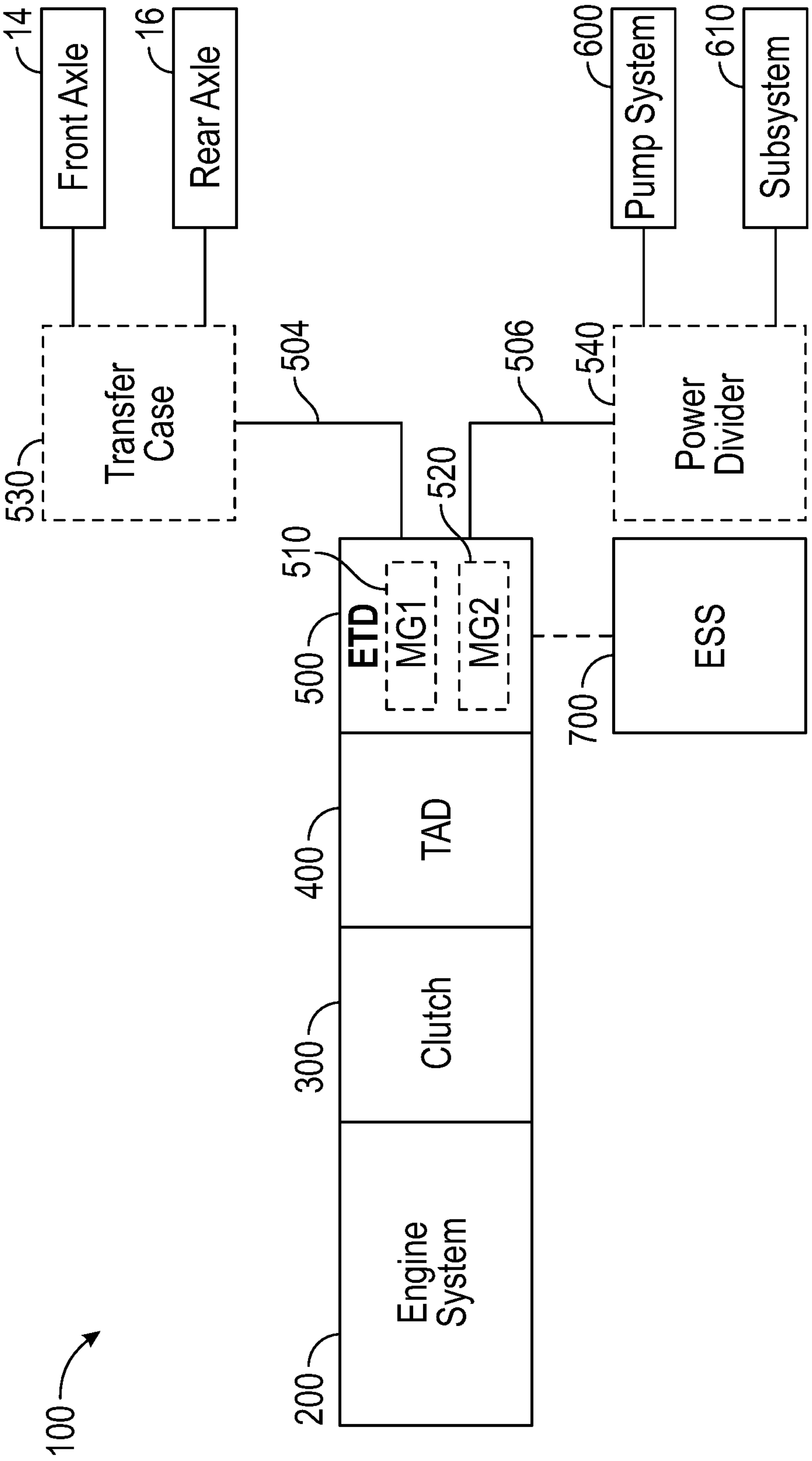
FIG. 7 is a schematic diagram of a driveline of the fire fighting vehicle of FIG. 1 including an engine system, a clutch, an accessory drive, an electromechanical transmission, a pump system, an energy storage system, and one or more driven axles, according to an exemplary embodiment.
Figure 8:
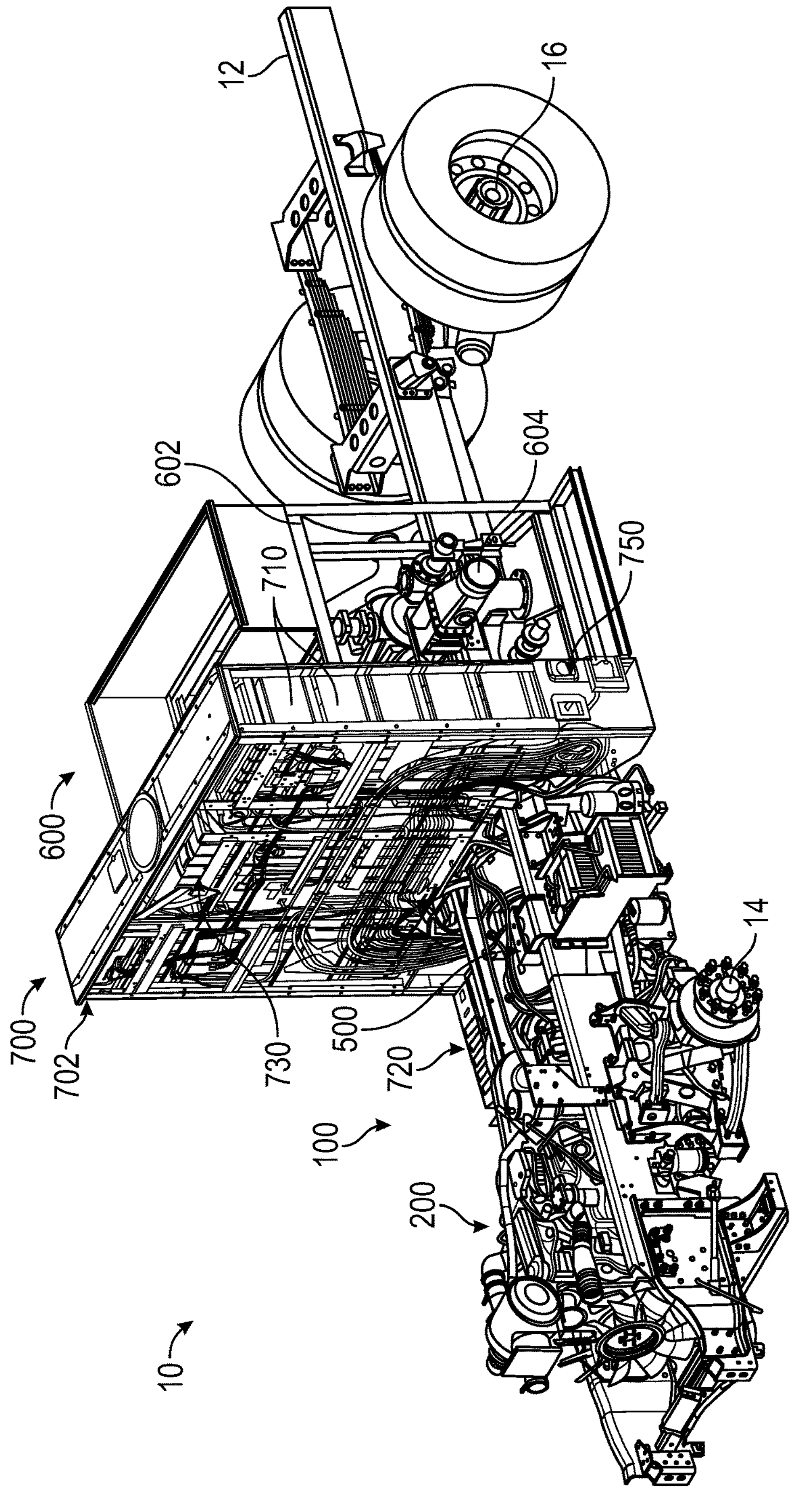
FIG. 8 is a front, left perspective view of a component layout of the driveline of FIG. 7, according to an exemplary embodiment.
Figure 9:
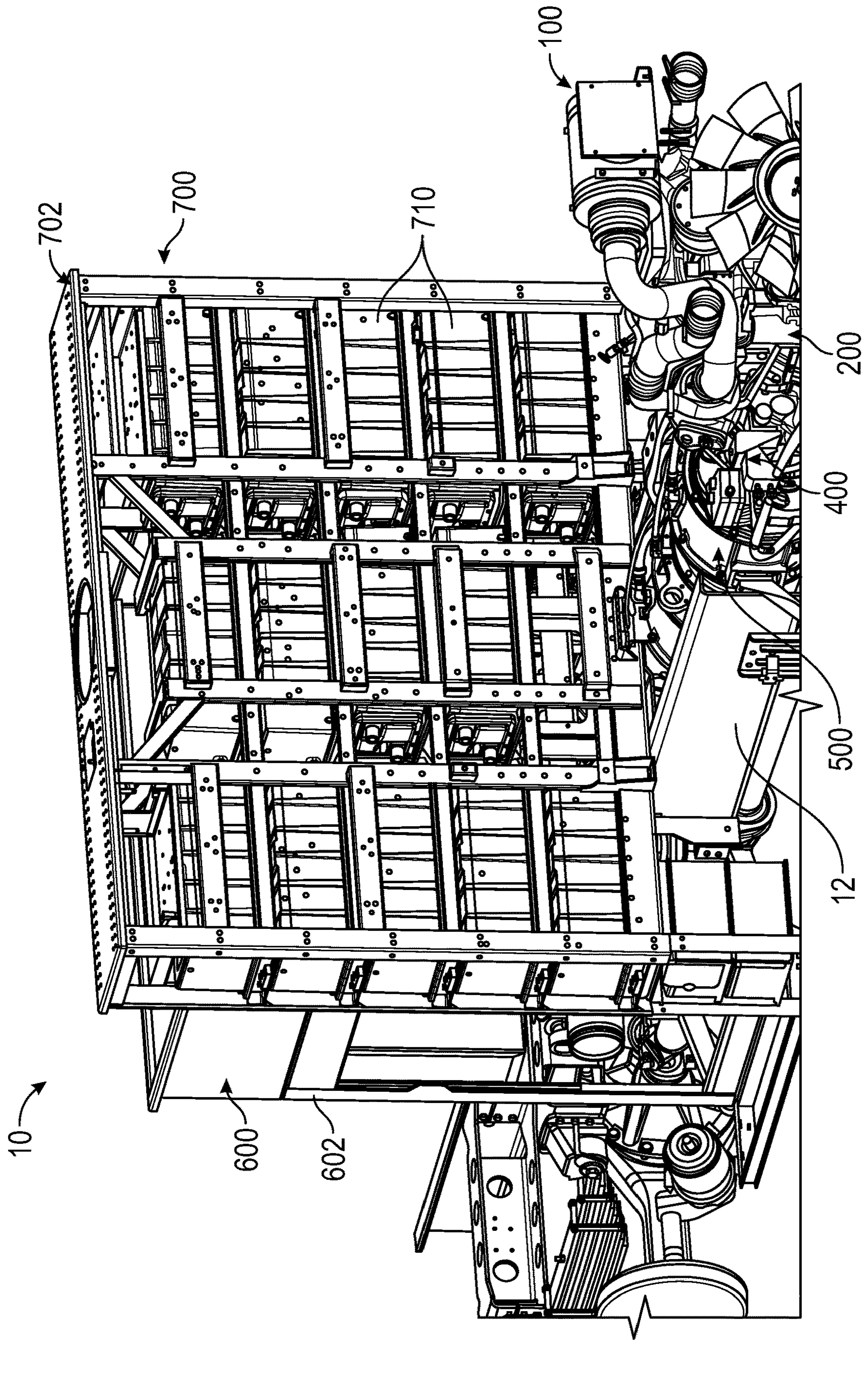
FIG. 9 is a front, right perspective view of the component layout of the driveline of FIG. 7, according to an exemplary embodiment.
Figure 10:
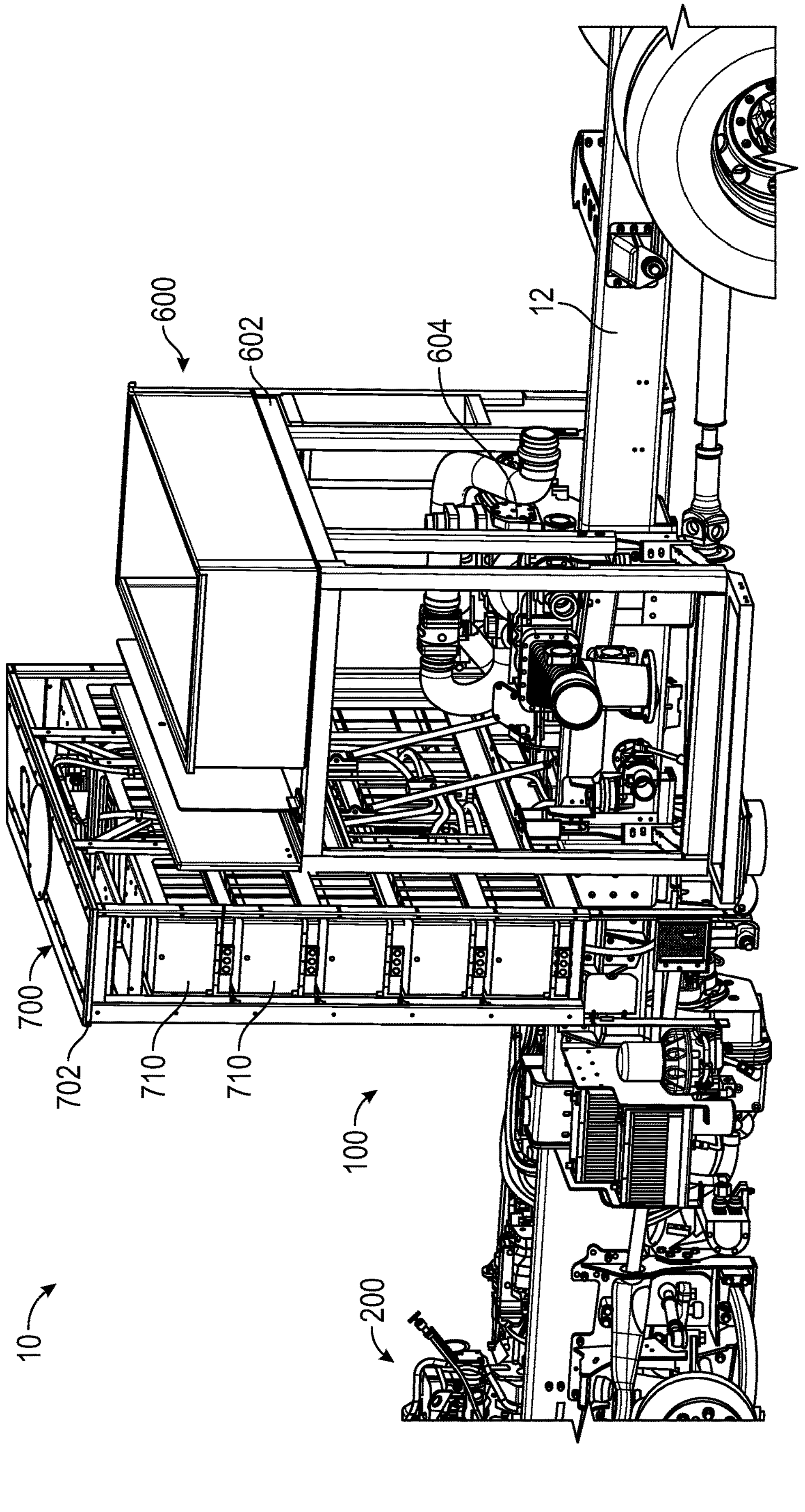
FIG. 10 is a side view of the component layout of the driveline of FIG. 7, according to an exemplary embodiment.
Figure 11:
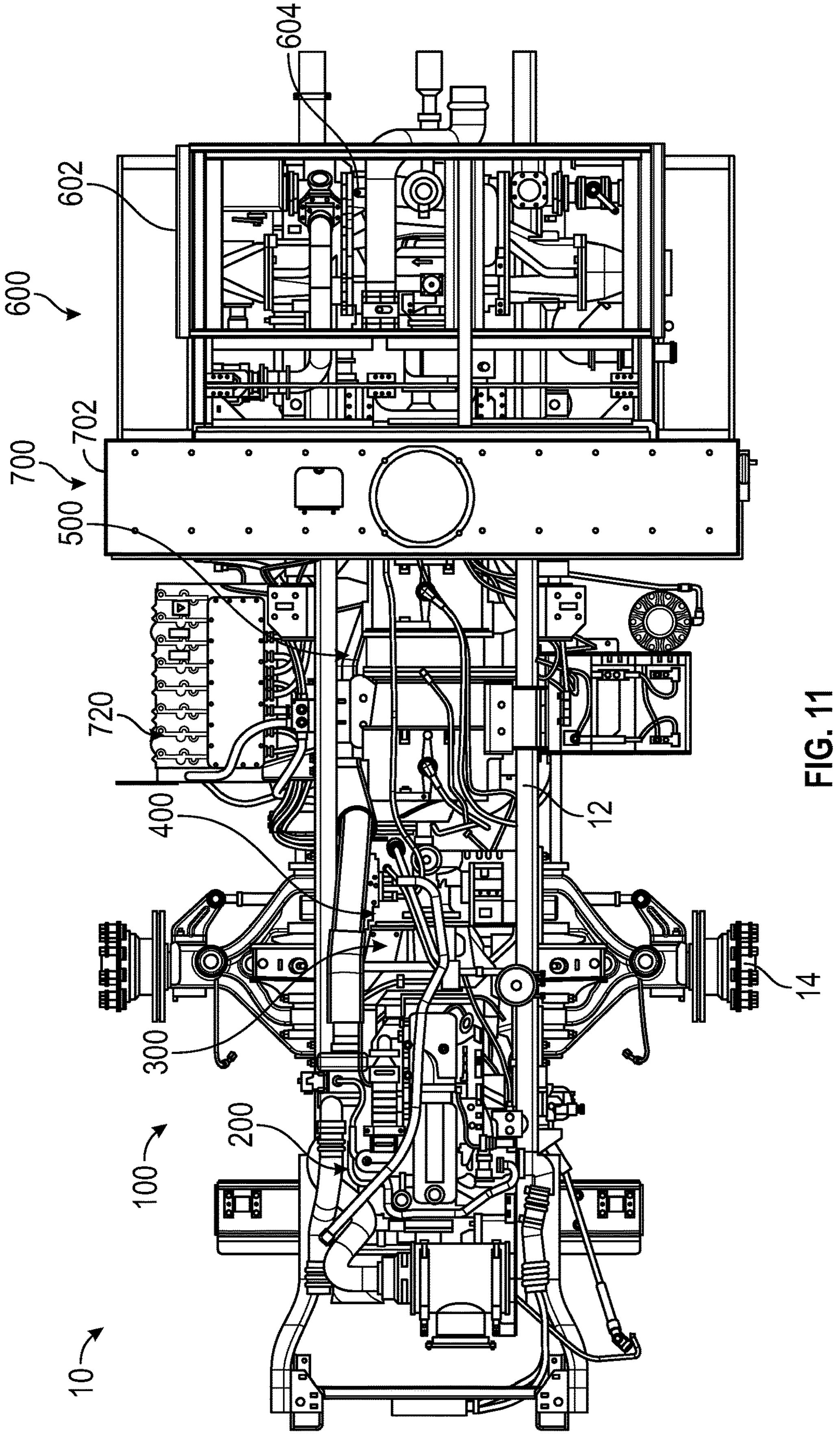
FIG. 11 is a top view of the component layout of the driveline of FIG. 7, according to an exemplary embodiment.
Figure 12:
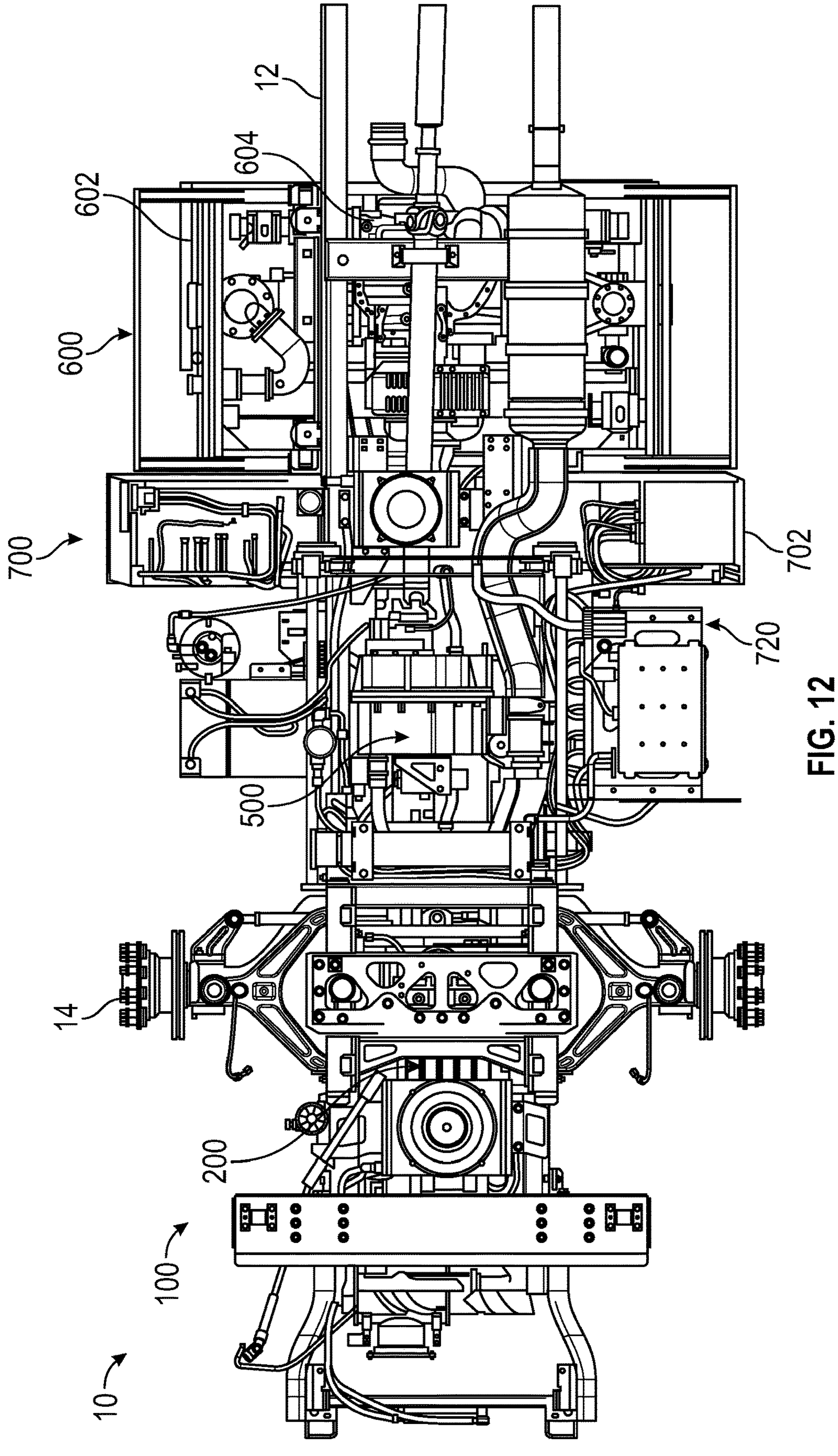
FIG. 12 is a bottom view of the component layout of the driveline of FIG. 7, according to an exemplary embodiment.
Figure 13:
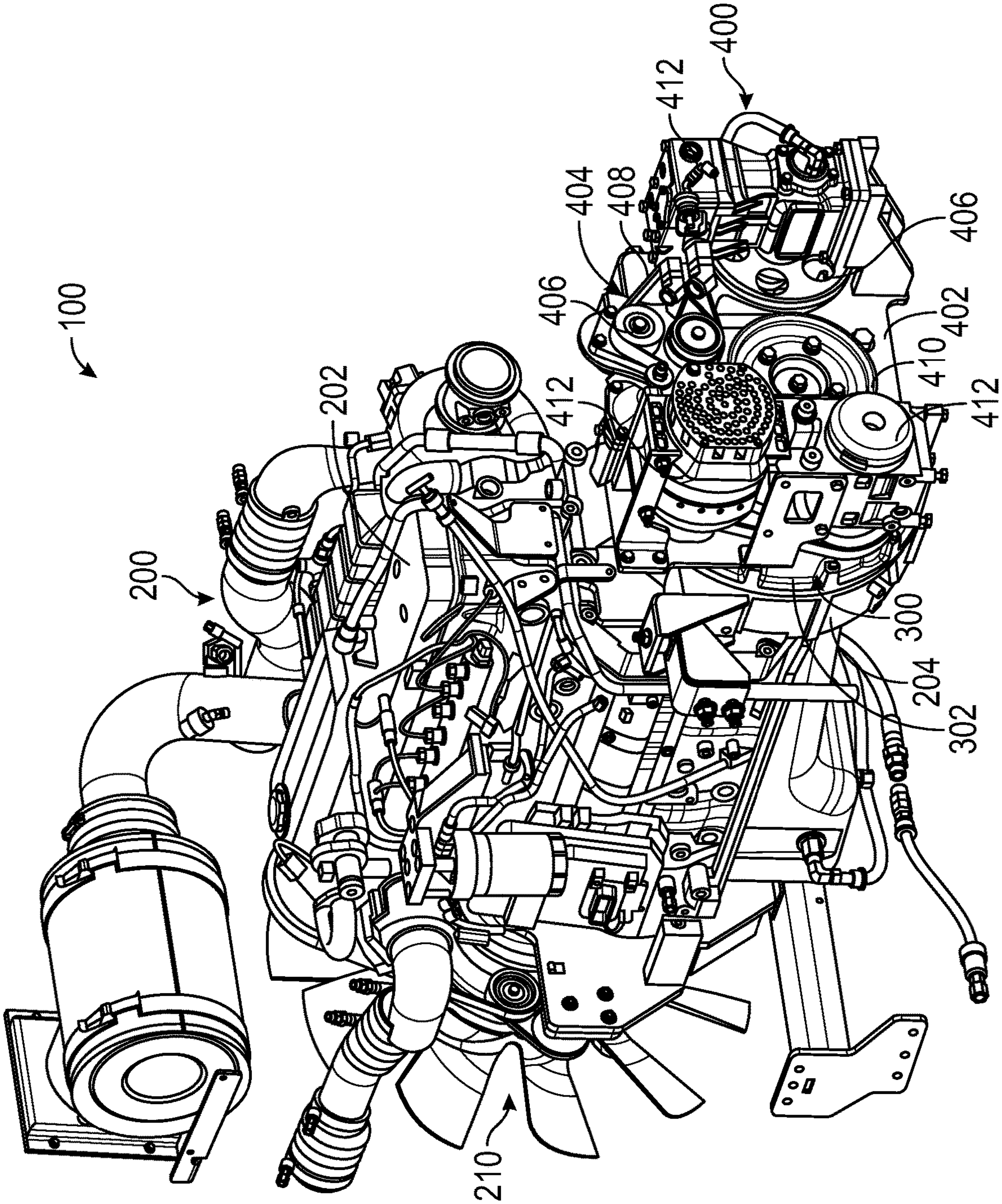
FIGS. 13 and 14 are various perspective views of the engine system, the clutch, and the accessory drive of the driveline of FIG. 7, according to an exemplary embodiment.
Figure 14:
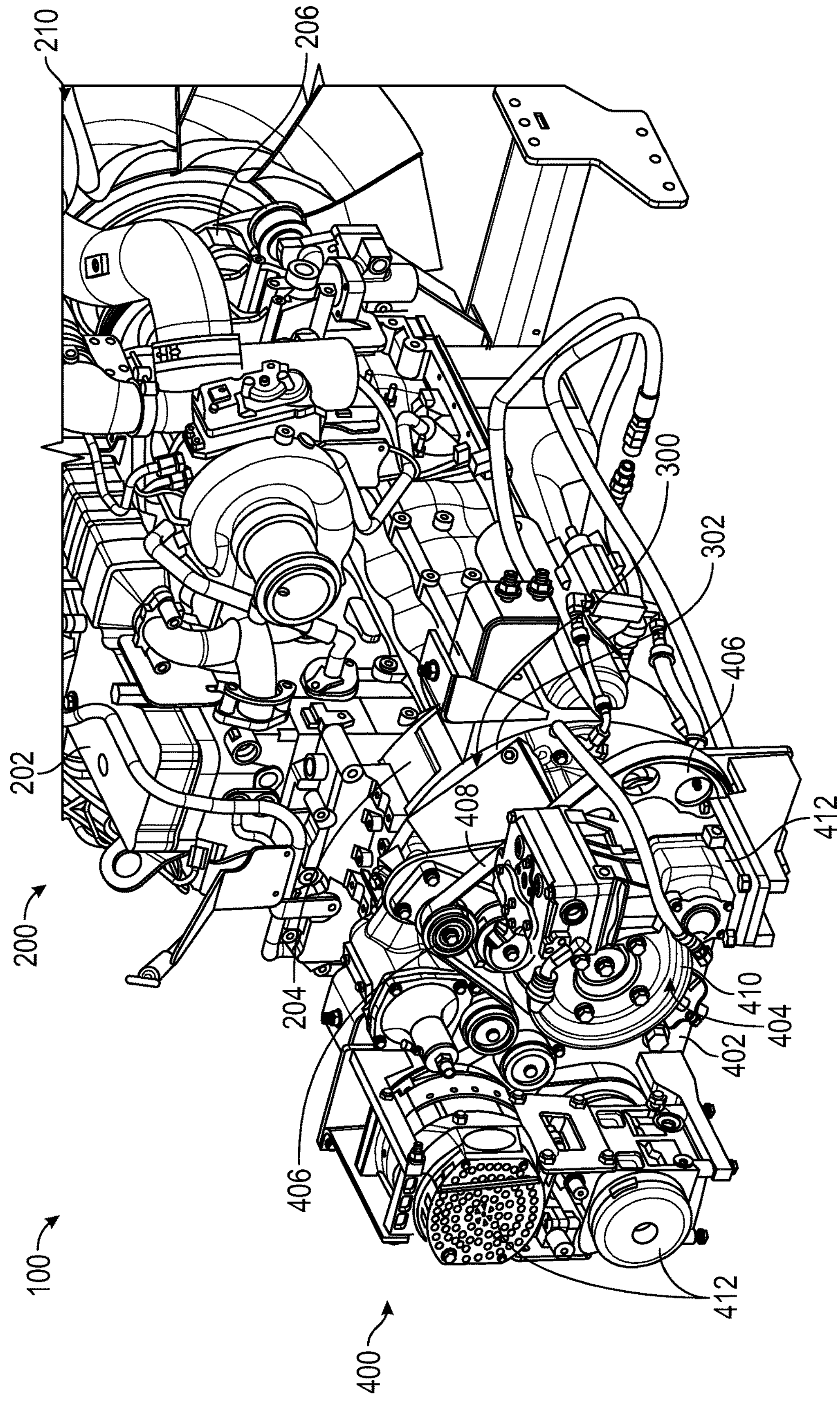
Figure 15:
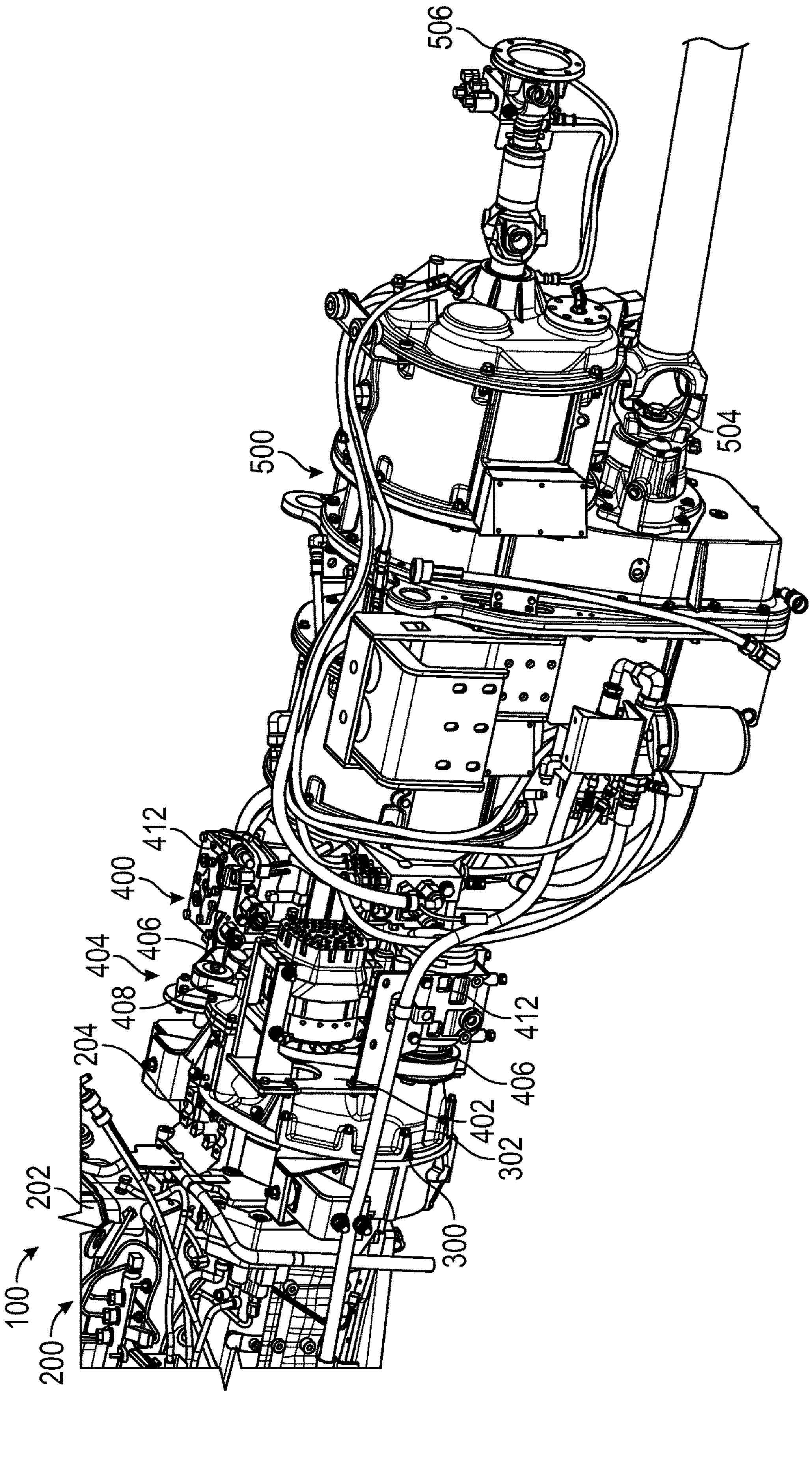
FIGS. 15 and 16 are various perspective views of the engine system, the clutch, the accessory drive, and the electromechanical transmission of the driveline of FIG. 7, according to an exemplary embodiment.
Figure 16:
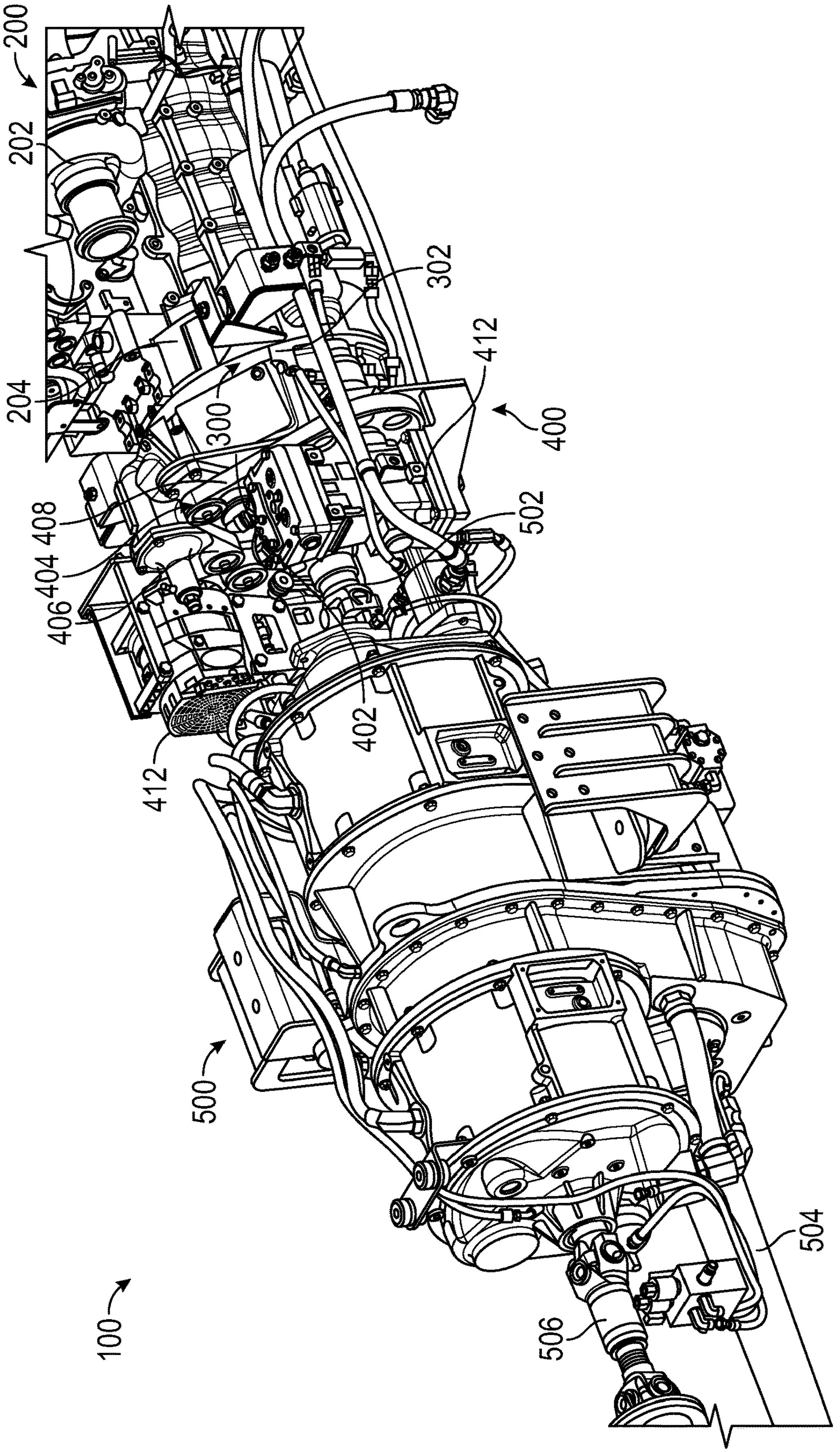
Figure 17:
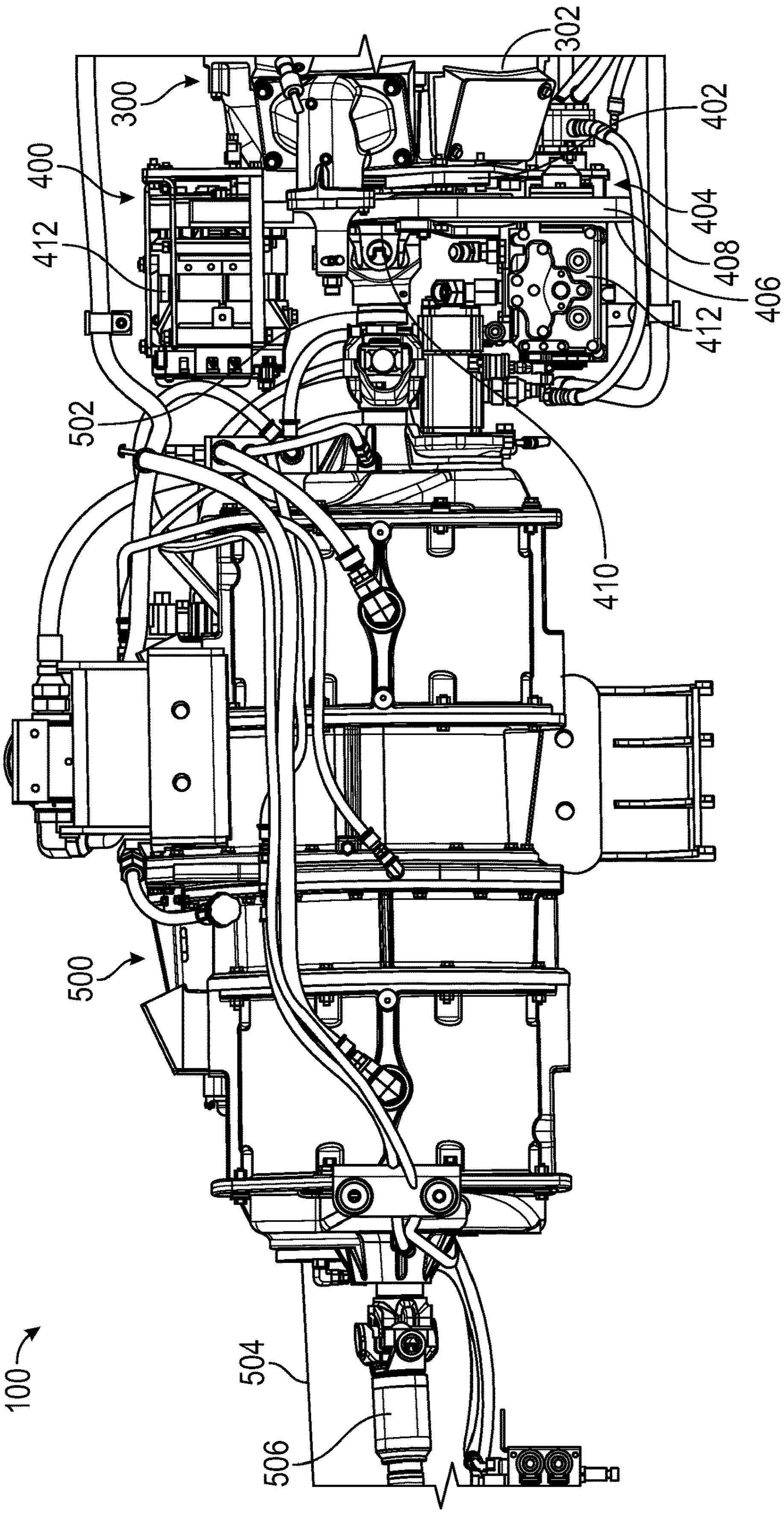
FIG. 17 is a top view of the clutch, the accessory drive, and the electromechanical transmission of the driveline of FIG. 7, according to an exemplary embodiment.

In one embodiment, the axle interface 504 includes a single output directly coupled to the front axle 14 or the rear axle 16 such that only one of the front axle 14 or the rear axle 16 is driven. In another embodiment, the axle interface 504 includes two separate outputs, one directly coupled to each of the front axle 14 and the rear axle 16 such that both the front axle 14 and the rear axle 16 are driven. In some embodiments, as shown in FIG. 7, the driveline 100 includes a first power divider, shown as transfer case 530, and the axle interface 504 includes a single output coupled to an input of the transfer case 530. The transfer case 530 may include a first output coupled to the front axle 14 and a second output coupled to the rear axle 16 to facilitate driving the front axle 14 and the rear axle 16 with the ETD 500. In some embodiments, as shown in FIG. 7, the driveline 100 includes a second power divider, show as power divider 540, and the subsystem interface 506 is coupled to an input of the power divider 540. The power divider 540 may include a plurality of outputs coupled to a plurality of subsystems (e.g., the pump system 600, an aerial ladder assembly, the second subsystem 610, etc.) to facilitate selectively driving each of the plurality of subsystems with the ETD 500. According to an exemplary embodiment, the ETD 500 is configured such that the subsystem interface 506 and the axle interface 504 are speed independent. Therefore, the subsystems (e.g., the pump system 600, the aerial ladder assembly, the second subsystem 610, etc.) can be driven with the ETD 500 at a speed independent of the ground speed of the vehicle 10.

As shown in FIG. 7, the ETD 500 is electrically coupled to the ESS 700. According to an exemplary embodiment, such electrical connection facilitates electrically operating the ETD 500 using stored energy in the ESS 700 to drive the front axle 14, the rear axle 16, the TAD 400, the pump system 600, and/or another subsystem (e.g., the second subsystem 610). In some embodiments (e.g., in embodiments where the driveline 100 is a hybrid driveline or is selectively operable as a hybrid driveline), such electrical coupling facilitates charging the ESS 700 with the ETD 500. As shown in FIGS. 7, 11, 15, and 16, the ETD 500 is selectively coupled to the engine 202 by the clutch 300 and through the TAD 400. Accordingly, the ETD 500 may be selectively driven by the engine 202 when the clutch 300 is engaged. On the other hand, the ETD 500 may be operated using stored energy of the ESS 700 to back-drive the TAD 400 via the accessory drive interface 502 when the clutch 300 is disengaged.

In some embodiments, the ETD 500 functions as a mechanical conduit or power divider, and transmits the mechanical input received from the engine 202 to the pump system 600 (or other subsystem(s)), the front axle 14, and/or the rear axle 16. In some embodiments, the ETD 500 uses the mechanical input to generate electricity for use by the ETD 500 to drive the pump system 600, the front axle 14, and/or the rear axle 16. In some embodiments, the ETD 500 supplements the mechanical input using the stored energy in the ESS 700 to provide an output greater than the input received from the engine 202. In some embodiments, the ETD 500 uses the mechanical input to generate electricity for storage in the ESS 700. In some embodiments, the ETD 500 in not configured to generate electricity for storage in the ESS 700 or is prevented from doing so (e.g., for emissions compliance, a dual drive embodiment, etc.) and, instead, the ESS 700 is otherwise charged (e.g., through a charging station, an external input, regenerative braking, etc.).

According to the exemplary embodiment shown in FIG. 7, the ETD 500 is configured as an electromechanical infinitely variable transmission ("EMIVT") that includes a first electromagnetic device, shown as a first motor/generator 510, and a second electromagnetic device, shown as second motor/generator 520. The first motor/generator 510 and the second motor/generator 520 may be coupled to each other via a plurality of gear sets (e.g., planetary gear sets, etc.). The EMIVT also includes one or more brakes and one or more clutches to facilitate operation of the EMIVT in various modes (e.g., a drive mode, a battery charging mode, a low-range speed mode, a high-range speed mode, a reverse mode, an ultra-low mode, etc.). In some implementations, all of such components may be efficiently packaged in a single housing with only the inputs/outputs thereof exposed.

By way of example, the first motor/generator 510 may be driven by the engine 202 to generate electricity. The electricity generated by the first motor/generator 510 may be used (i) to charge the ESS 700 and/or (ii) to power the second motor/generator 520 to drive the front axle 14, the rear axle 16, the pump system 600, and/or another subsystem coupled thereto. By way of another example, the second motor/generator 520 may be driven by the engine 202 to generate electricity. The electricity generated by the second motor/generator 520 may be used (i) to charge the ESS 700 and/or (ii) to power the first motor/generator 510 to drive the front axle 14, the rear axle 16, the pump system 600, and/or another subsystem coupled thereto. By way of another example, the first motor/generator 510 and/or the second motor/generator 520 may be powered by the ESS 700 to (i) back-start the engine 202 (e.g., such that an engine starter is not necessary, etc.), (ii) drive the TAD 400 (e.g., when the engine 202 is off, when the clutch 300 is disengaged, etc.), and/or (iii) drive the front axle 14, the rear axle 16, the pump system 600, and/or another subsystem coupled thereto. By way of yet another example, the first motor/generator 510 may be driven by the engine 202 to generate electricity and the second motor/generator 520 may receive both the generated electricity from the first motor/generator 510 and the stored energy in the ESS 700 to drive the front axle 14, the rear axle 16, the pump system 600, and/or another subsystem coupled thereto. By way of yet still another example, the second motor/generator 520 may be driven by the engine 202 to generate electricity and the first motor/generator 510 may receive both the generated electricity from the second motor/generator 520 and the stored energy in the ESS 700 to drive the front axle 14, the rear axle 16, the pump system 600, and/or another subsystem coupled thereto. By way of yet still another example, the first motor/generator 510, the second motor/generator 520, the plurality of gear sets, the one or more brakes, and/or the one or more clutches may be controlled such that no electricity is generated or consumed by the ETD 500, but rather the ETD 500 functions as a mechanical conduit or power divider that provides the mechanical input received from the engine 202 to the front axle 14, the rear axle 16, the pump system 600, and/or another subsystem coupled thereto. By way of yet still another example, the ETD 500 may be selectively decoupled from the TAD 400 (e.g., via a clutch of the ETD 500) such that the engine 202 drives the TAD 400 while the ETD 500 simultaneously uses the stored energy in the ESS 700 to drive the front axle 14, the rear axle 16, the pump system 600, and/or another subsystem coupled thereto.

In some embodiments, the first motor/generator 510 and/or the second motor/generator 520 are controlled to provide regenerative braking capabilities. By way of example, the first motor/generator 510 and/or the second motor/generator 520 may be back-driven by the front axle 14 and/or the rear axle 16 though the axle interface 504 during a braking event. The first motor/generator 510 and/or the second motor/generator 520 may, therefore, operate as a generator that generates electricity during the braking event for storage in the ESS 700 and/or to power electronic components of the vehicle 10. In other embodiments, the ETD 500 does not provide regenerative braking capabilities.

Further details regarding the components of the EMIVT and the structure, arrangement, and functionality thereof may be found in (i) U.S. Pat. No. 8,337,352, filed Jun. 22, 2010, (ii) U.S. Pat. No. 9,651,120, filed Feb. 17, 2015, (iii) U.S. Pat. No. 10,421,350, filed Oct. 20, 2015, (iv) U.S. Pat. No. 10,584,775, filed Aug. 31, 2017, (v) U.S. Patent Publication No. 2017/0370446, filed Sep. 7, 2017, (vi) U.S. Pat. No. 10,578,195, filed Oct. 4, 2017, (vii) U.S. Pat. No. 10,982,736, filed Feb. 17, 2019, and (viii) U.S. Pat. No. 11,137,053, filed Jul. 14, 2020, all of which are incorporated herein by reference in their entireties. In other embodiments, the ETD 500 includes a device or devices different than the EMIVT (e.g., an electronic transmission, a motor and/or generator, a motor and/or generator coupled to a transfer case, an electronic axle, etc.).

Pump System

Figure 18:
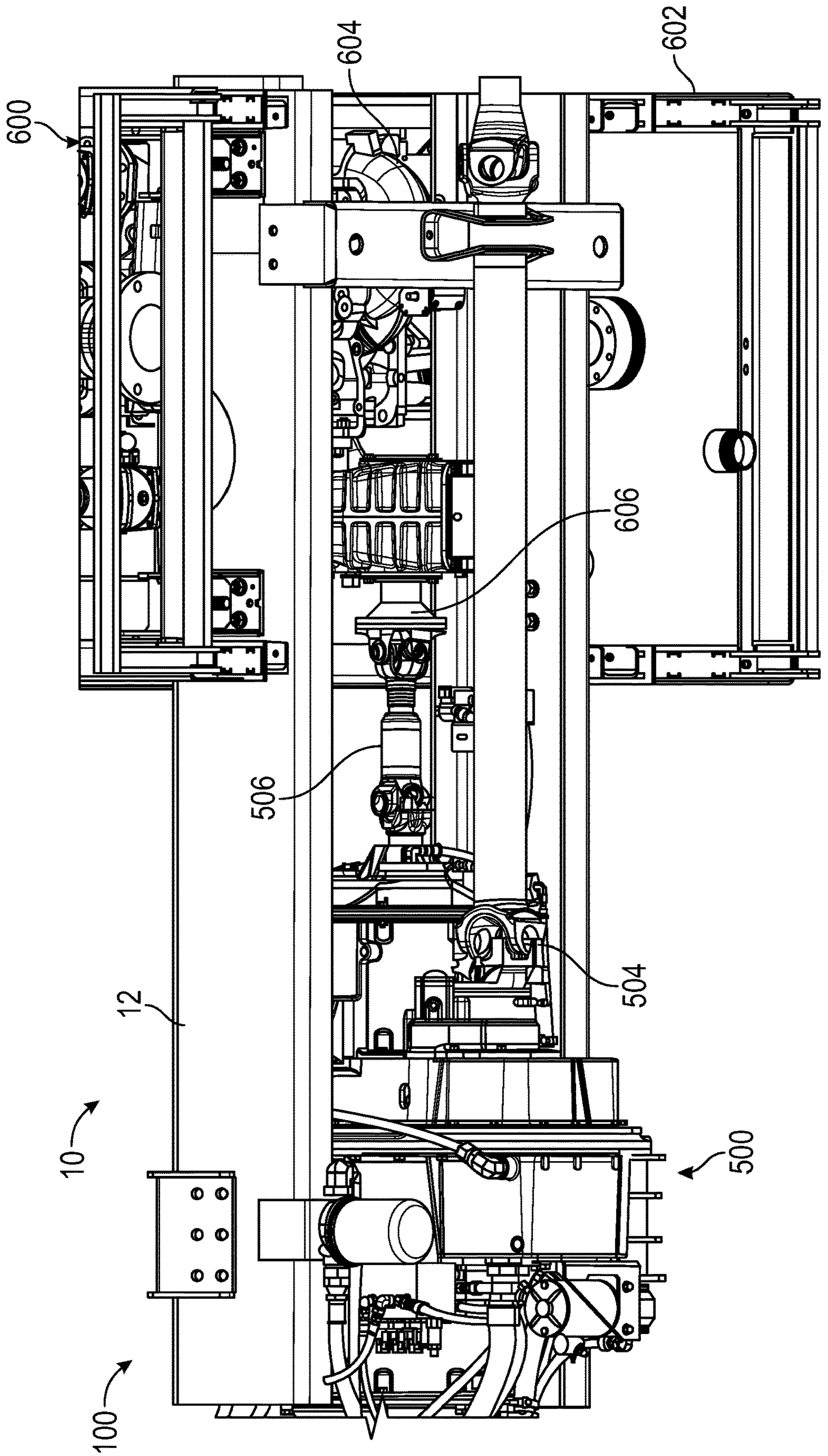
FIG. 18 is a bottom perspective view of the electromechanical transmission and the pump system of the driveline of FIG. 7, according to an exemplary embodiment.
Figure 19:
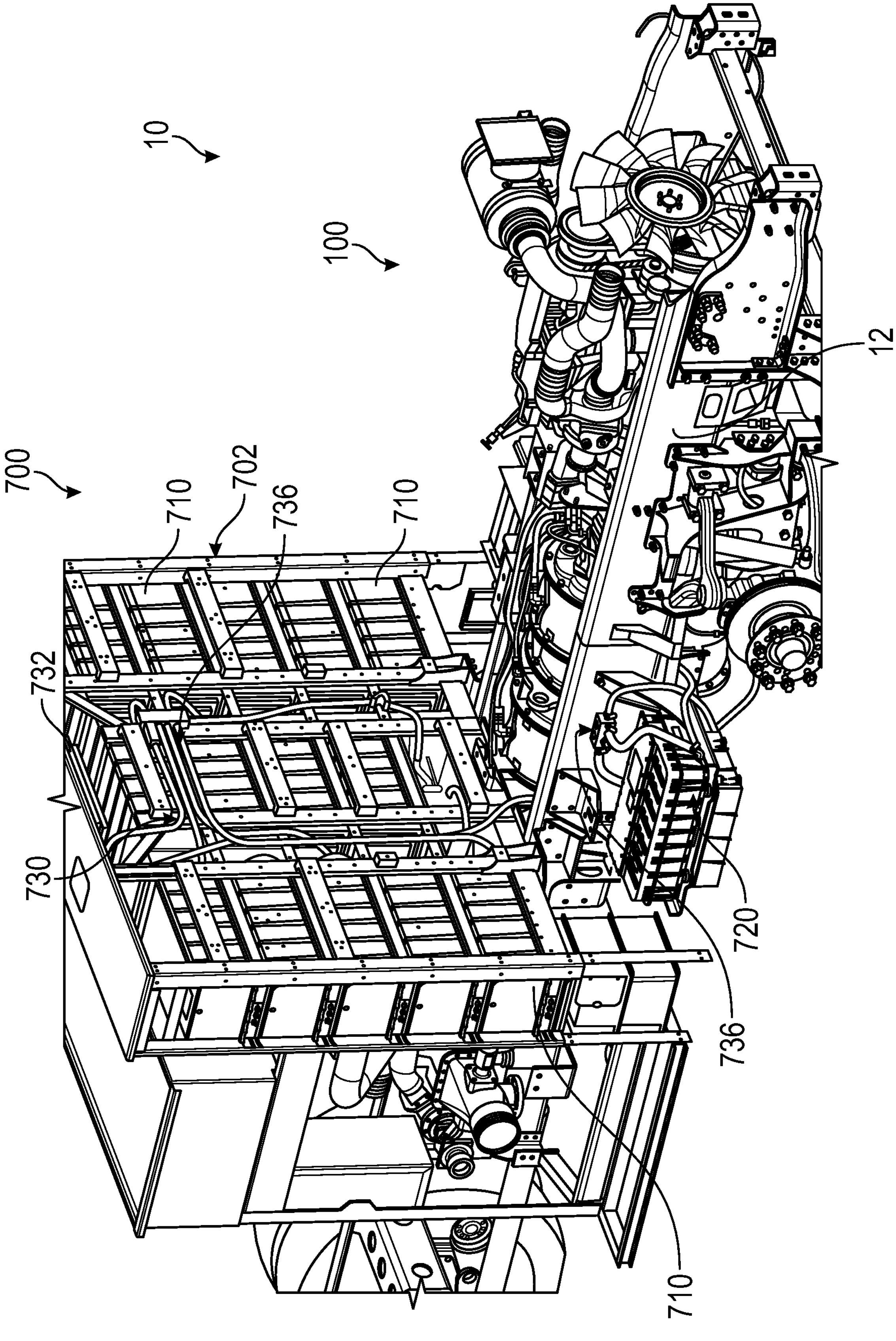
FIGS. 19-26 are various detailed views of the energy storage system of the driveline of FIG. 7, according to an exemplary embodiment.

As shown in FIGS. 1, 2, 4-6, 8-12, and 18, the pump system 600 is coupled to the frame 12 and positioned in a space, shown as gap 40, between the front cabin 20 and the rear section 30. In another embodiment, the pump system 600 is otherwise positioned (e.g., within the rear section 30, etc.). As shown in FIGS. 1, 2, 4-6, 8-12, and 18, the pump system 600 includes a frame assembly, shown as pump house 602, coupled to the frame 12 and a pump assembly, shown as pump 604, disposed within and supported by the pump house 602. As shown in FIG. 18, the pump 604 includes an interface (e.g., an input, etc.), shown as ETD interface 606, that engages (directly or indirectly) with subsystem interface 506 of the ETD 500. The ETD 500 may thereby drive the pump 604 to pump a fluid from a source (e.g., an on-vehicle fluid source, an off-vehicle fluid source, an on-board water tank, an on-board agent tank, a fire hydrant, an open body of water, a tanker truck, etc.) to one or more fluid outlets on the vehicle 10 (e.g., a structural discharge, a hose reel, a turret, a high reach extendible turret ("HRET"), etc.).

Energy Storage System

Distributed Energy Storage System

As shown in FIGS. 1-6, 8-12, and 19-26, the ESS 700 is configured as a distributed ESS that includes a housing, shown as support rack 702, coupled to the frame 12 and positioned in the gap 40 between the front cabin 20 and the rear section 30, forward of the pump house 602; a plurality of battery cells, shown as battery packs 710, supported by the support rack 702; an inverter system, shown as inverter assembly 720, coupled to the frame 12 separate from the support rack 702 (i.e., distributed) and positioned beneath the front cabin 20; a second cooling assembly, shown as ESS cooling system 730; a wiring assembly, shown as high voltage wiring assembly 740; and a charging assembly, shown as high voltage charging system 750, disposed along a side of the support rack 702. In another embodiment, the support rack 702 and/or the battery packs 710 are otherwise positioned (e.g., behind the pump house 602; within the rear section 30; between frame rails of the frame 12; to achieve a desired packaging, weight balance, or cost performance of the driveline 100 and the vehicle 10; etc.).

Figure 20:
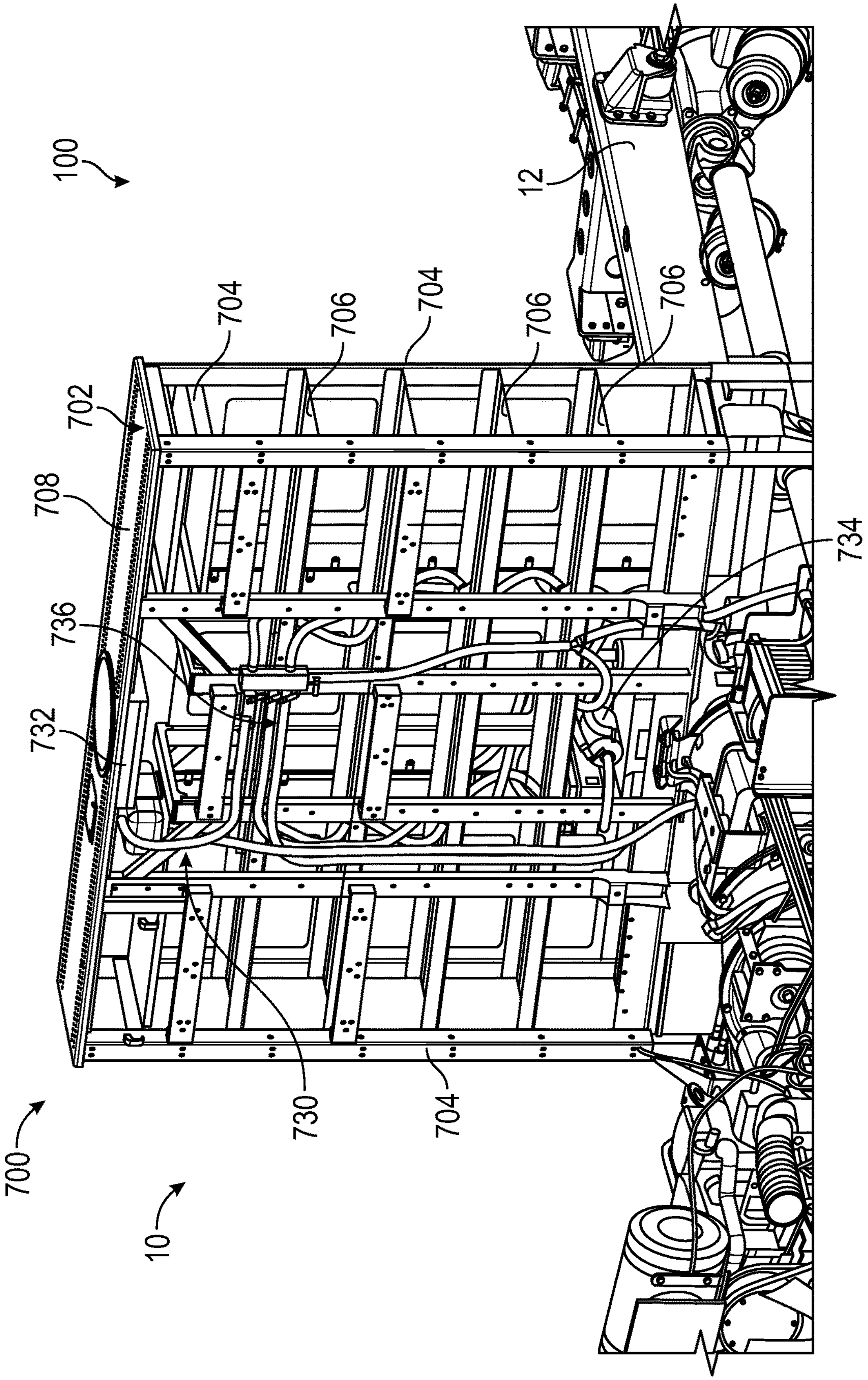
Figure 21:
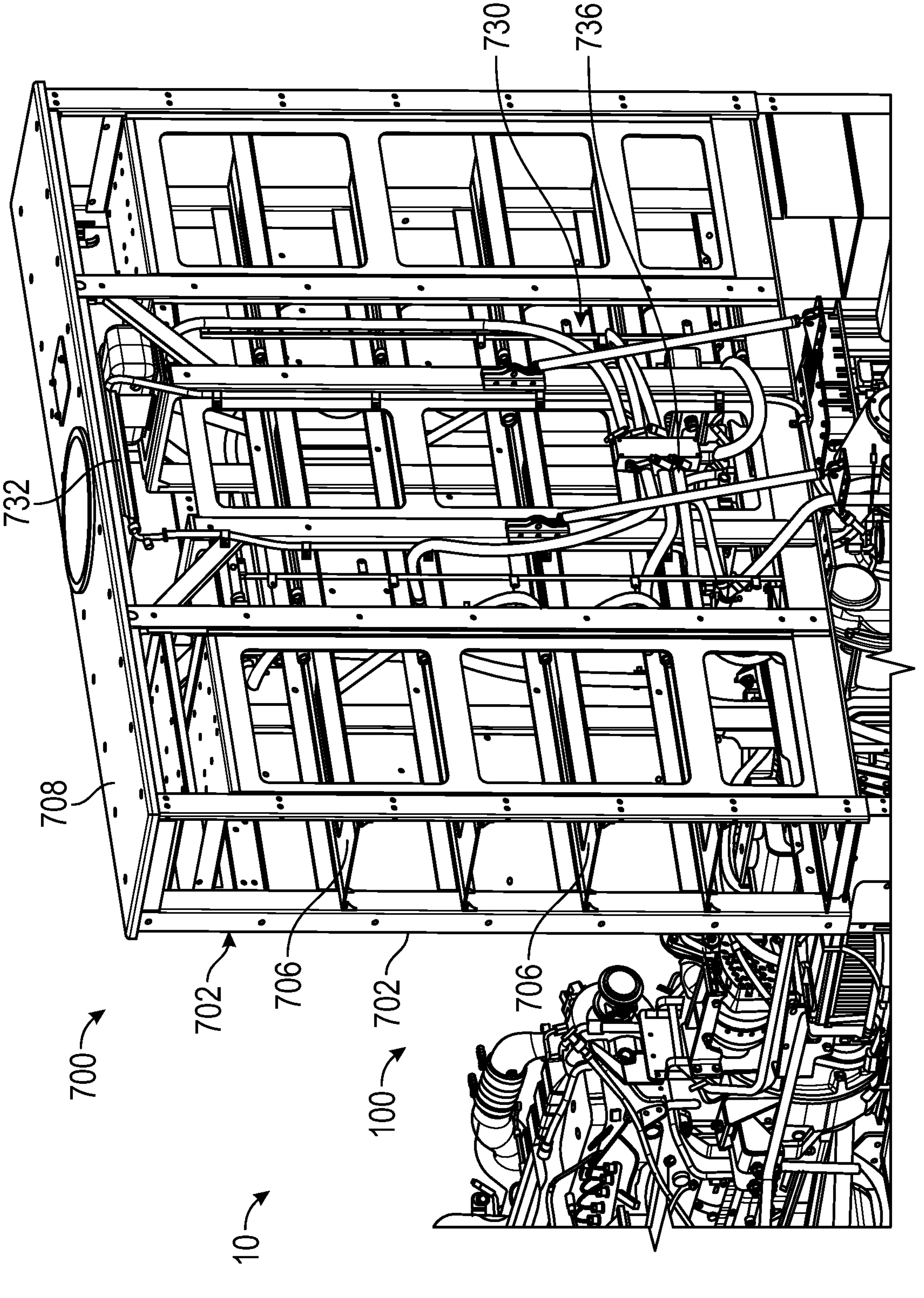
Figure 22:
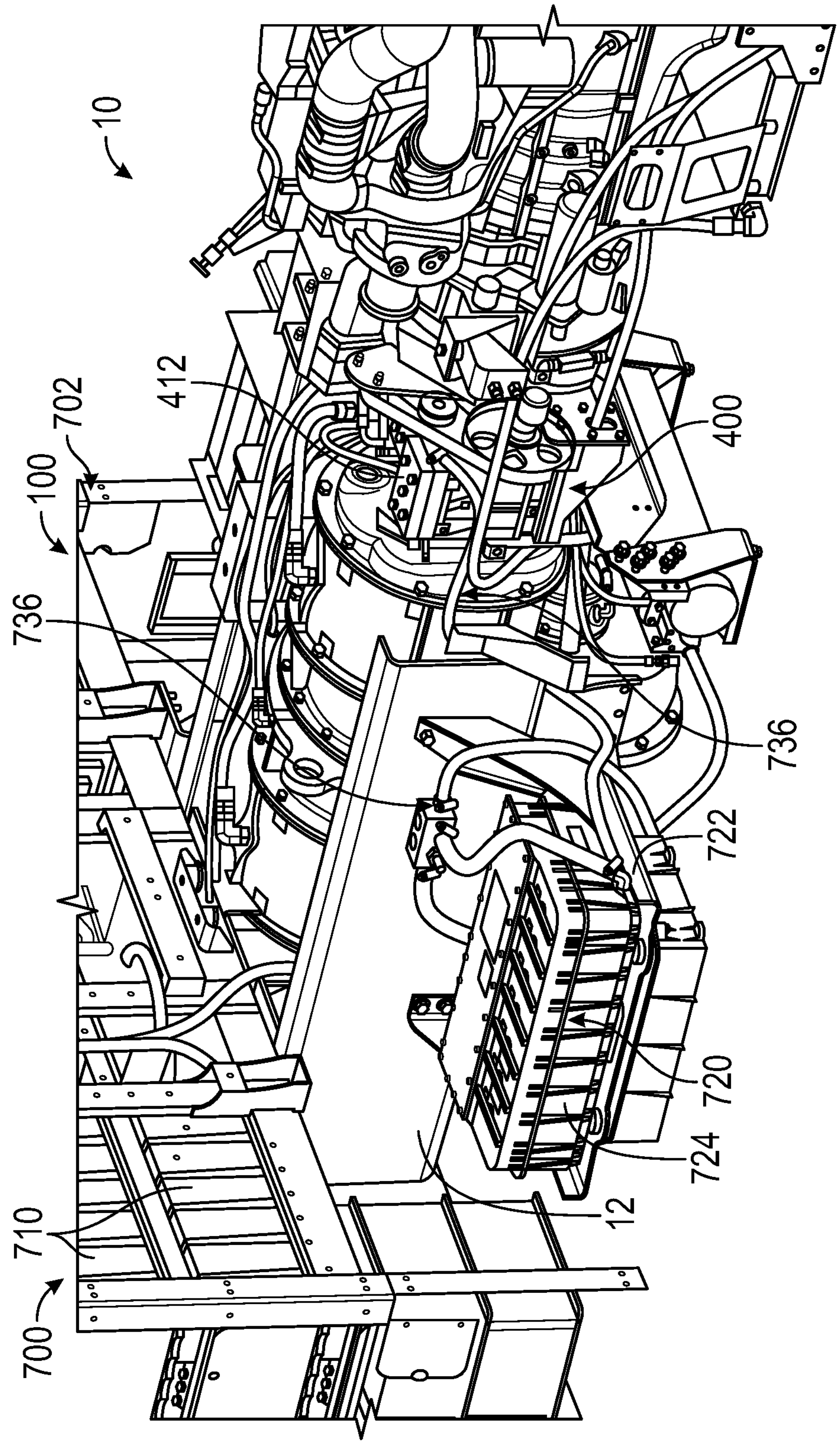
Figure 23:
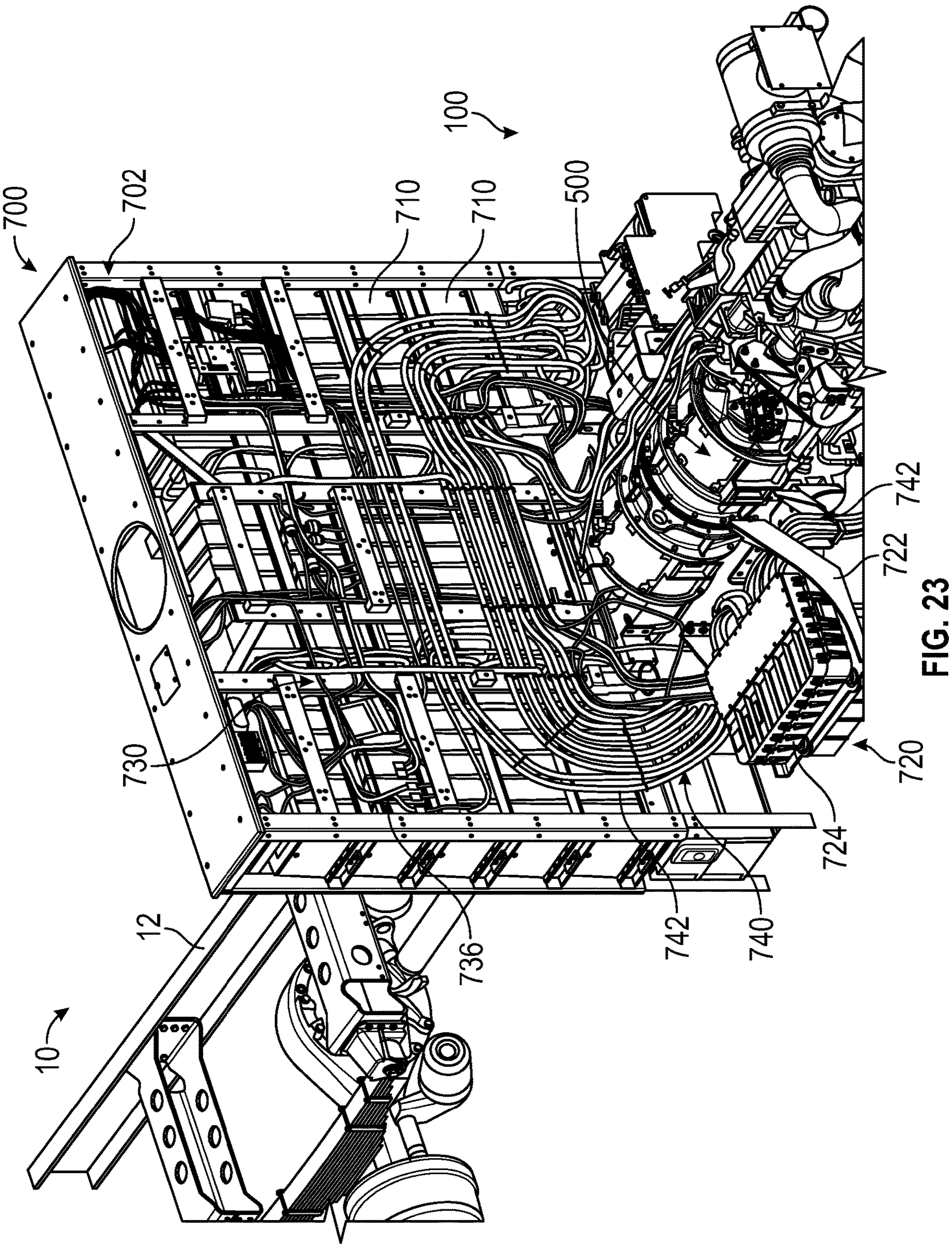

As shown in FIGS. 20 and 21, the support rack 702 includes a plurality of vertical supports, shown as frame members 704; a plurality of horizontal supports, shown as shelving 706, coupled to the frame members 704 at various heights along the frame members 704 and that support the battery packs 710; and a top support, shown as top panel 708, extending horizontally across a top end of the support rack 702. As shown in FIGS. 22 and 23, the inverter assembly 720 includes a bracket, shown as inverter bracket 722, coupled to one the frame rails of the frame 12 and positioned proximate the support rack 702 (e.g., a front side thereof, etc.) and an inverter, shown as inverter 724, coupled to and supported by the inverter bracket 722. In another embodiment, the inverter 724 is located on or coupled directly to the support rack 702.

As shown in FIGS. 3, 19-24, and 26, the ESS cooling system 730 includes a heat exchanger, shown as cooling radiator 732, coupled to an underside of the top panel 708; a driver, shown as cooling compressor 734, supported by the shelving 706; and a plurality of fluid conduits, shown as cooling conduits 736, fluidly coupling the cooling radiator

732 and the cooling compressor 734 to various components of the driveline 100 including the ETD 500, the battery packs 710, the inverter 724, and/or one or more of the accessories 412. The ESS cooling system 730 may, therefore, facilitate thermally regulating (i.e., cooling) not only components of the ESS 700, but also other components of the vehicle 10 (e.g., the ETD 500, the accessories 412, etc.).

Figure 3:
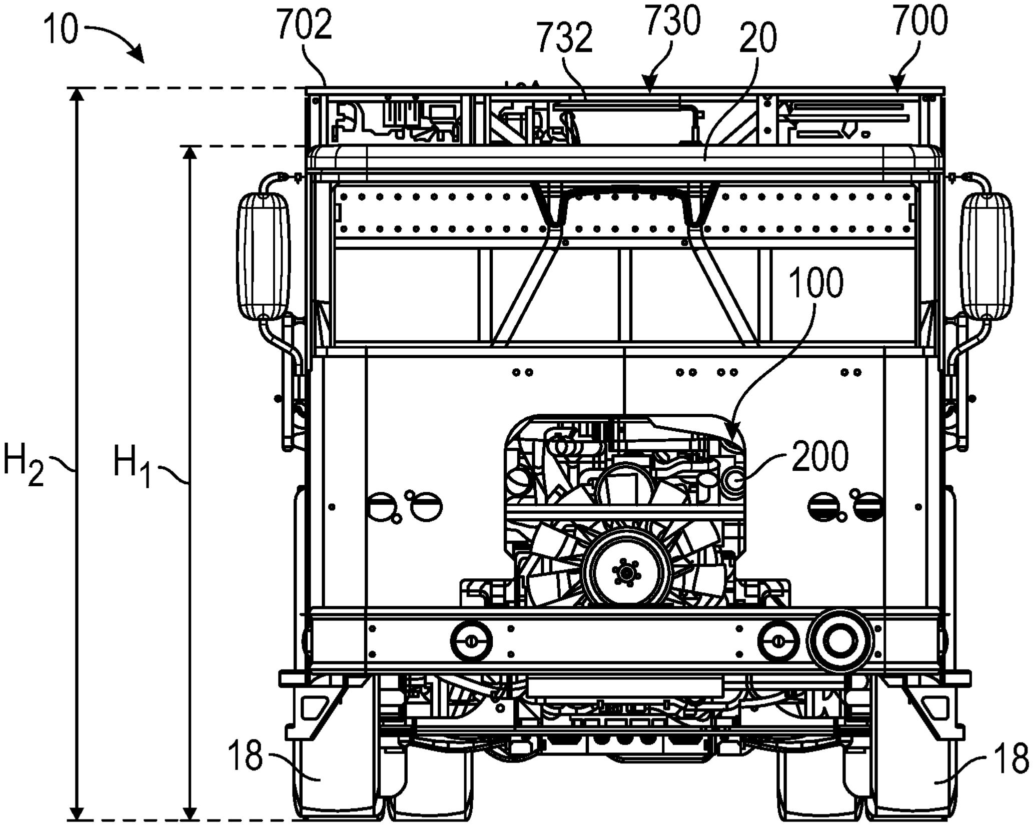
FIG. 3 is a front view of the fire fighting vehicle of FIG. 1, according to an exemplary embodiment.
Figure 4:
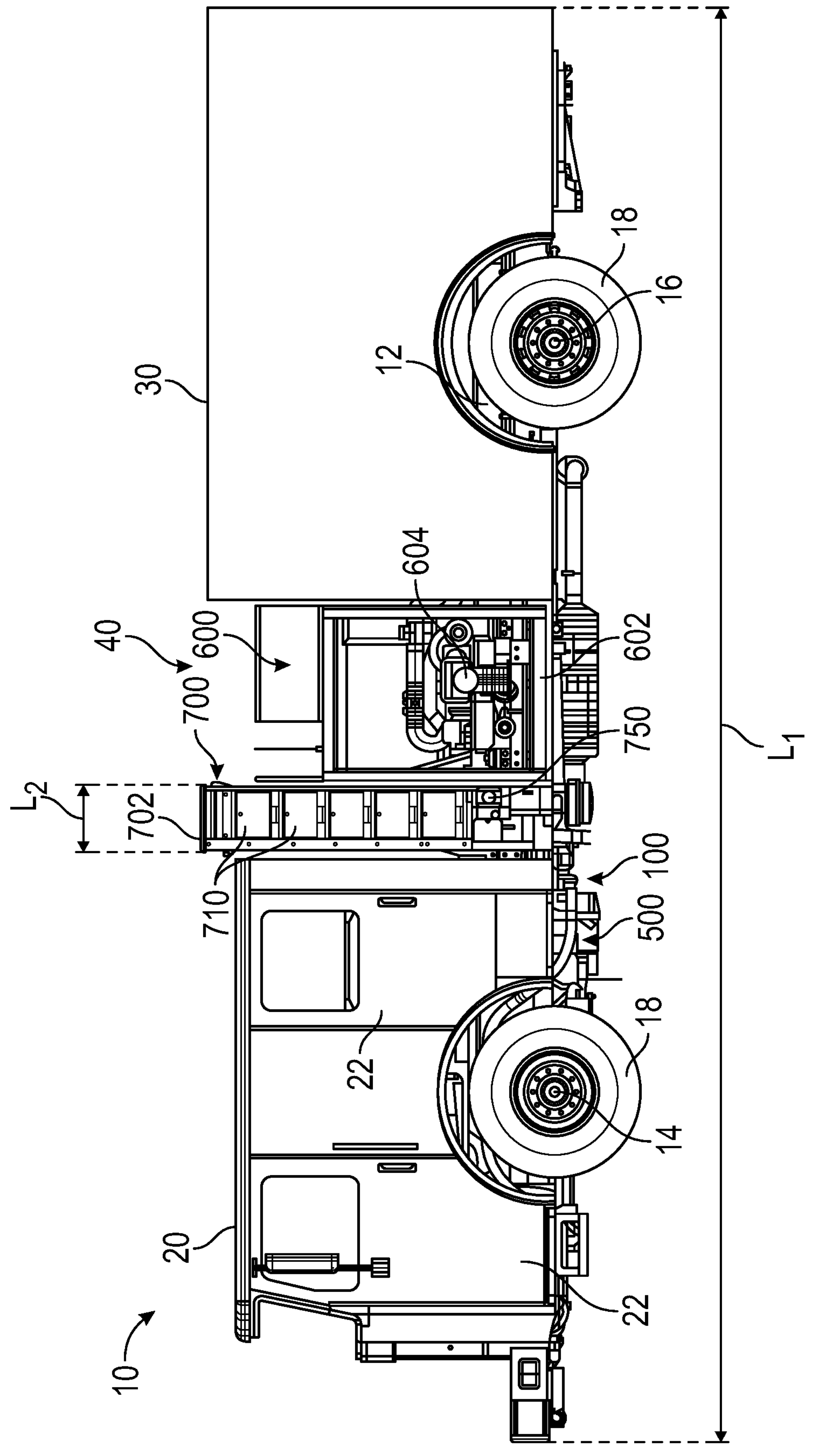
FIG. 4 is a left side view of the fire fighting vehicle of FIG. 1, according to an exemplary embodiment.
Figure 5:
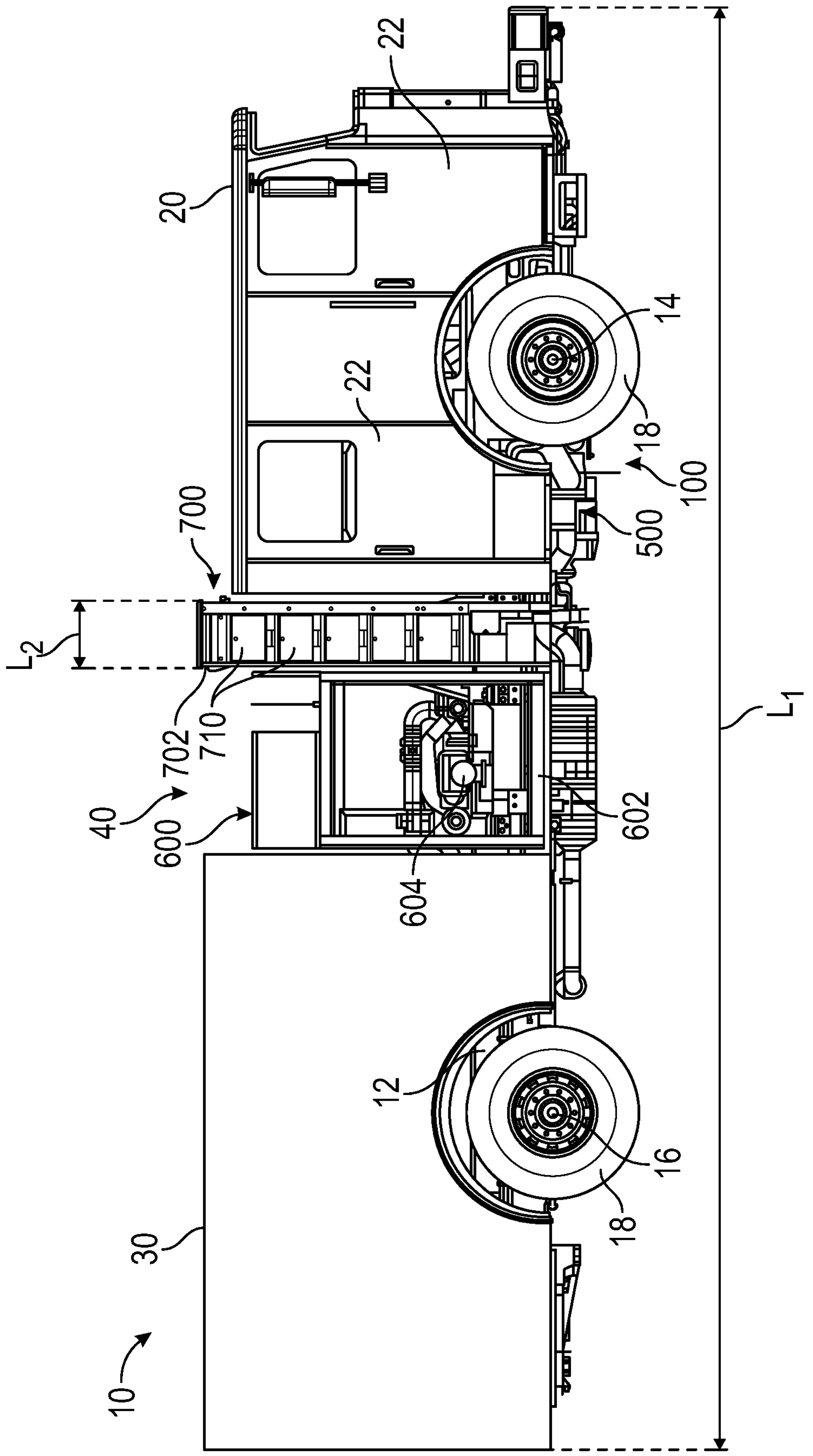
FIG. 5 is a right side view of the fire fighting vehicle of FIG. 1, according to an exemplary embodiment.
Figure 6:
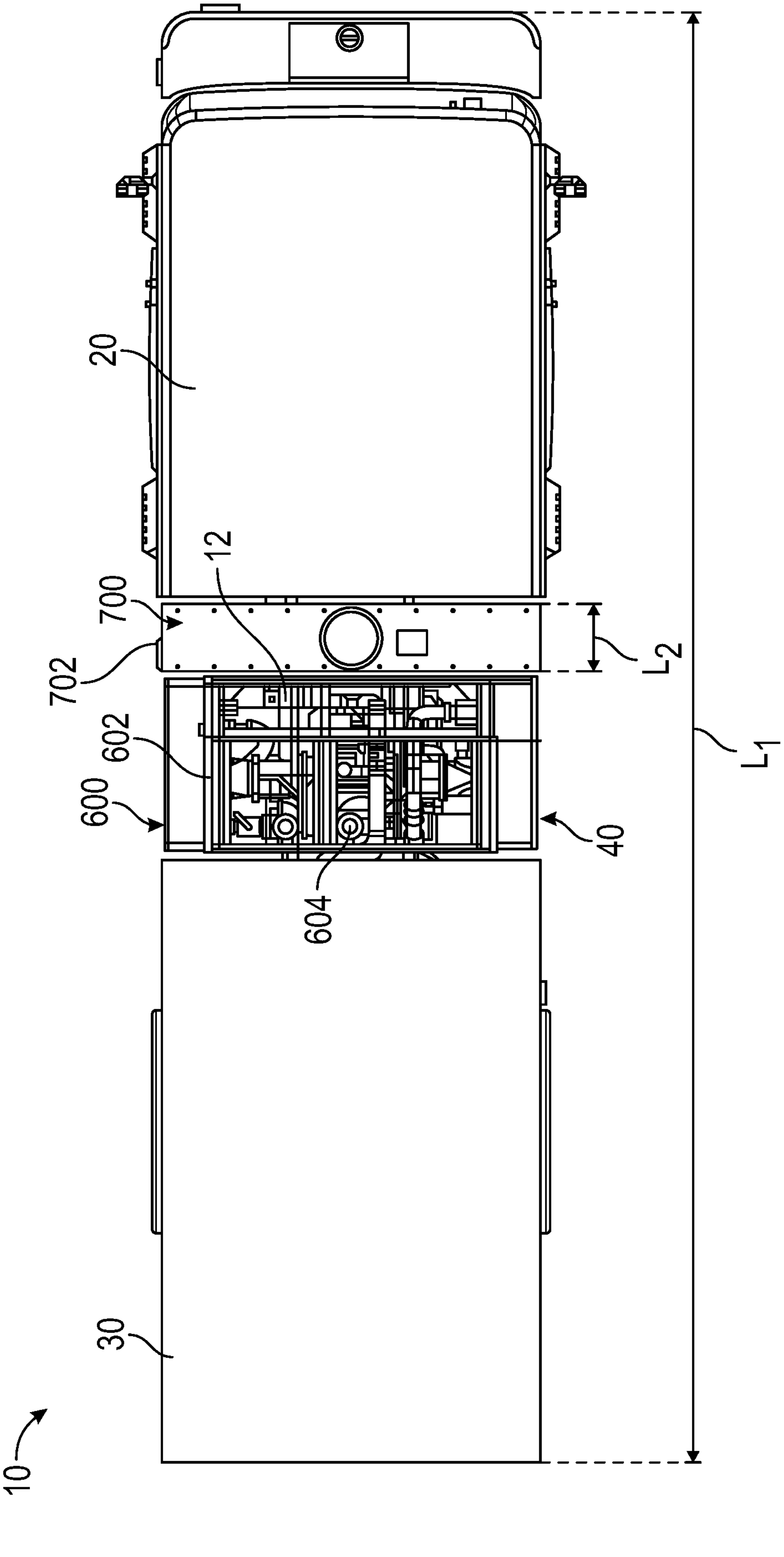
FIG. 6 is a top view of the fire fighting vehicle of FIG. 1, according to an exemplary embodiment.

As shown in FIG. 3, the vehicle 10 has an overall height $H_1$ and the support rack 702 has an overall height $H_2$ that is greater than $H_1$ such that at least a portion of the support rack 702 (e.g., the top panel 708) extends above the front cabin 20. Such an arrangement causes airflow above the front cabin 20 to flow directly to the cooling radiator 732 to allow for maximum performance of the ESS cooling system 730. In other embodiments (e.g., embodiments where the battery packs 710 are otherwise located or arranged, etc.), the cooling radiator 732 is otherwise positioned. According to an exemplary embodiment, the ESS cooling system 730 is positioned separate and independent from the engine cooling system 210. In other embodiments, at least a portion of the ESS cooling system 730 (e.g., the cooling radiator 732, etc.) is co-located with the engine cooling system 210. In still other embodiments, one or more components of the ESS cooling system 730 and the engine cooling system 210 are shared (e.g., the engine radiator and the cooling radiator 732 are one in the same, etc.).

Figure 24:
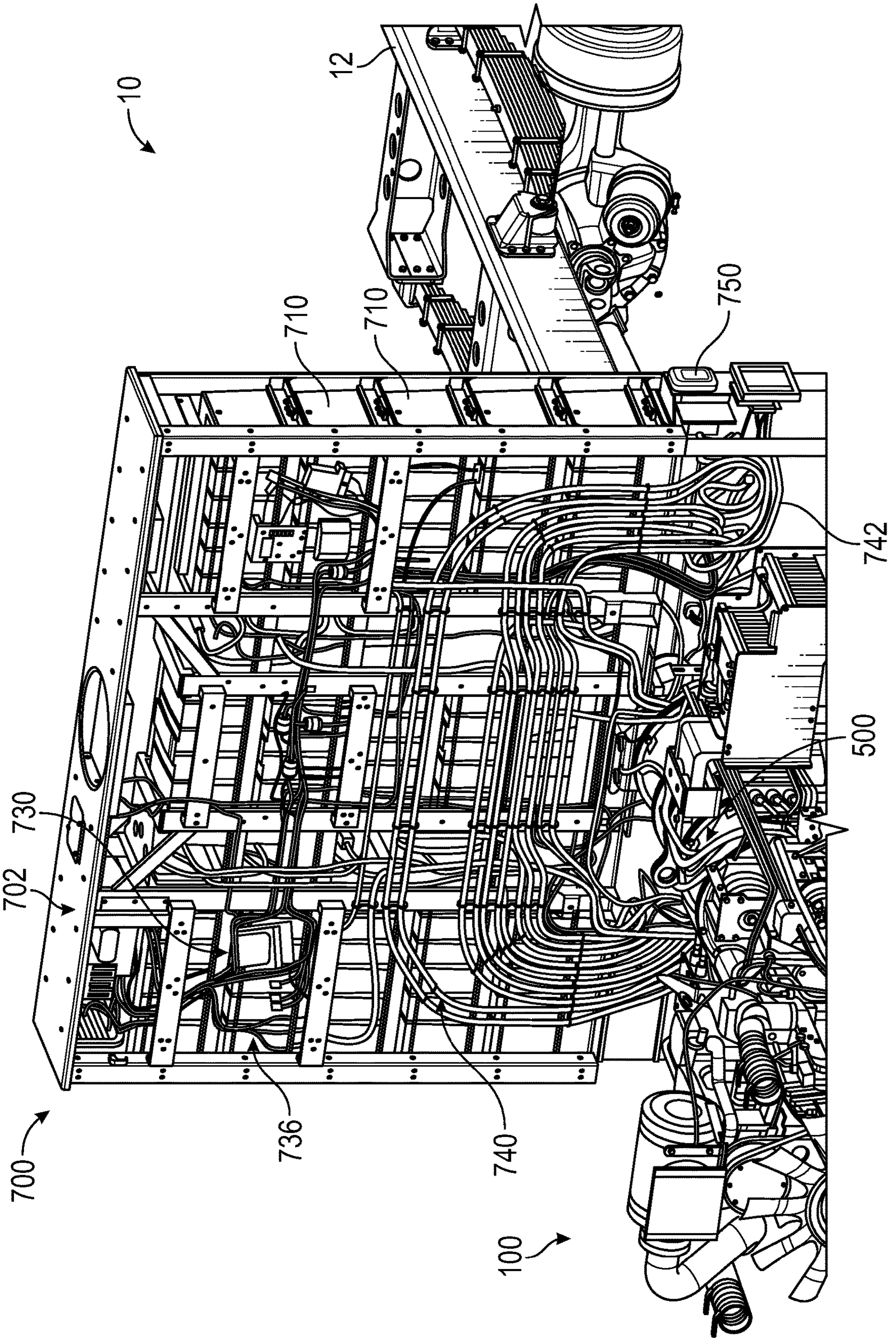
Figure 25:
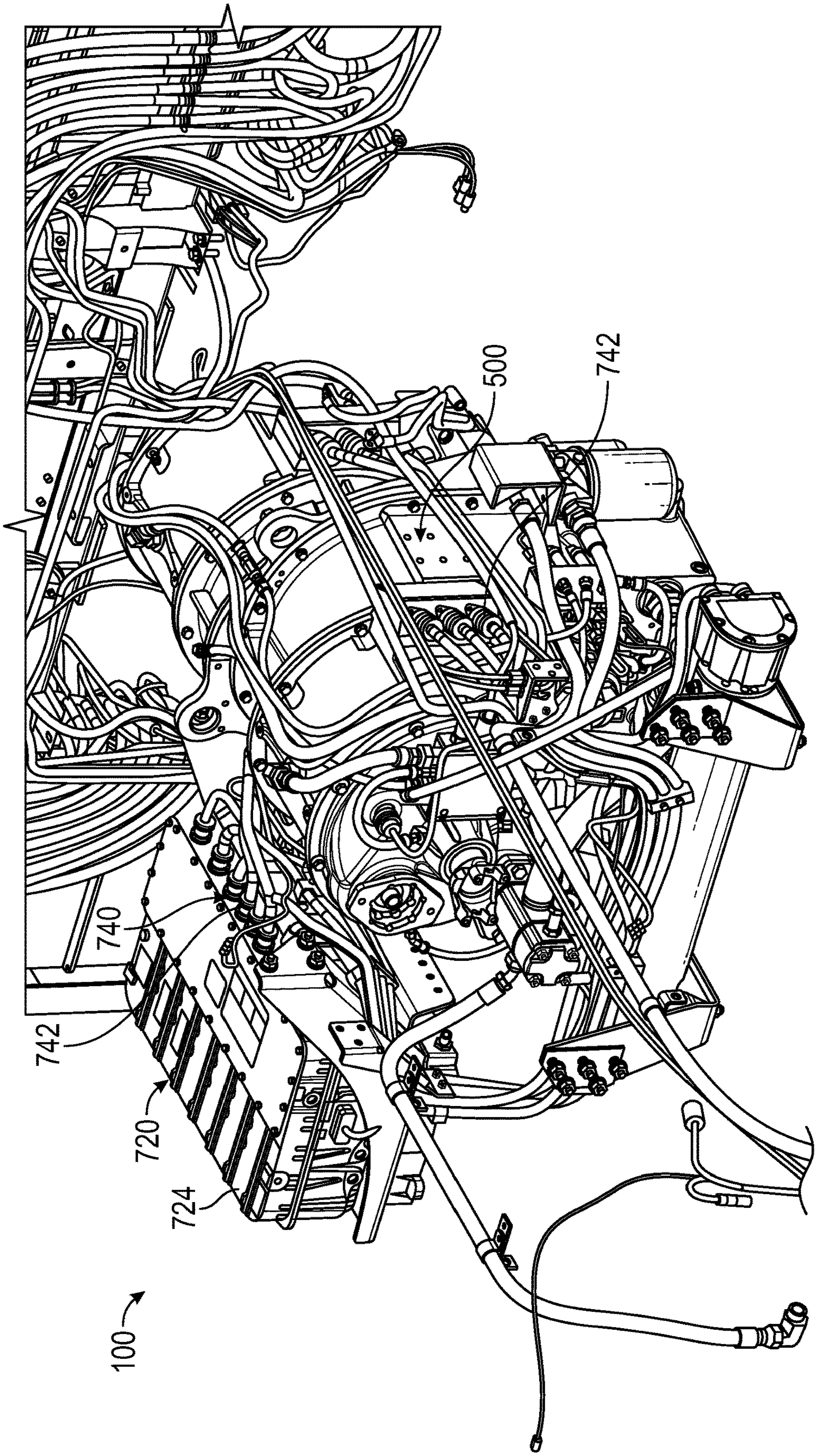
Figure 26:
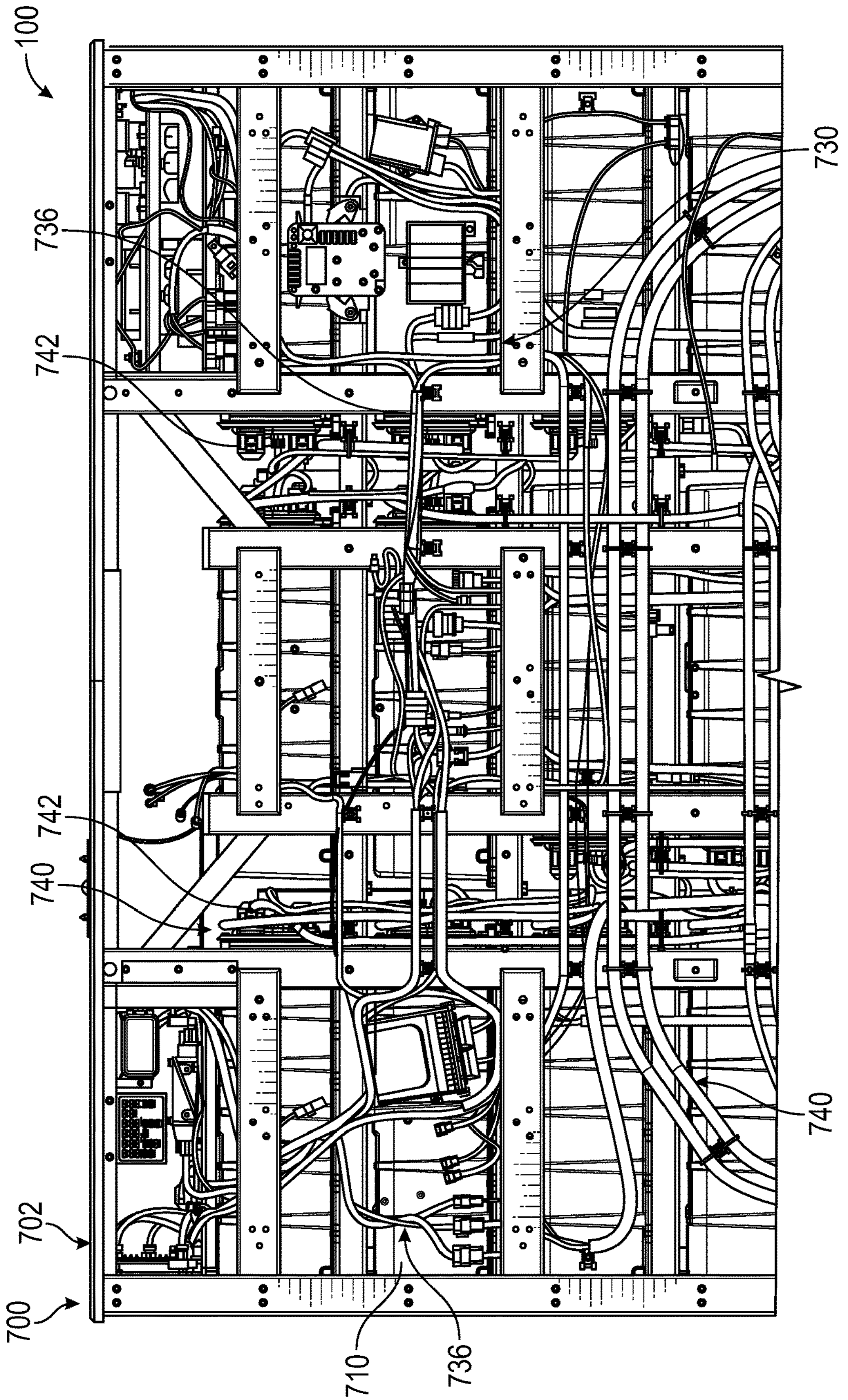

As shown in FIGS. 23-26, the high voltage wiring assembly 740 includes a plurality of high voltage wires, shown as high voltage wires 742, electrically connecting various electrically-operated components of the vehicle 10 to the battery packs 710. Specifically, as shown in FIGS. 23-25, the battery packs 710 are electrically connected to the ETD 500, the inverter 724, and the high voltage charging system 750 by the high voltage wires 742. The battery packs 710 may be charged by an external source (e.g., a high voltage power source, etc.) via the high voltage charging system 750 (e.g., via a port thereof, etc.). According to an exemplary embodiment, the ETD 500 draws stored energy in the battery packs 710 via the high voltage wires 742 to facilitate operation thereof. In some embodiments, the ETD 500 does not charge the battery packs 710 with energy generated thereby. In other embodiments, the ETD 500 is operable to charge the battery packs 710 with the energy generated thereby. It should be understood that the battery packs 710 may power additional components of the vehicle 10 (e.g., lights, sirens, communication systems, displays, electric accessories, electric motors, etc.).

Centralized Energy Storage System

According to the exemplary embodiment shown in FIGS. 49-75, the ESS 700 is configured as a centralized ESS or high voltage enclosure where substantially all of the high voltage components and substantially all of the high voltage wiring for the vehicle 10 are contained within the housing of the ESS 700 with substantially short power runs of high voltage wiring extending out of the housing to the ETD 500.

As shown in FIGS. 49-55, the ESS 700 includes a frame assembly, shown as rack 1300, having a first side, shown as front side 1302, facing towards a front of the vehicle 10, an opposing second side, shown as rear side 1304, facing towards a rear of the vehicle 10, a first end, shown as left end 1306, and an opposing second end, shown as right end 1308. As shown in FIGS. 49-52, the rack 1300 is manufactured using a plurality of frame elements or members including a frame base, shown as base 1310; a plurality of vertical frame members, shown as vertical supports 1320, extending upward from the base 1310; and an upper frame portion, shown as upper frame assembly 1330, coupled to the vertical supports 1320 opposite the base 1310.

Figure 49:
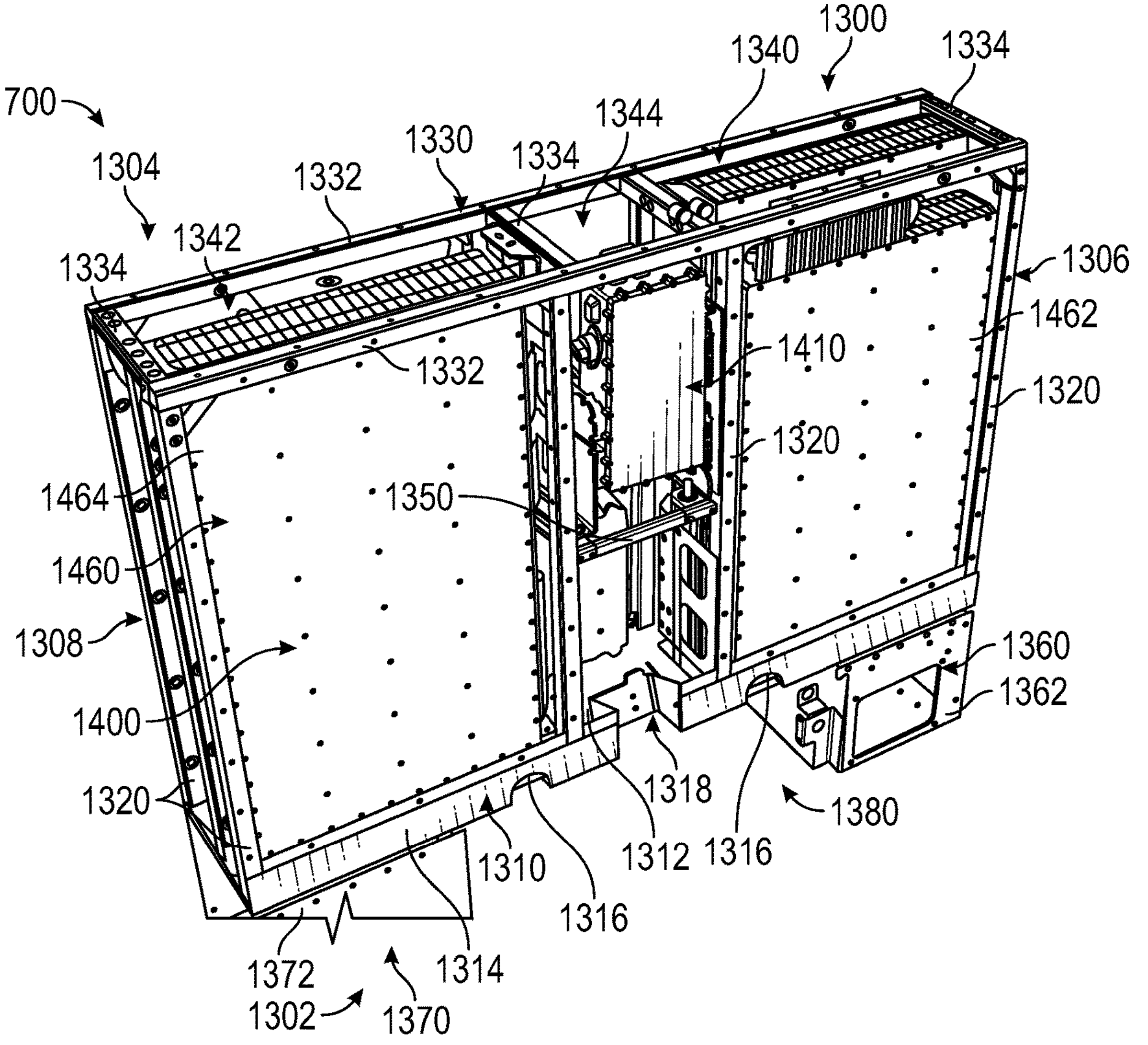
FIGS. 49-57 are various detailed views of the energy storage system of the driveline of FIG. 7, according to another exemplary embodiment.
Figure 50:
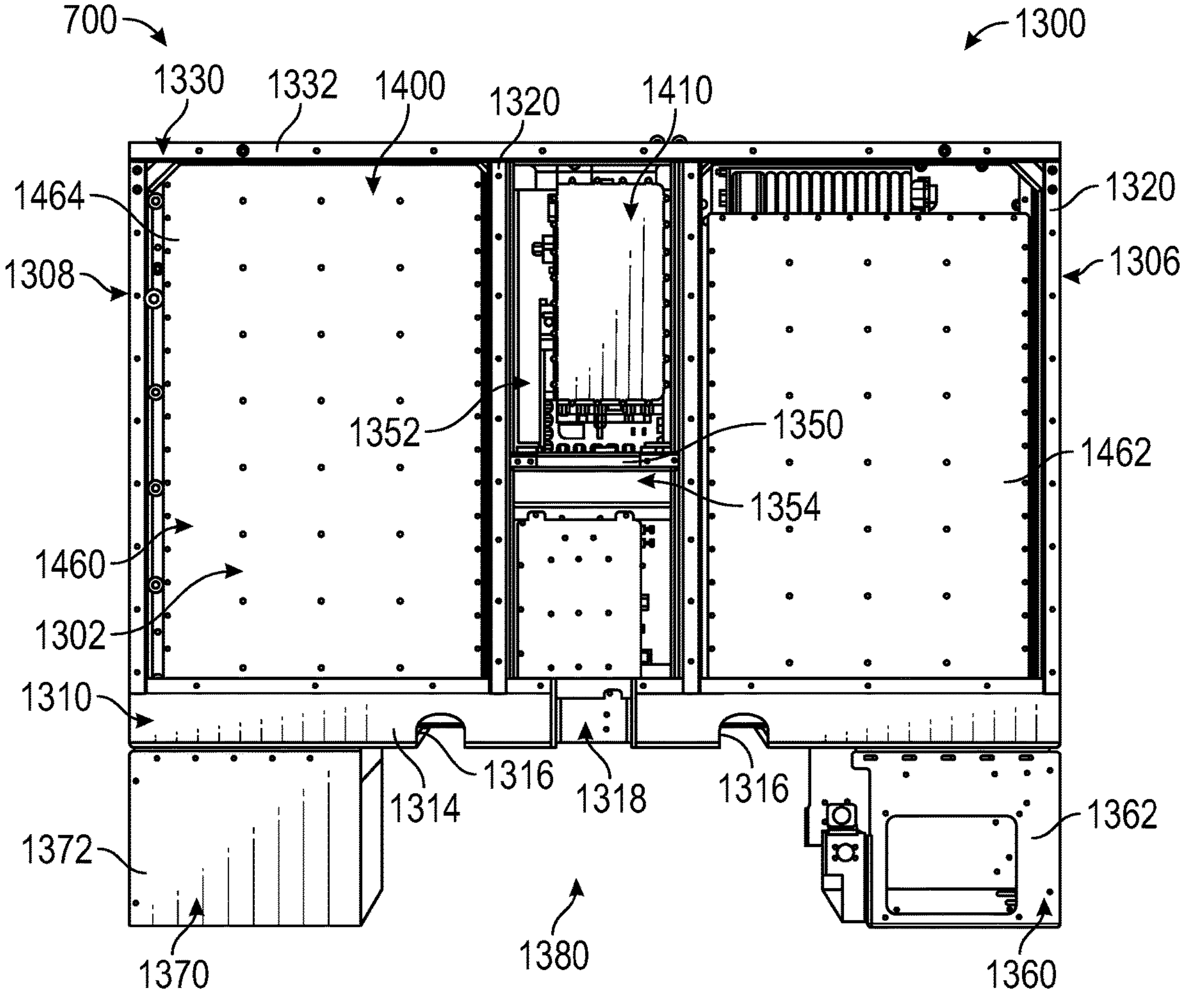
Figure 51:
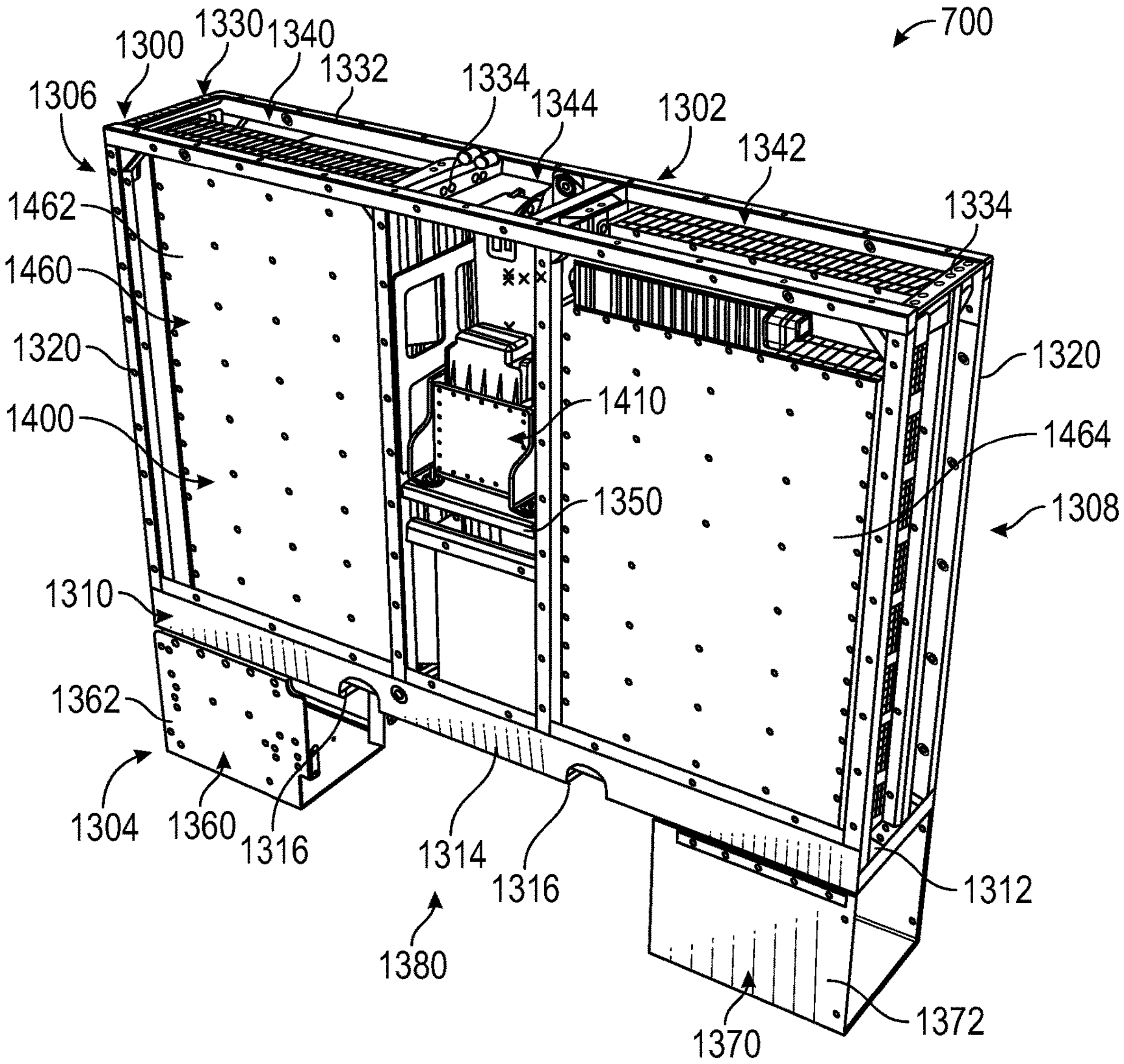
Figure 52:
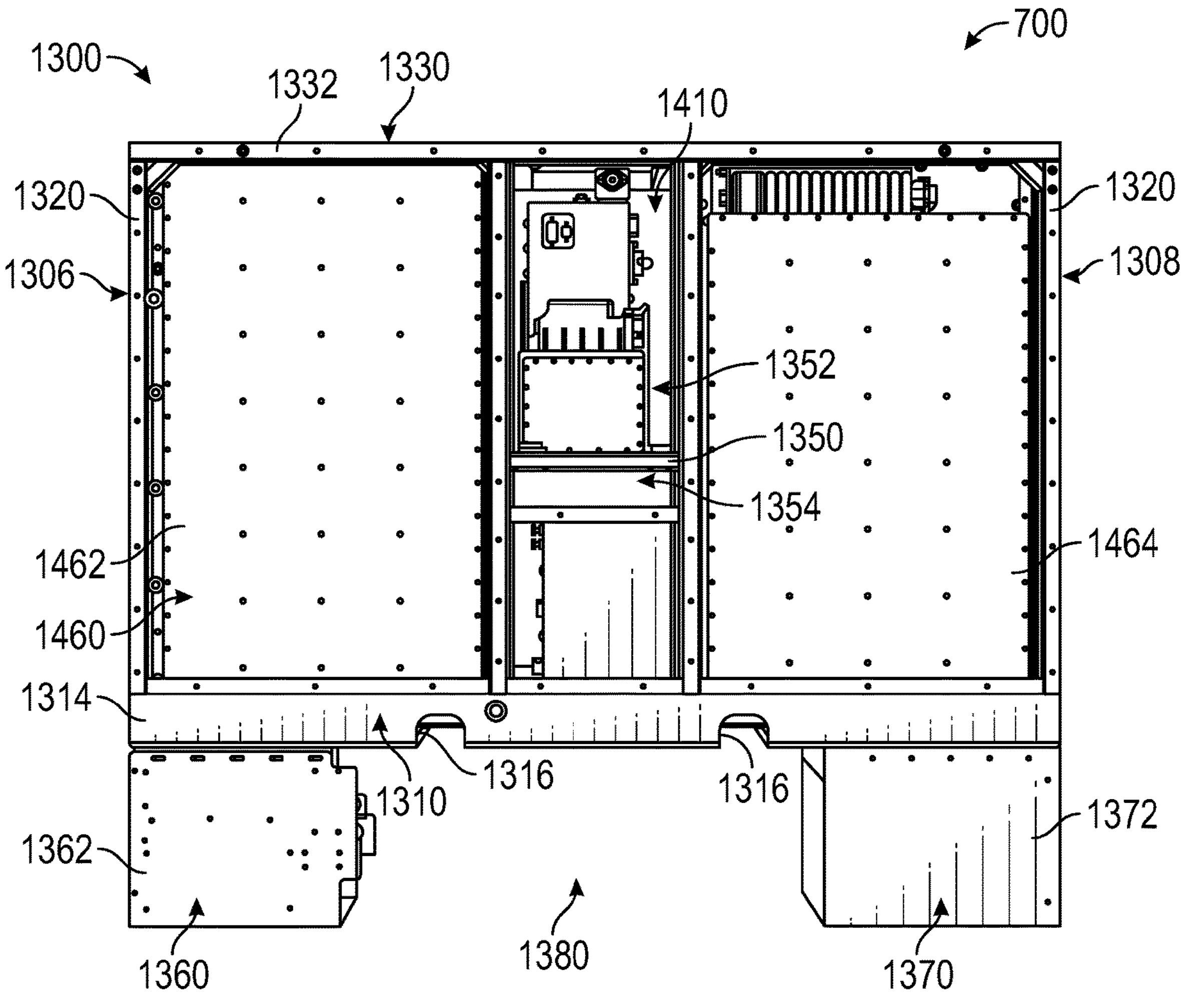

As shown in FIGS. 49-52, the base 1310 includes a bottom plate, shown as rack floor 1312, having flanges, shown as lips 1314, extending upward from the rack floor 1312 along the width of the front side 1302 and the rear side 1304 of the base 1310. Each of the lips 1314 defines a pair of notches, shows as frame recesses 1316, configured to receive the frame rails of the frame 12 of the vehicle 10 (see, e.g., FIG. 68). As shown in FIGS. 49 and 50, the lip 1314 and the rack floor 1312 at the front side 1302 of the base 1310 (i.e., at the lower front edge thereof) cooperatively define a recess, notch, or cutout, shown as high voltage wiring channel 1318, that facilitates the passage of high voltage wiring or cables out of the ESS 700 (see, e.g., FIG. 68), as described in greater detail herein.

As shown in FIGS. 49-52, the upper frame assembly 1330 includes (a) lateral frame elements, shown as upper lateral frame supports 1332, extending laterally across the front side 1302 and the rear side 1304 of the rack 1300 and coupled to the vertical supports 1320, and (b) upper cross-members, shown as upper cross-supports 1334, extending between the upper lateral frame supports 1332. As shown in FIGS. 49, 51, 53, and 55, the various supports of the rack 1300 (e.g., the vertical supports 1320, the upper cross-supports 1334, etc.) sub-divide the interior cavity or chamber of the rack 1300 into (a) a first portion, shown as left portion 1340, positioned at the left end 1306 of the rack 1300, (b) a second portion, shown as right portion 1342, positioned at the right end 1308 of the rack 1300, and (c) a third portion, shown center portion 1344, positioned between the left portion 1340 and the right portion 1342. As shown in FIGS. 49-52, the rack 1300 includes a center divider, shown as center support 1350, extending between the vertical supports 1320 positioned about the center portion 1344 and dividing the center portion 1344 into a first portion, shown as upper portion 1352, and a second portion, shown as lower portion 1354.

As shown in FIGS. 49-57, the ESS 700 includes (a) a first stowage box, shown as left stowage box 1360, having a first housing, shown as left stowage box housing 1362, coupled to the base 1310 of the rack 1300 proximate the left end 1306 thereof and extending downward therefrom and (b) a second stowage box, shown as right stowage box 1370, having a second housing, shown as right stowage box housing 1372, coupled to the base 1310 of the rack 1300 proximate the right end 1308 thereof and extending downward therefrom. As shown in FIGS. 49-52, the left stowage box 1360 and the right stowage box 1370 as spaced from each other such that a gap, shown as frame gap 1380, is defined therebetween to accommodate the frame rails of the frame 12 when the ESS 700 is coupled to and supported by the frame 12 (see, e.g., FIGS. 68-70) such that frame rails pass between the left stowage box 1360 and the right stowage box 1370.

As shown in FIGS. 49-70, the ESS 700 includes a power system, shown as power assembly 1400, disposed within and supported by the rack 1300, the left stowage box 1360, and the right stowage box 1370. As shown in FIGS. 49-55 and 58-66, the power assembly 1400 includes a distribution system, shown as power distribution system 1410, supported by the center support 1350 and positioned within the upper portion 1352 of the center portion 1344 of the rack 1300. As shown in FIGS. 58-66, the power distribution system 1410 includes a power distributer, shown as power distribution unit ("PDU") 1420, a connection assembly, shown as bus system 1440, and a first inverter, shown as high voltage inverter 1450, coupled to the PDU 1420 by the bus system 1440.

Figure 62:
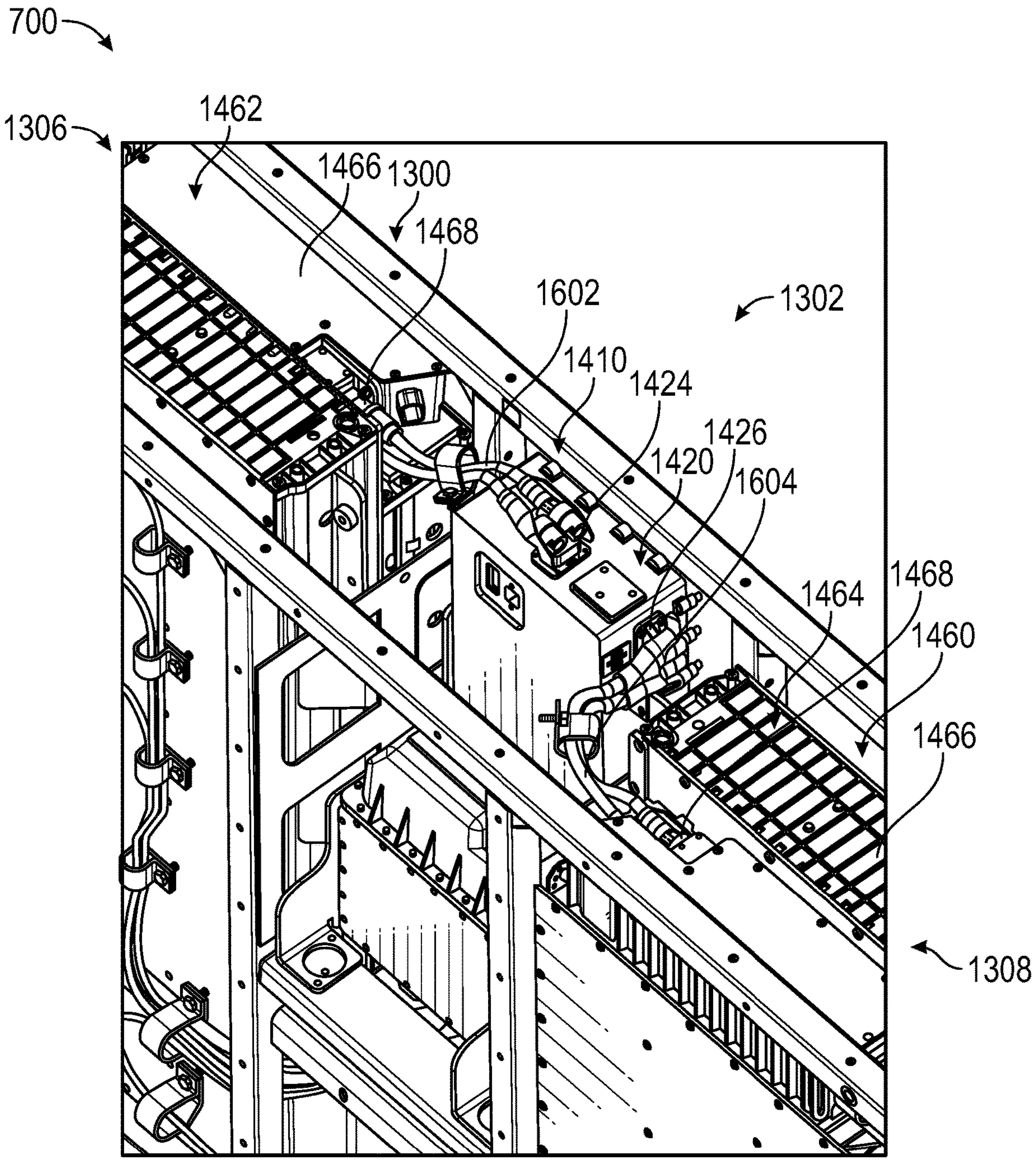
Figure 63:
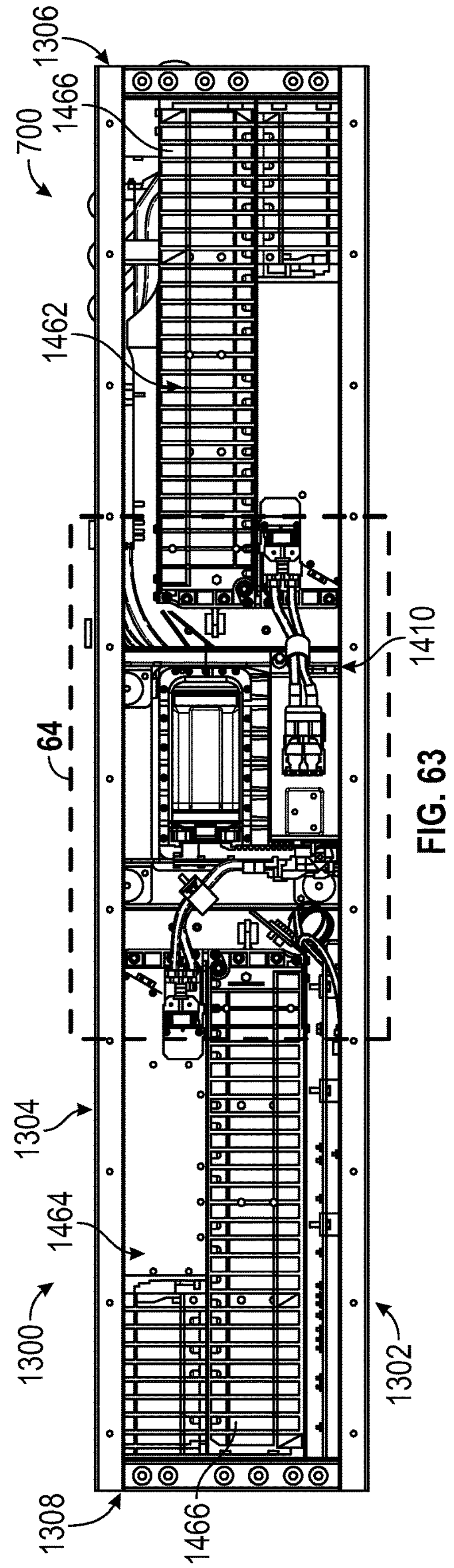
Figure 64:
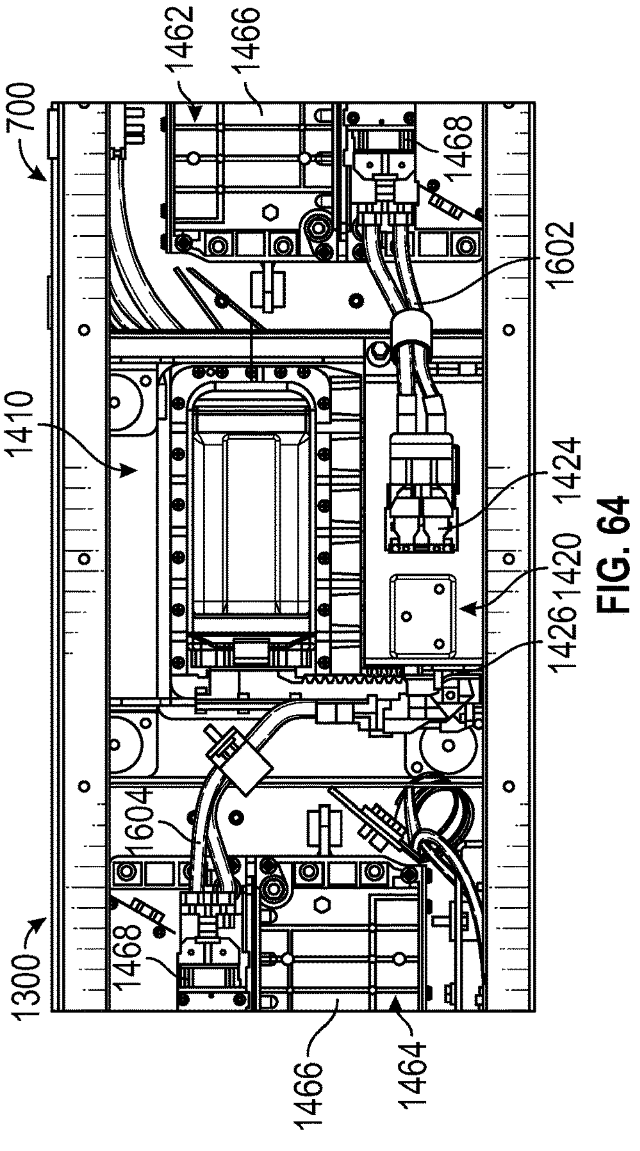

As shown in FIGS. 49-55 and 62-67, the power assembly 1400 includes an energy storage assembly, shown as battery pack assembly 1460. The battery pack assembly 1460 includes (a) a first battery pack, shown as left battery pack 1462, positioned within and supported by the left portion 1340 of the rack 1300 and (b) a second battery pack, shown as right battery pack 1464, positioned within and supported by the right portion 1342 of the rack 1300 such that the power distribution system 1410 (i.e., the PDU 1420, the high voltage inverter 1450) is positioned between the left battery pack 1462 and the right battery pack 1464. As shown in FIGS. 62-64, each of the left battery pack 1462 and the right battery pack 1464 includes a housing, shown as battery pack housing 1466, and an interface (e.g., an output, an input, a port, etc.), shown as battery pack interface 1468, positioned along or proximate a top of the battery pack housing 1466. According to an exemplary embodiment, the battery pack assembly 1460 includes a plurality of batteries or battery cells disposed within and vertically stacked within the battery pack housing 1466 of each of the left battery pack 1462 and the right battery pack 1464.

According to an exemplary embodiment, (a) the left battery pack 1462 is offset towards or positioned closer to the front side 1302 of the rack 1300 such that various components of the power assembly 1400 can be positioned within a first space of the left portion 1340 of the rack 1300 behind the left battery pack 1462 and (b) the right battery pack 1464 is offset towards or positioned closer to the rear side 1304 of the rack 1300 such that various components of the power assembly 1400 can be positioned within a second space of the right portion 1342 of the rack 1300 in front of the right battery pack 1464. In other embodiments, the left battery pack 1462 if offset towards or positioned closer to the rear side 1304 of the rack 1300 and the right battery pack 1464 is offset towards or positioned closer to the front side 1302 of the rack 1300. In still other embodiments, the left battery pack 1462 and the right battery pack 1464 are both offset towards or positioned closer to the rear side 1304 of the rack 1300 or the front side 1302 of the rack 1300. In yet other embodiments, the left battery pack 1462 and the right battery pack 1464 are centered between the front side 1302 and the rear side 1304 of the rack 1300.

Figure 53:
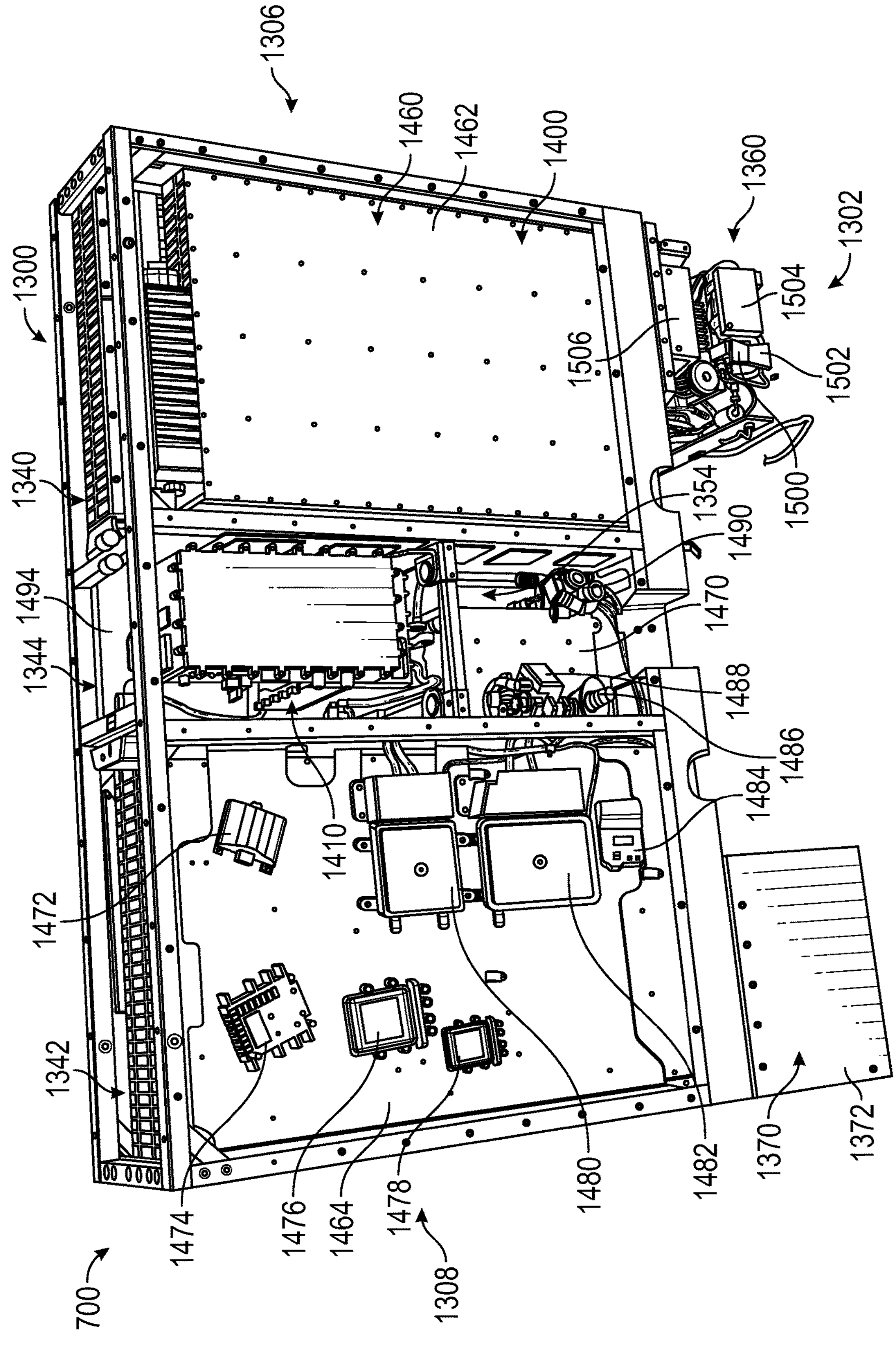
Figure 54:
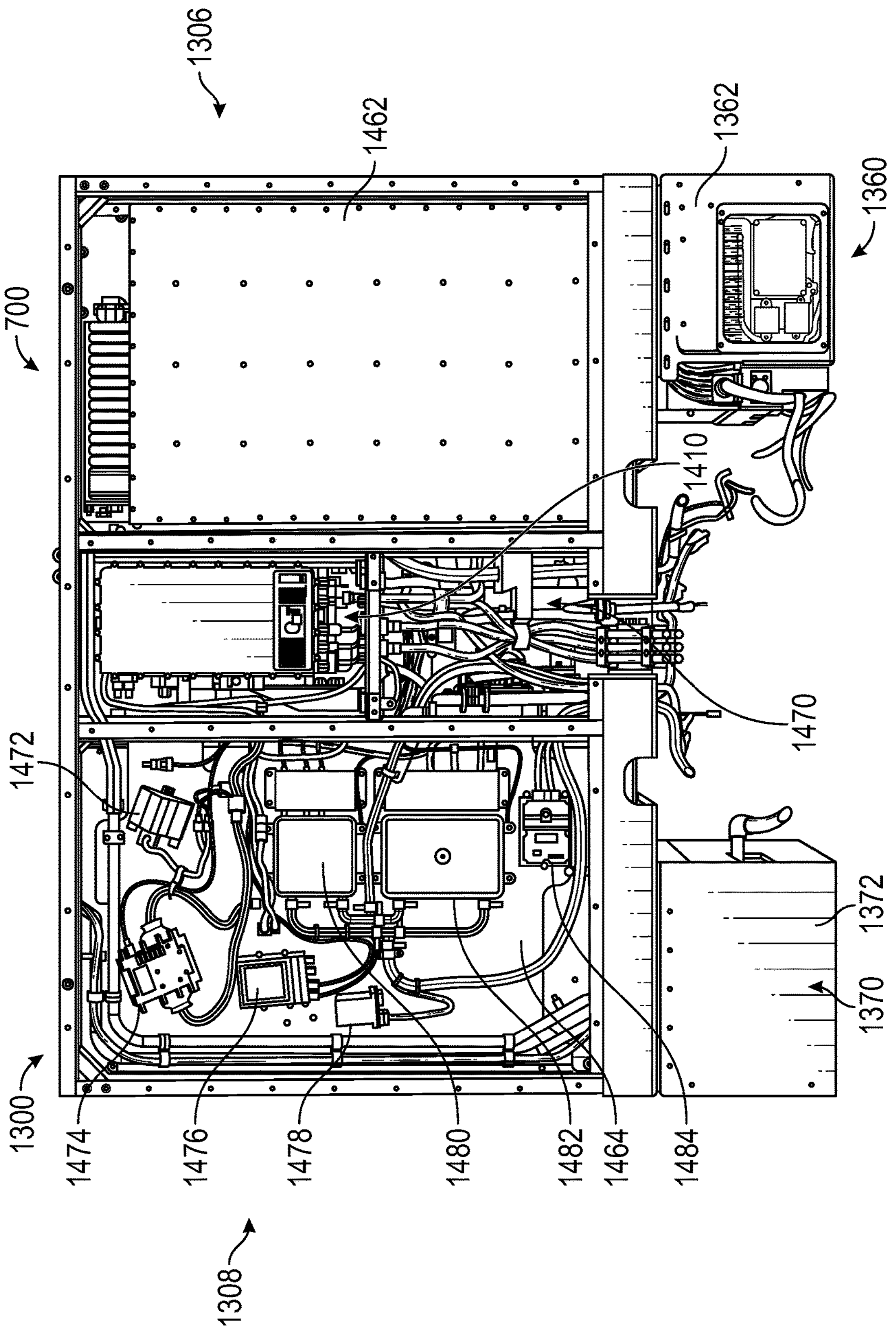
Figure 55:
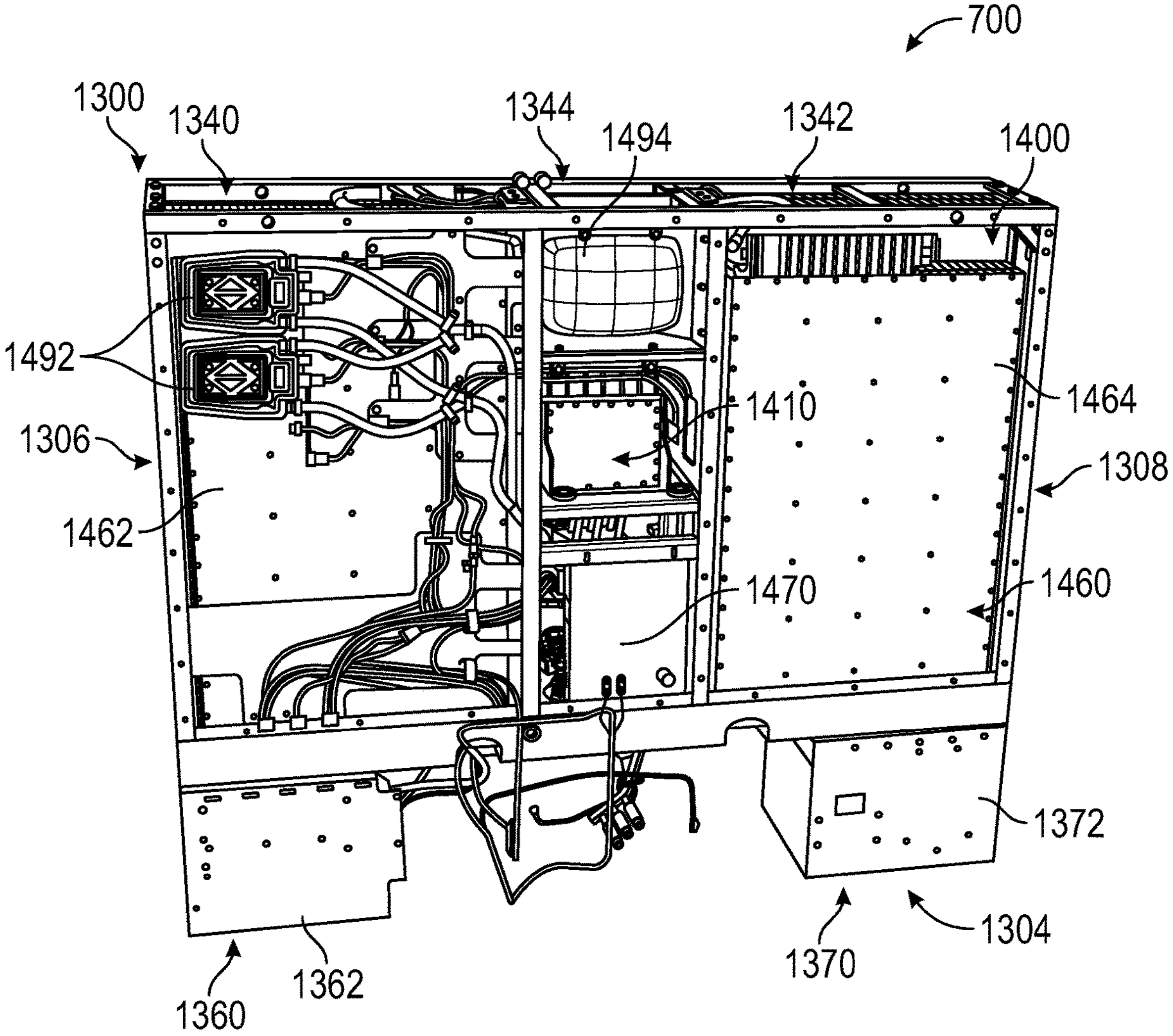

As shown in FIGS. 53-55, the power assembly 1400 includes (a) a charger 1470, a first coolant pump 1486, a second coolant pump 1488, and high voltage heater pump 1490 positioned in the lower portion 1354 of the center portion 1344, (b) a high voltage DC controller 1472, a wireless controller module 1474 (e.g., 3G, 4G, 5G, etc.), an input/output ("IO") module 1476, a power module 1478, a first DC-to-DC converter 1480 (e.g., a 2500 Watt ("W") DC-to-DC converter), a second DC-to-DC converter 1482 (e.g., a 4000 W DC-to-DC converter), and an ETD controller 1484 positioned in the right portion 1342 of the rack 1300 and coupled to a front panel positioned in front of the right battery pack 1464 or directly coupled to a front side of the housing of the right battery pack 1464, and (c) a plurality of high voltage cab heaters 1492 positioned in the left portion 1340 of the rack 1300 and coupled to a rear panel positioned behind the left battery pack 1462 or directly coupled to a rear side of the housing of the left battery pack 1462. As shown in FIG. 55, the ESS 700 includes a reservoir or tank, shown as coolant reservoir 1494, positioned in the upper portion 1352 of the center portion 1344 behind the PDU 1420. The various components of the power assembly 1400 disposed within the rack 1300 may be referred to herein as "electrically-operated components," "electric components," or "electric accessories."

Figure 56:
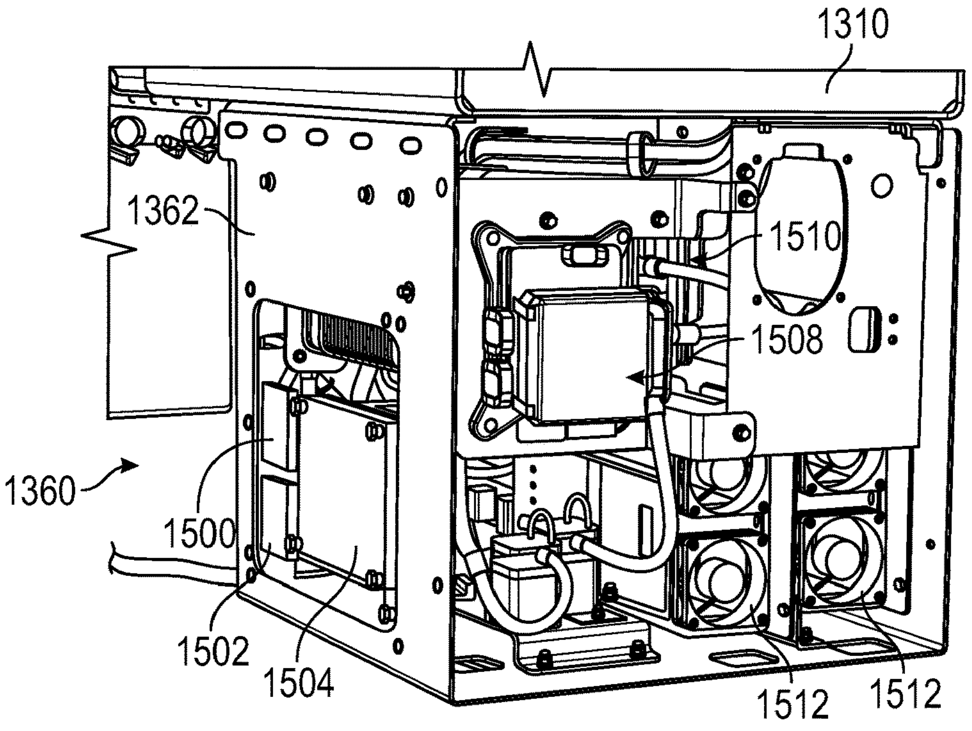
Figure 57:
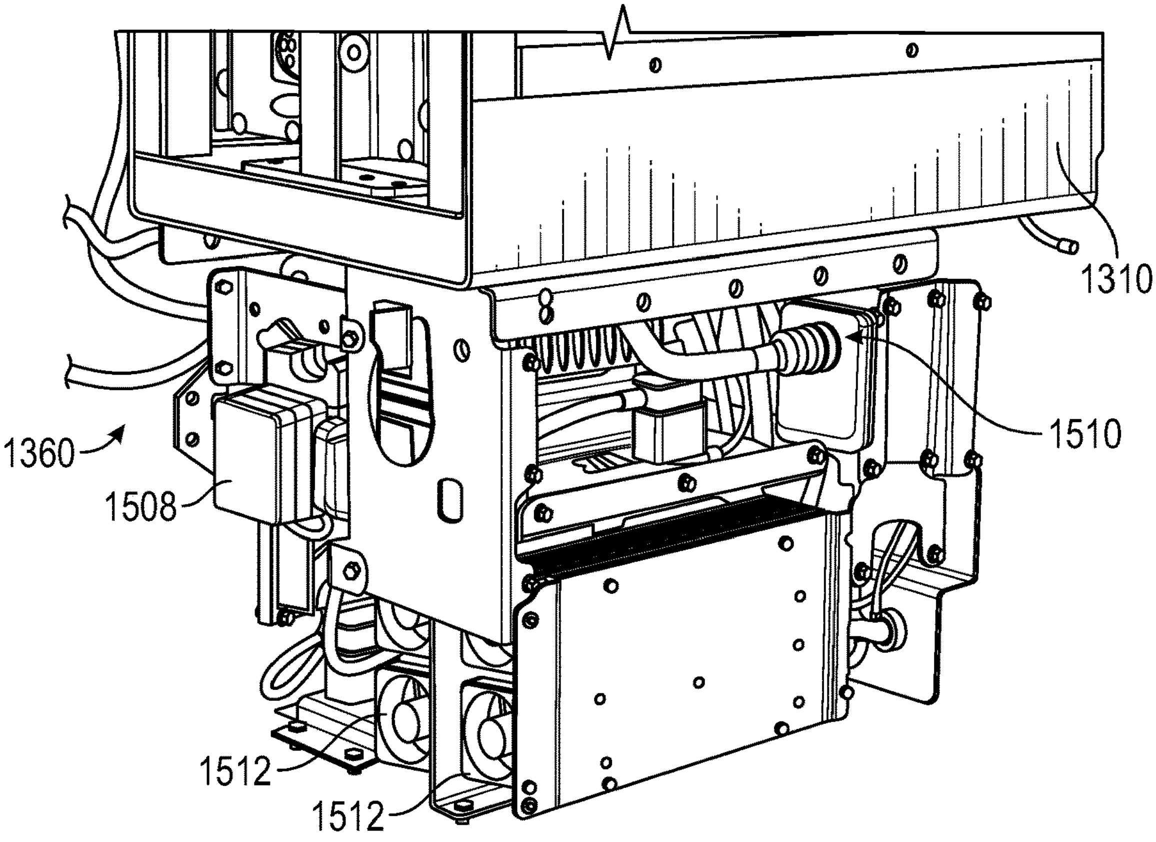

As shown in FIGS. 53, 56, and 57, the power assembly 1400 includes a plurality of components disposed within the left stowage box housing 1362 of the left stowage box 1360 including a vehicle interface IO module 1500, a high voltage interlock ("HVIL") monitoring IO module 1502, a low voltage inverter 1504 (e.g., a 24 V inverter, to convert the high voltage power to low voltage power equal to or less than 24 V, etc.), one or more battery equalizers 1506, a multiplexed vehicle electrical center ("mVEC") power module 1508, an AC charger 1510, and one or more battery chargers 1512. According to an exemplary embodiment, the power assembly 1400 includes a battery thermal management assembly disposed within the right stowage box housing 1372 of the right stowage box 1370. The battery thermal management assembly may include a pump, a chiller, LCON, a compressor, etc.

Figure 58:
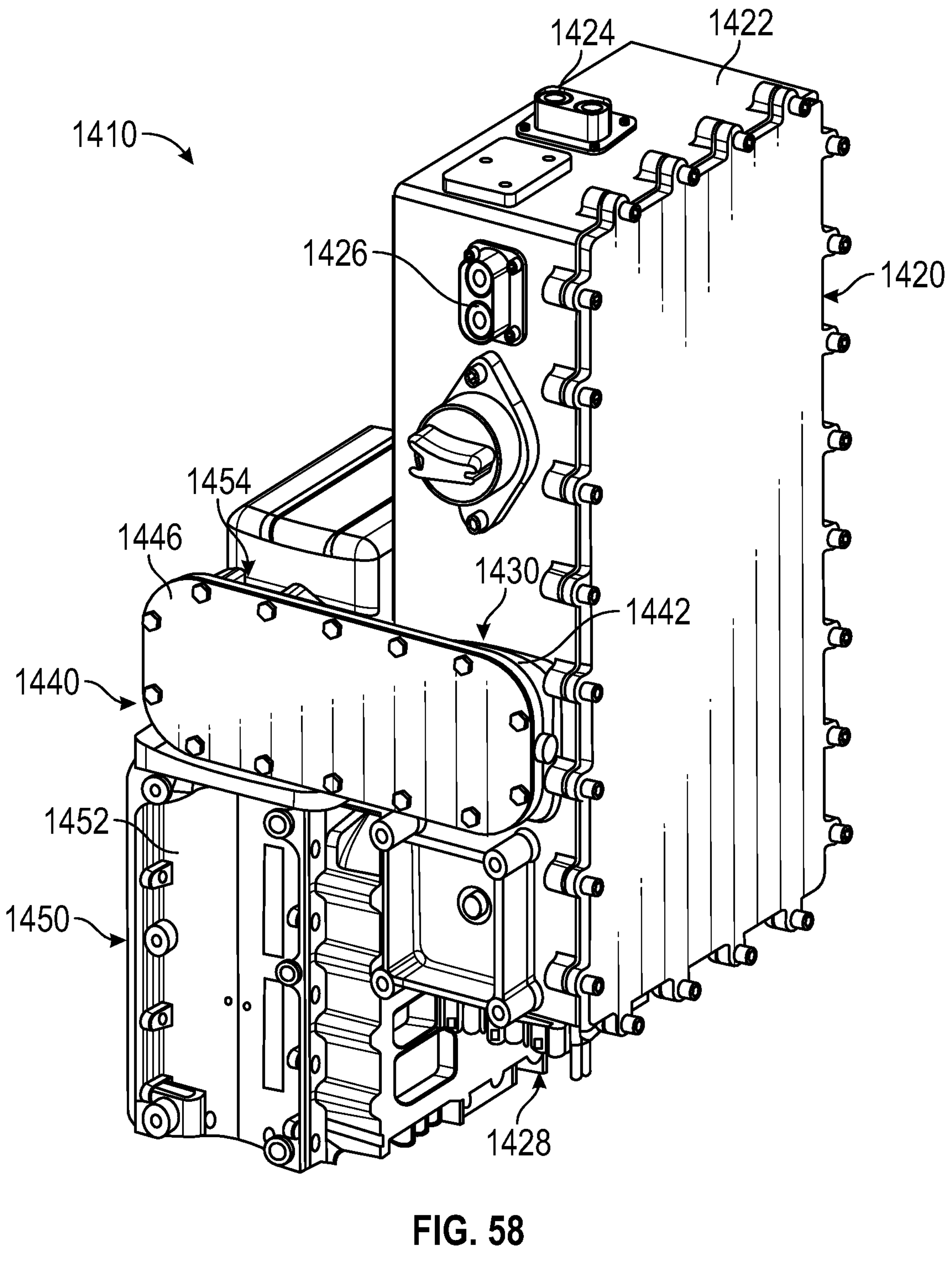
FIGS. 58-70 are various detailed views of a power distribution system of the energy storage system of FIGS. 49-57, according to an exemplary embodiment.
Figure 59:
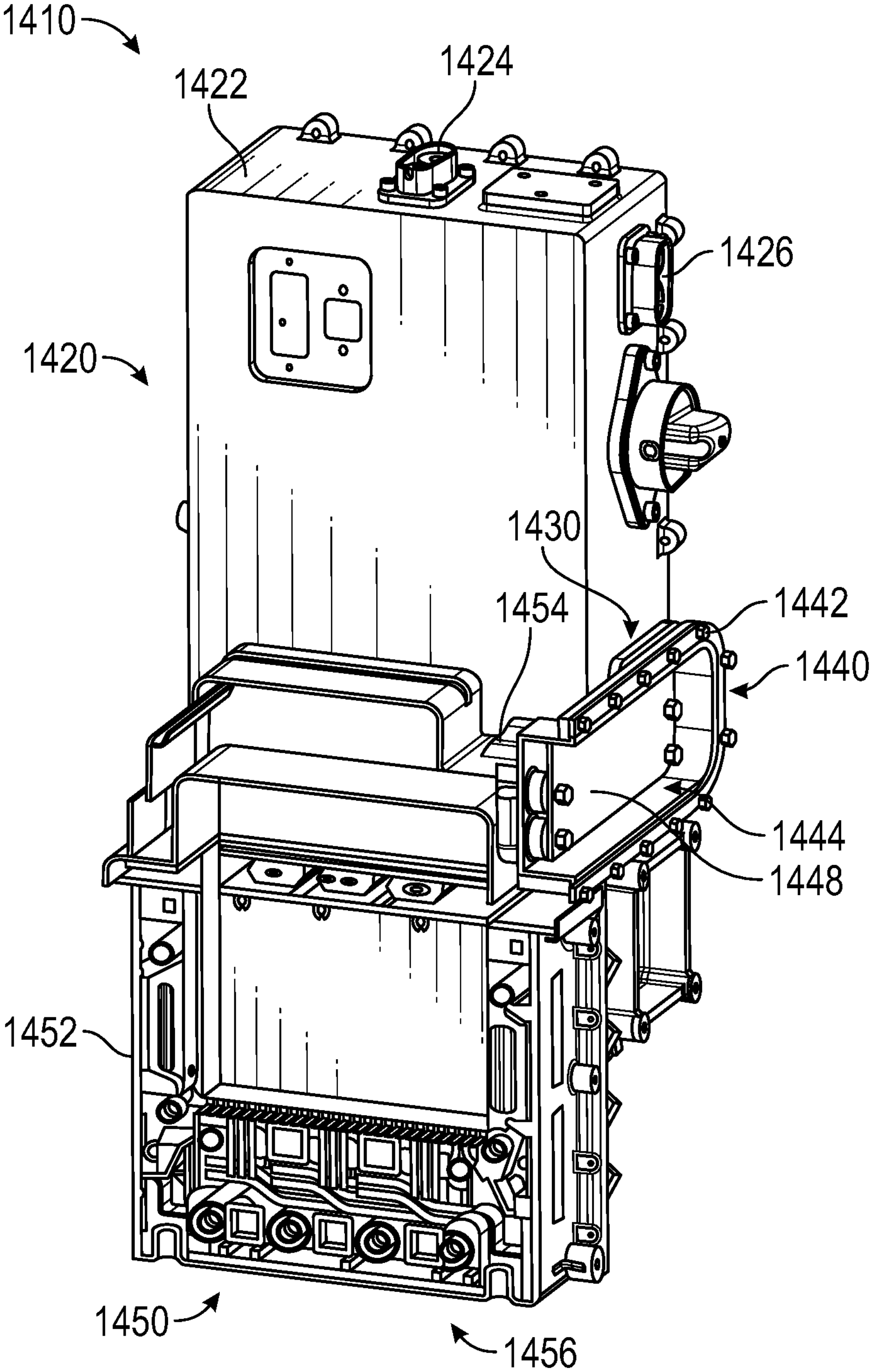
Figure 60:
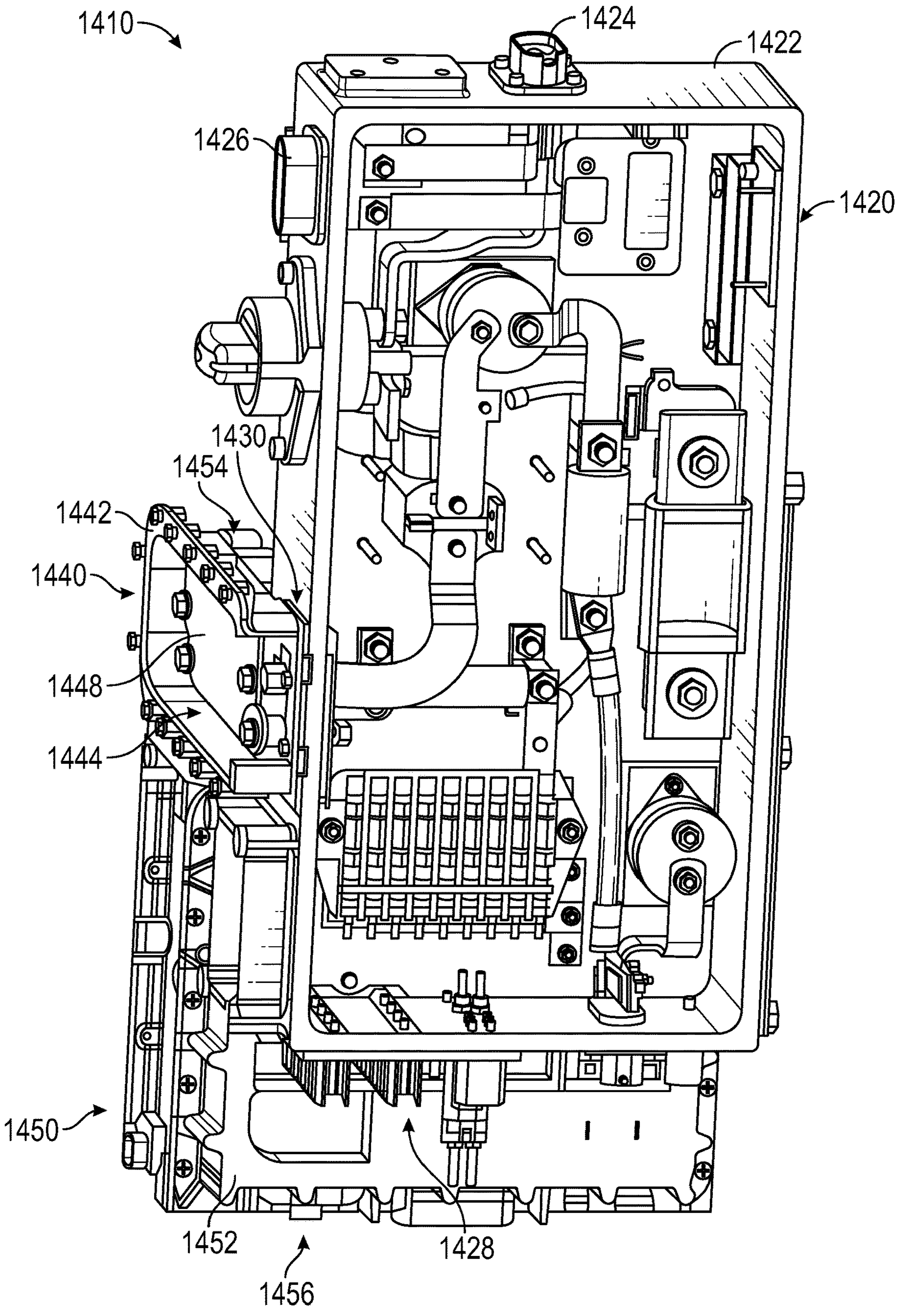

As shown in FIGS. 58-63, the PDU 1420 includes a housing, shown as PDU housing 1422, having, defining, or including (a) a first power interface, shown as first battery interface 1424, positioned along a top of the PDU housing 1422, (b) a second power interface, shown as second battery interface 1426, positioned along a right side of the PDU housing 1422, (c) a plurality of third power interfaces, shown as high voltage direct current ("DC") interfaces 1428, positioned along a bottom of the PDU housing 1422, and (d) a fourth power interface, shown as bus interface 1430, positioned along the right side of the PDU housing 1422 beneath the second battery interface 1426. As shown in FIGS. 58-60, 65, and 67, the high voltage inverter 1450 includes a housing, shown as inverter housing 1452, having, defining, or including (a) a first power interface, shown as bus interface 1454, positioned along the right side of the inverter housing 1452 and (b) a plurality of second power interfaces, shown as high voltage alternating current ("AC") interfaces 1456, positioned along a bottom of the inverter housing 1452. As shown in FIGS. 58-60, the bus system 1440 includes (a) a housing, shown as bus housing 1442, defining an interior chamber, shown as bus interior 1444, and coupled to and extending between the bus interface 1430 of the PDU 1420 and the bus interface 1454 of the high voltage inverter 1450, (b) an end plate, shown as bus cover 1446, coupled to the bus housing 1442 to selectively enclose the bus interior 1444, and (c) a connector (e.g., a plate, a bar, a cable, a wire, etc.), shown as bus bar 1448, extending between electrical contacts at the bus interface 1430 of the PDU 1420 and the bus interface 1454 of the high voltage inverter 1450 to electrically couple the PDU 1420 to the high voltage inverter 1450. Accordingly, the bus system 1440 provides a sealed and secure connection between the PDU 1420 and the high voltage inverter 1450. In other embodiments, the PDU 1420 and the high voltage inverter 1450 are electrically coupled using one or more high voltage cables or wires.

As shown in FIGS. 61-70, the power distribution system 1410 includes a first high voltage wiring assembly, shown as high voltage DC wiring harness 1600, and a second high voltage wiring assembly, shown as high voltage AC wiring harness 1620. As shown in FIGS. 61-66, the high voltage DC wiring harness 1600 includes (a) first connectors, shown as left battery pack cables 1602, extending from the battery pack interface 1468 of the left battery pack 1462 to the first battery interface 1424 of the PDU 1420 and (b) second connectors, shown as right battery pack cables 1604, extending from the battery pack interface 1468 of the right battery pack 1464 to the second battery interface 1426 of the PDU 1420. According to an exemplary embodiment, the distance between each of (a) the battery pack interface 1468 of the left battery pack 1462 and the first battery interface 1424 of the PDU 1420 and (b) the battery pack interface 1468 of the right battery pack 1464 and the second battery interface 1426 of the PDU 1420 is less than twenty-four inches (e.g., less than eighteen inches) such that the left battery pack cables 1602 and the right battery pack cables 1604 can each be less than about twenty-four inches in total length (e.g., about eighteen inches in length, less than eighteen inches in length, etc.). According to an exemplary embodiment, the left battery pack cables 1602 and the right battery pack cables 1604 are positioned entirely within the rack 1300 and do not extend externally therefrom.

Figure 61:
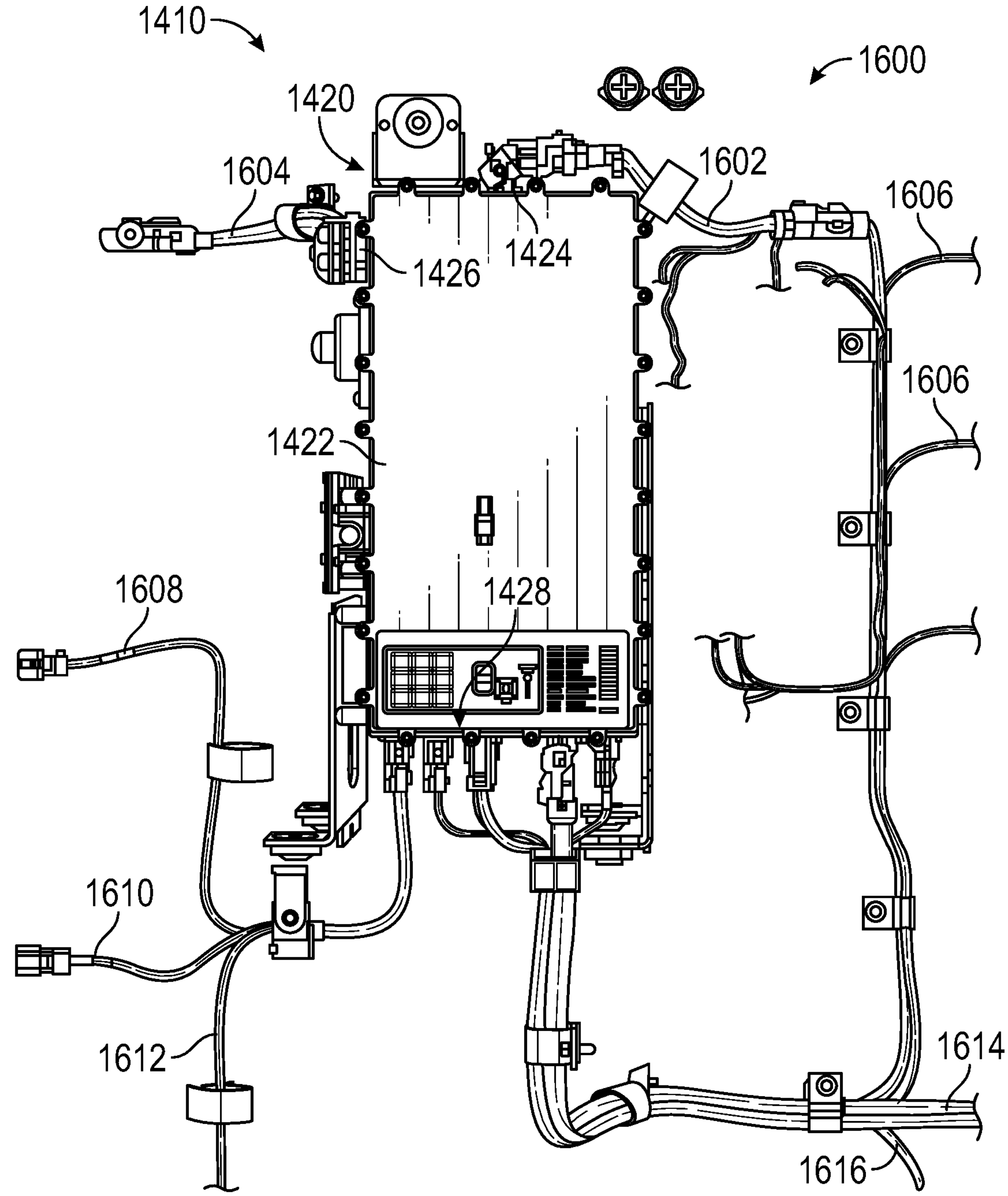
Figure 65:
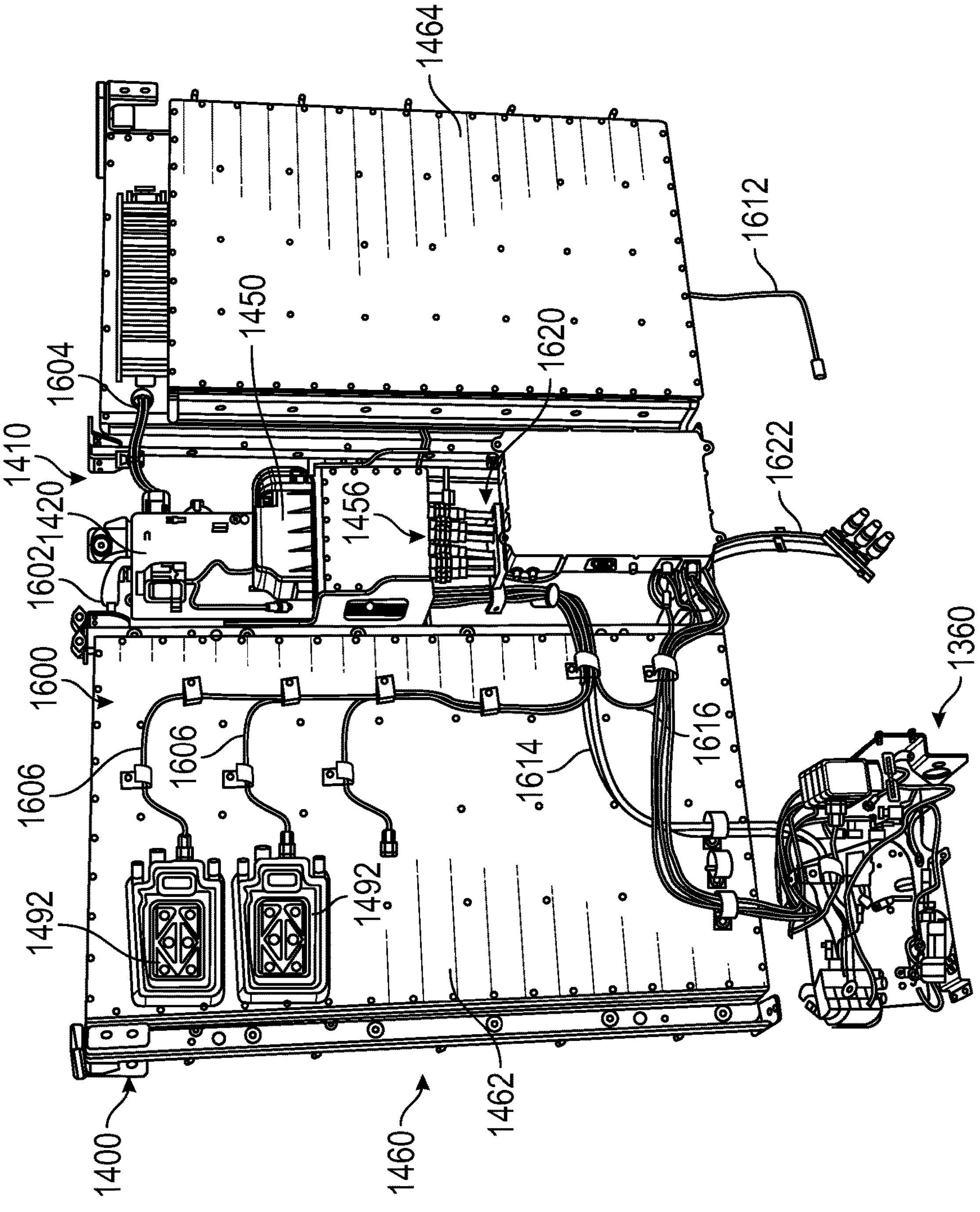

As shown in FIGS. 61 and 65, the high voltage DC wiring harness 1600 includes third connectors, shown as cab heater cables 1606, extending from the high voltage DC interfaces 1428 of the PDU 1420 to the high voltage cab heaters 1492 positioned along the back of the left battery pack 1462. According to an exemplary embodiment, each of the cab heater cables 1606 is less than ninety-five inches in length (e.g., about ninety-three inches). According to an exemplary embodiment, each of the cab heater cables 1606 is positioned entirely within the rack 1300 and does not extend externally therefrom.

Figure 66:
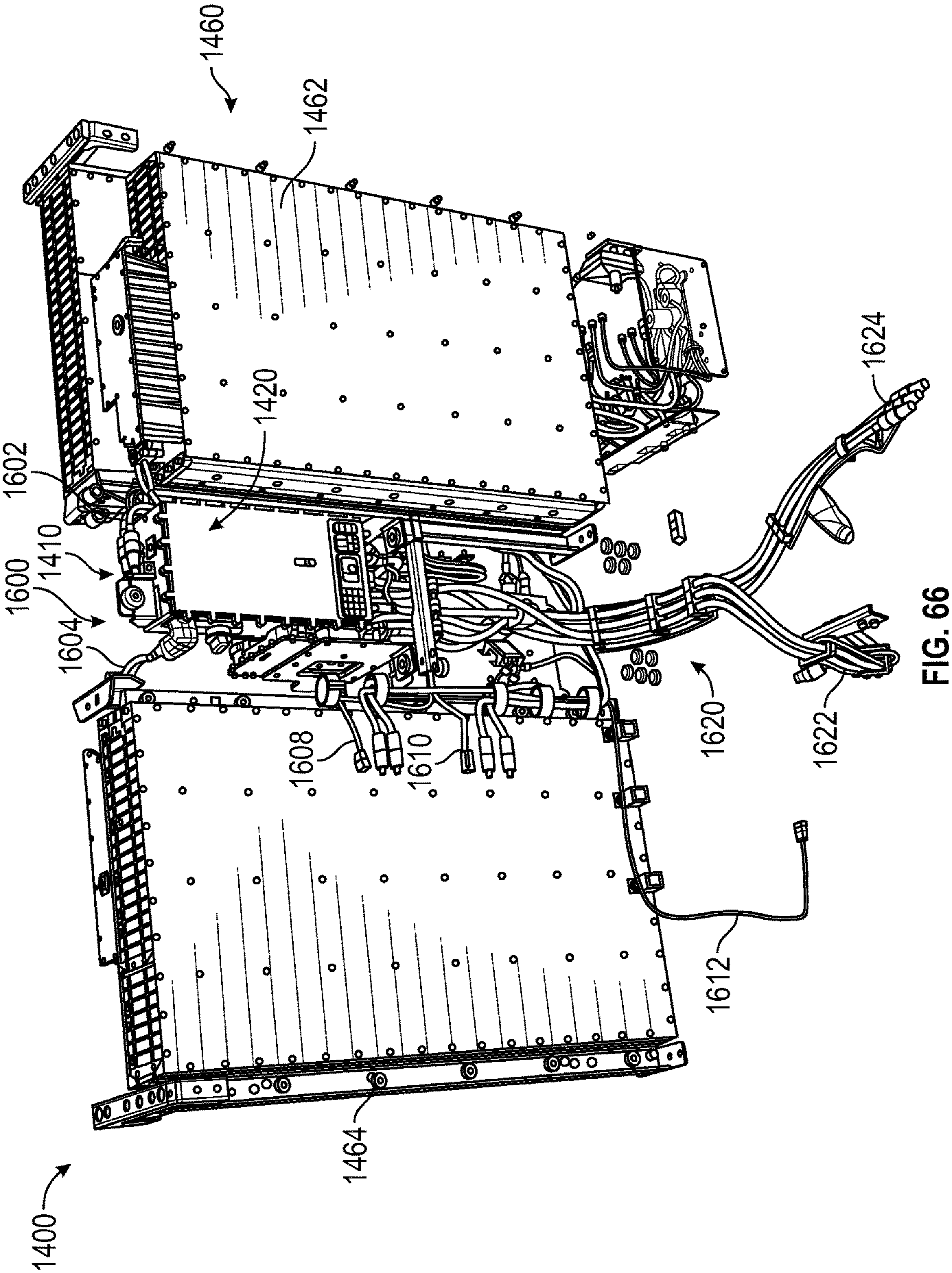

As shown in FIGS. 61 and 66, the high voltage DC wiring harness 1600 includes (a) a fourth connector, shown as first DC-to-DC converter cable 1608, extending from the high voltage DC interfaces 1428 of the PDU 1420 to the first DC-to-DC converter 1480 positioned along the front of the right battery pack 1464 and (b) a fifth connector, shown as second DC-to-DC converter cable 1610, extending from the high voltage DC interfaces 1428 of the PDU 1420 to the second DC-to-DC converter 1482 positioned along the front of the right battery pack 1464. According to an exemplary embodiment, the first DC-to-DC converter cable 1608 is less than thirty-six inches in length (e.g., about thirty-two inches) and the second DC-to-DC converter cable 1610 is less than twenty-four inches in length (e.g., about twenty-one inches). According to an exemplary embodiment, each of the first DC-to-DC converter cable 1608 and the second DC-to-DC converter cable 1610 is positioned entirely within the rack 1300 and does not extend externally therefrom.

As shown in FIGS. 61, 65, and 66, the high voltage DC wiring harness 1600 includes a sixth connector, shown as thermal management assembly cable 1612, extending from the high voltage DC interfaces 1428 of the PDU 1420 to the thermal management assembly disposed within the right stowage box 1370. According to an exemplary embodiment, thermal management assembly cable 1612 is less than ninety inches in length (e.g., about eighty-five inches, about fifty-nine inches within the rack 1300 and about twenty-six inches within the right stowage box 1370). According to an exemplary embodiment, the thermal management assembly cable 1612 is positioned entirely within the rack 1300 and the right stowage box 1370, and does not extend externally therefrom (i.e., except through the rack floor 1312 and the right stowage box housing 1372, which does not expose the thermal management assembly cable 1612 to the exterior environment).

As shown in FIGS. 61 and 65, the high voltage DC wiring harness 1600 includes a seventh connectors, shown as left stowage box cables 1614, extending from the high voltage DC interfaces 1428 of the PDU 1420 to one or more components disposed within the left stowage box 1360. According to an exemplary embodiment, each of the left stowage box cables 1614 is less than seventy-five inches in length (e.g., about seventy-four inches, about sixty inches within the rack 1300 and about fourteen inches within the left stowage box 1360). According to an exemplary embodiment, each the left stowage box cables 1614 is positioned entirely within the rack 1300 and the left stowage box 1360, and does not extend externally therefrom (i.e., except through the rack floor 1312 and the left stowage box housing 1362, which does not expose the left stowage box cables 1614 to the exterior environment).

As shown in FIGS. 61 and 65, the high voltage DC wiring harness 1600 includes an eighth connector, shown as charger cable 1616, extending from the high voltage DC interfaces 1428 of the PDU 1420 to the charger 1470 positioned beneath the PDU 1420. According to an exemplary embodiment, the charger cable 1616 is less than sixty inches in length (e.g., about fifty-nine inches). According to an exemplary embodiment, the charger cable 1616 is positioned entirely within the rack 1300 and does not extend externally therefrom.

Figure 67:
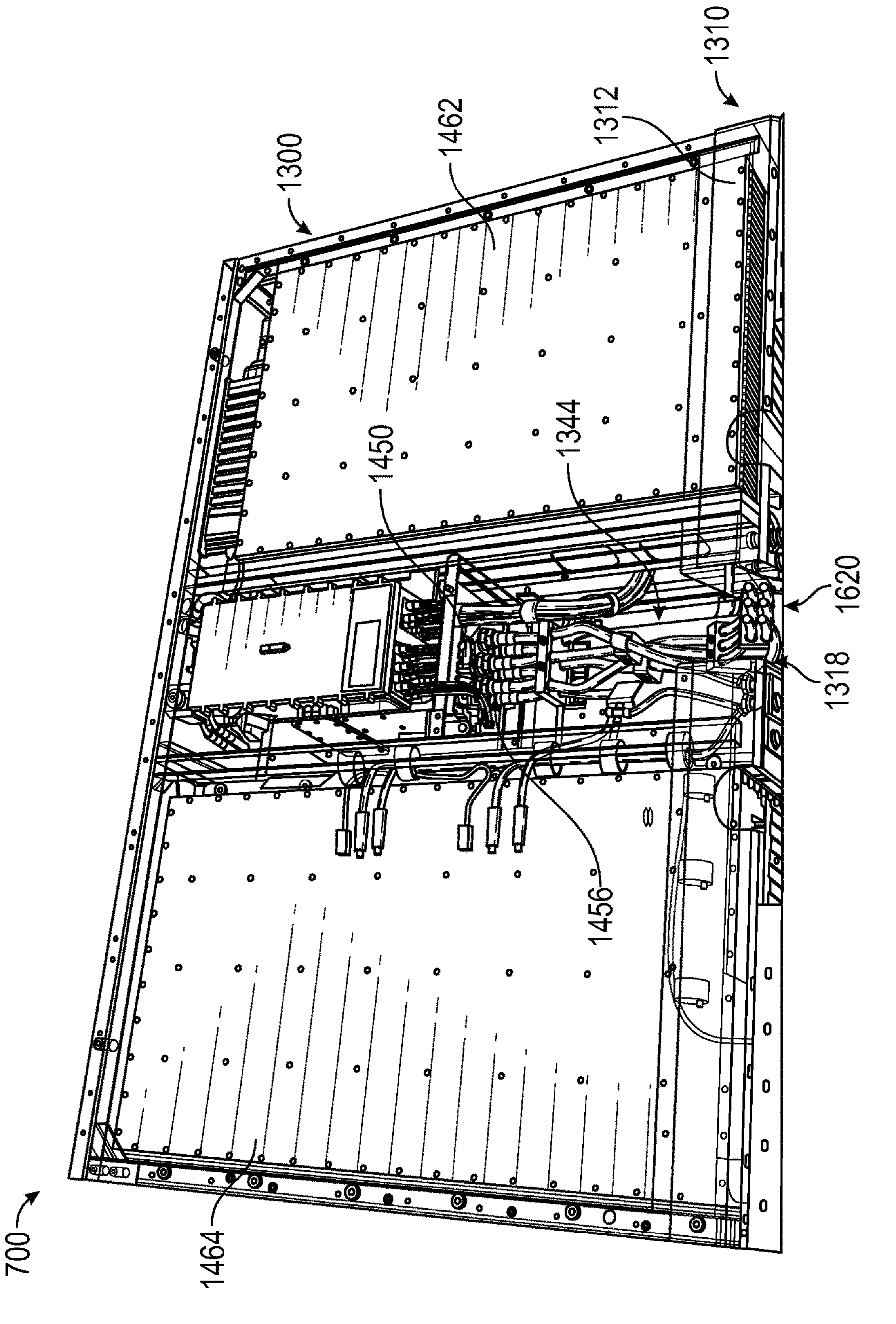
Figure 68:
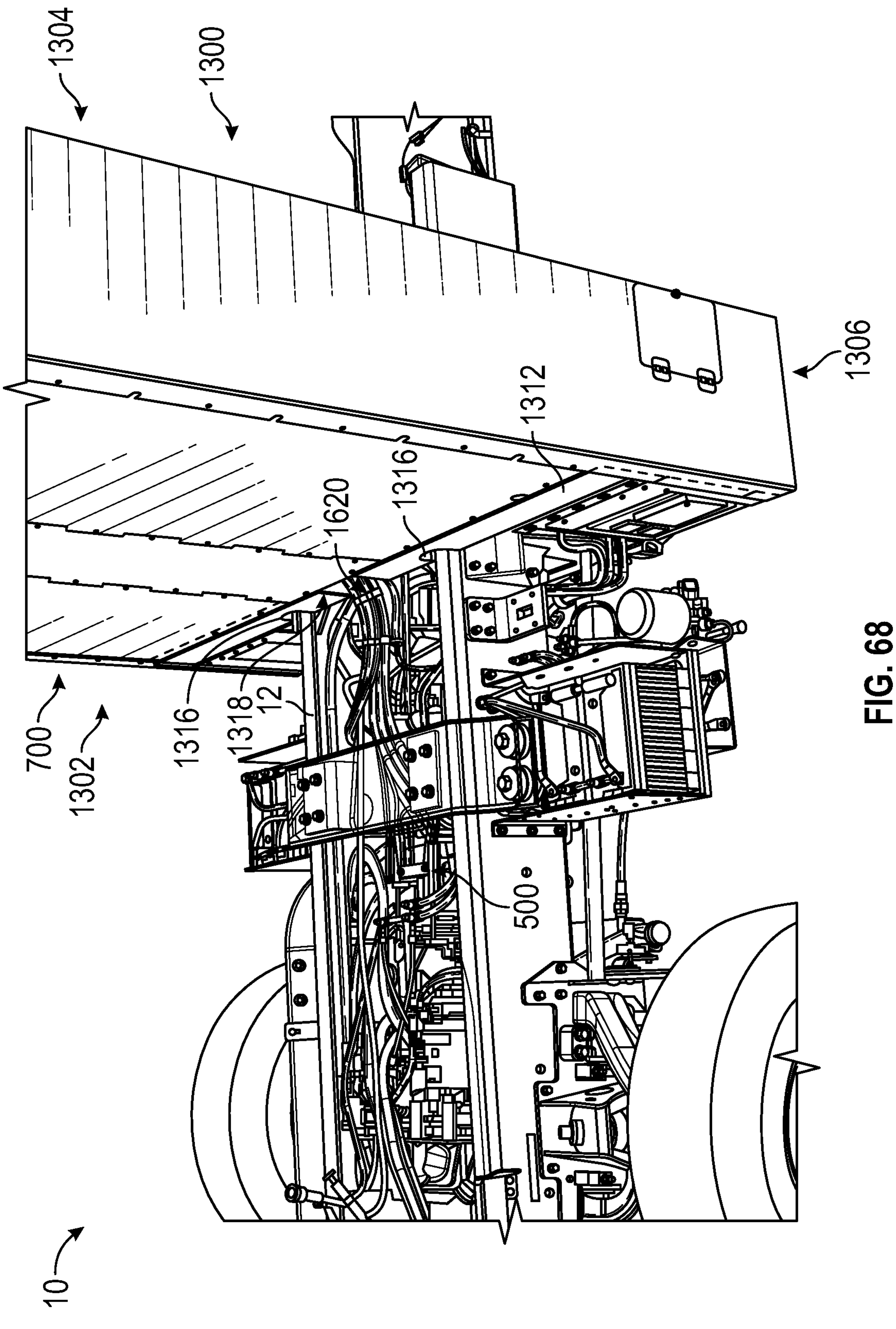
Figure 69:
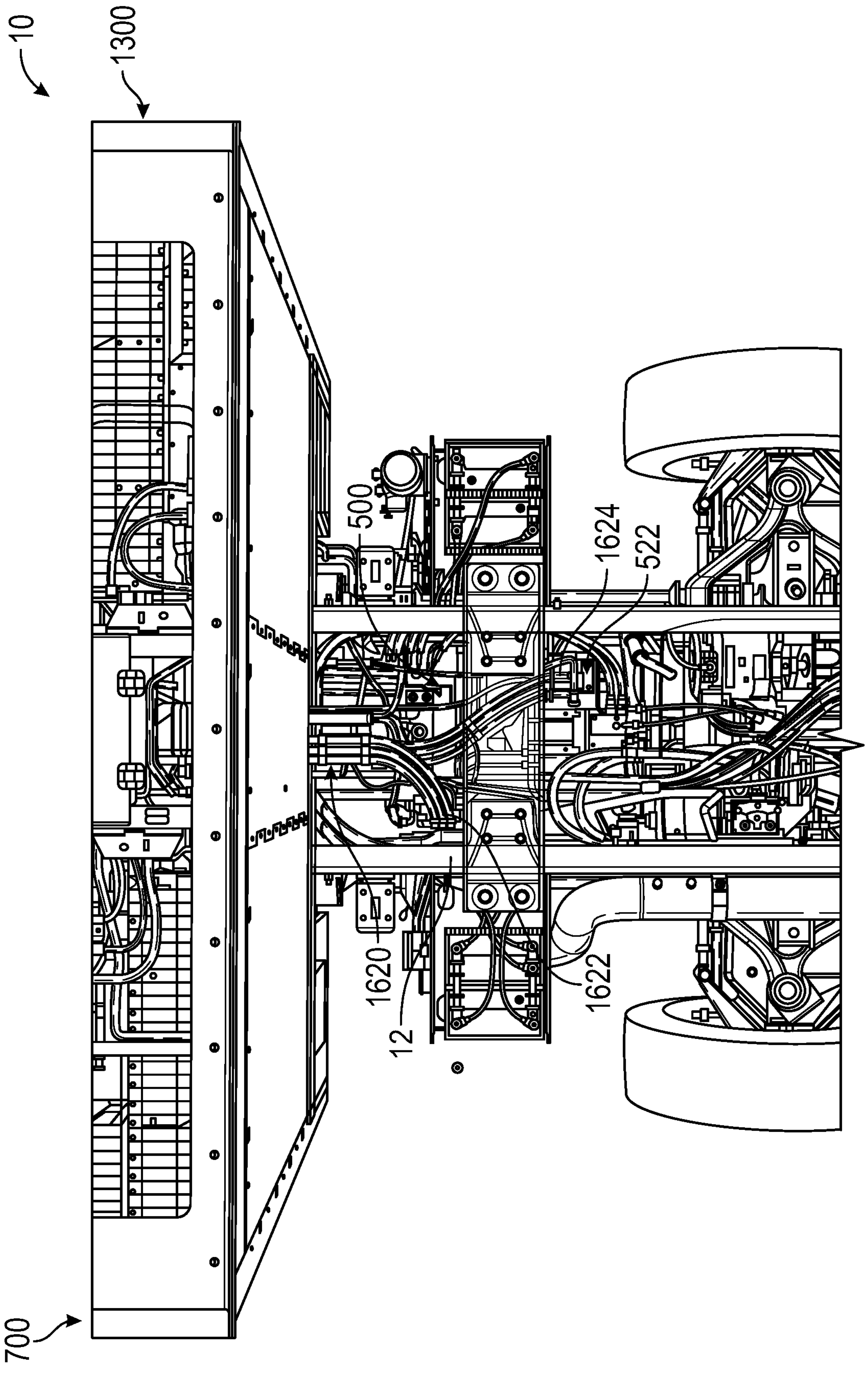
Figure 70:
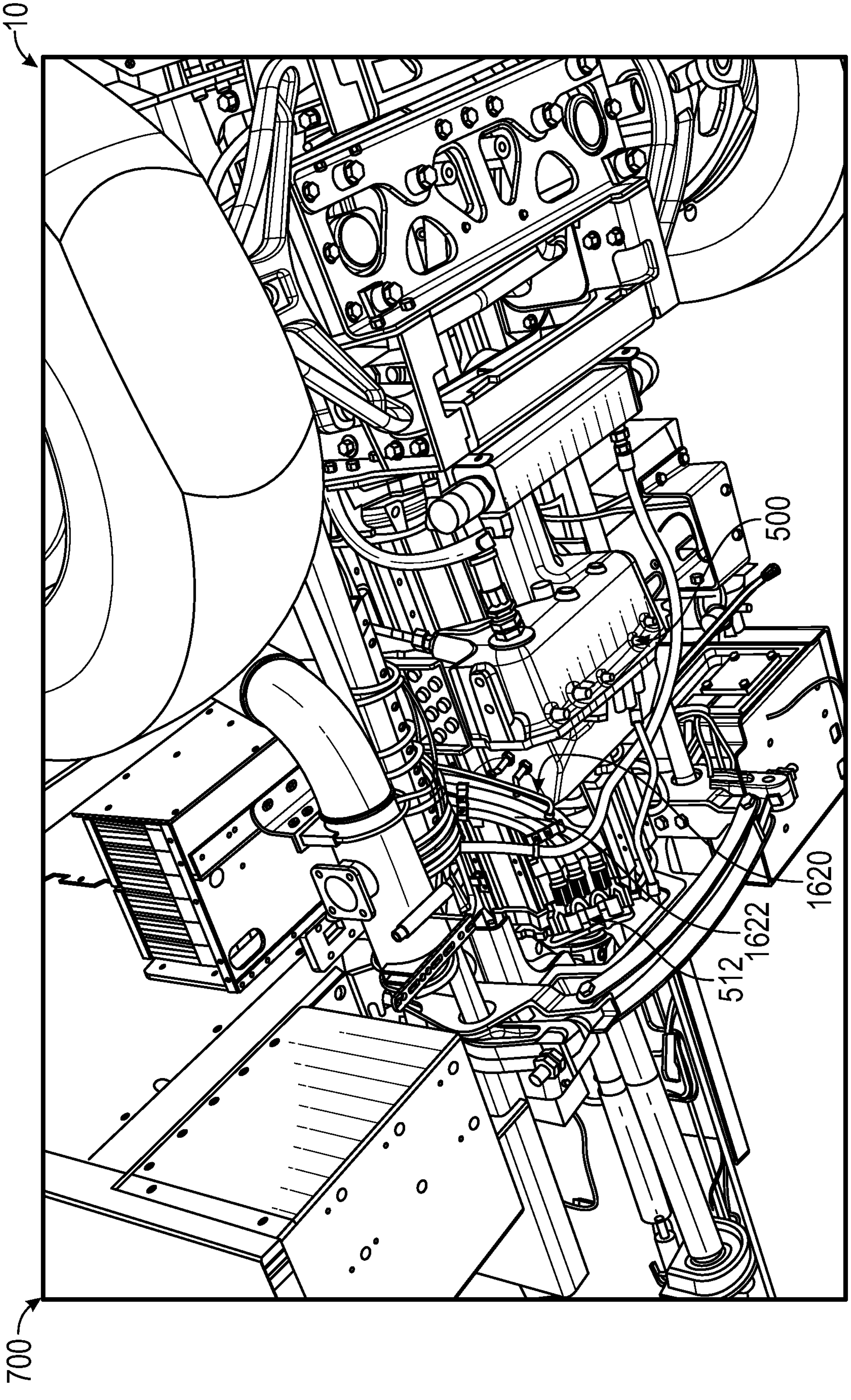

As shown in FIGS. 65-70, the high voltage AC wiring harness 1620 includes (a) first connectors (e.g., three first connectors for 3-phase power), shown as first ETD cables 1622, extending from the high voltage AC interfaces 1456 of the high voltage inverter 1450, through the high voltage wiring channel 1318 of the rack 1300, and to a first interface, shown as first ETD interface 512, of the ETD 500 and (b) second connectors (e.g., three second connectors for 3-phase power), shown as second ETD cables 1624, extending from the high voltage AC interfaces 1456 of the high voltage inverter 1450, through the high voltage wiring channel 1318 of the rack 1300, and to a second interface, shown as second ETD interface 522, of the ETD 500. According to an exemplary embodiment, the first ETD interface 512 is associated with the first motor/generator 510 of the ETD 500 and the second ETD interface 522 is associated with the second motor/generator 520 of the ETD 500. As shown in FIGS. 67-69, the first ETD cables 1622 and the second ETD cables 1624 extend out of the rack 1300 through the high voltage wiring channel 1318 and the portions thereof external to the rack 1300 extend (a) between the frame rails of the frame 12 and (b) beneath an upper surface of the frame 12 to the ETD 500 without (i.e., at no point) crossing over, under, or through the frame rails of the frame 12. According to an exemplary embodiment, each of the first ETD cables 1622 and the second ETD cables 1624 is less than one-hundred inches in length. More specifically, the first ETD cables 1622 may be ninety inches or less (e.g., about ninety inches, about eighty-five inches, about eighty-two inches) with an external length that is less than seventy-two inches (e.g., about sixty-five inches, about sixty-three inches, about fifty-eight inches, about fifty-four inches) external of the rack 1300 and exposed. The second ETD cables 1624 may be eighty inches or less (e.g., about seventy-nine inches, about seventy-eight inches) with an external length that is less than sixty inches (e.g., about fifty inches, about forty-nine inches, etc.) external of the rack 1300 and exposed. Because each of the first ETD cables 1622 and the second ETD cables 1624 include multiple cables, each of their respective cables may have a slightly varied length relative to the other cables in the corresponding set of cables.

According to an exemplary embodiment, the ESS 700 being configured as a centralized ESS with short power runs of high voltage cables extending externally therefrom provides various advantages. First, performing maintenance on electrified vehicles such as the vehicle 10 requires qualified persons to access high voltage components and components that high voltage cables and high voltage components are proximate. By (a) containing substantially all of the high voltage components of the ESS 700 (e.g., batteries, inverter, converters, heaters, chargers, etc.) within the rack 1300, the left stowage box 1360, and the right stowage box 1370 and (b) positioning only short power runs of high voltage cables (i.e., the cables of the high voltage AC wiring harness 1620) between the frame rails of the frame 12, persons performing maintenance on the vehicle 10 do not require special training or qualifications to work on components positioned along a substantial majority of the vehicle 10. Whereas, if the high voltage components were distributed along the vehicle 10, substantially longer power runs of high voltage cables would be required, as well as the longer power runs of high voltage cables typically would cross over or under the frame rails of the frame of such a vehicle. Accordingly, special training or qualifications would be needed to work on various components, both high voltage components and non-high voltage components, distributed across a larger portion of such a vehicle. Second, centralizing the high voltage components reduces the amount of high voltage cabling needed, reducing both installation complexity and cable costs.

According to an exemplary embodiment, the frame 12 of the vehicle 10, alone or in combination with the front cabin 20, and/or the vehicle 10 itself (e.g., the front cabin 20, the rear section 30, the frame 12, etc.) has a longitudinal length that is greater than or equal to twenty feet (e.g., about twenty-two feet, about twenty-three feet, about twenty-five feet, greater than twenty-five feet, about thirty feet, greater than thirty feet, about thirty-five feet, greater than thirty-five feet, about forty feet, greater than forty feet, about forty-one and a half feet, about forty-five feet, greater than forty-five feet, greater than fifty feet, greater than fifty-five feet, etc.). By way of example, the vehicle 10 may be an ambulance or truck response vehicle, and the frame 12 of the vehicle 10, alone or in combination with the front cabin 20, and/or the vehicle 10 itself may be between twenty and twenty-five feet. By way of another example, the vehicle 10 may be a fire apparatus, and the frame 12 of the vehicle 10, alone or in combination with the front cabin 20, and/or the vehicle 10 itself may be greater than twenty-five feet (e.g., between twenty-five and sixty-five feet depending on the configuration of the fire apparatus such as a pumper, a quint, a single rear axle, a tandem rear axle, a rear mount aerial, a mid-mount aerial, a tiller (including both the trailed ladder and the tractor), etc.). As one example, the fire apparatus may be a pumper having an overall length between twenty-eight feet and thirty feet (e.g., about twenty-eight feet four inches to twenty-eight feet six inches). As another example, the fire apparatus may be a rear mount, tandem rear axle aerial having an overall length (excluding any overhang of the aerial ladder) between forty-four feet and forty-six feet (e.g., about forty-four feet nine inches, about forty-five feet eleven inches, etc.). As another example, the fire apparatus may be a mid-mount, tandem rear axle aerial having an overall length (excluding any overhang of the aerial ladder) between forty-one feet and forty-two feet (e.g., about forty-one feet five inches). Therefore, the amount of the length that the cables of the high voltage AC wiring harness 1620 extend external of the rack 1300 and along the frame 12 is a substantial minority of the length of the frame 12 and the vehicle 10. More specifically, with seventy-two inches or less (or six feet or less) of the first ETD cables 1622 and sixty inches or less (or five feet or less) of the second ETD cables 1624 extending external of the rack 1300, each of the power cables of the high voltage AC wiring harness 1620 has an external length that is less than or equal to 30% of the longitudinal length of the frame 12 of the vehicle 10, alone or in combination with the front cabin 20, and/or of the vehicle 10 (e.g., less than or equal to 25%, 20%, 17%, 15%, 13%, 10%, 9%, etc. of the longitudinal length of the frame 12 and/or the vehicle 10).

Figure 71:
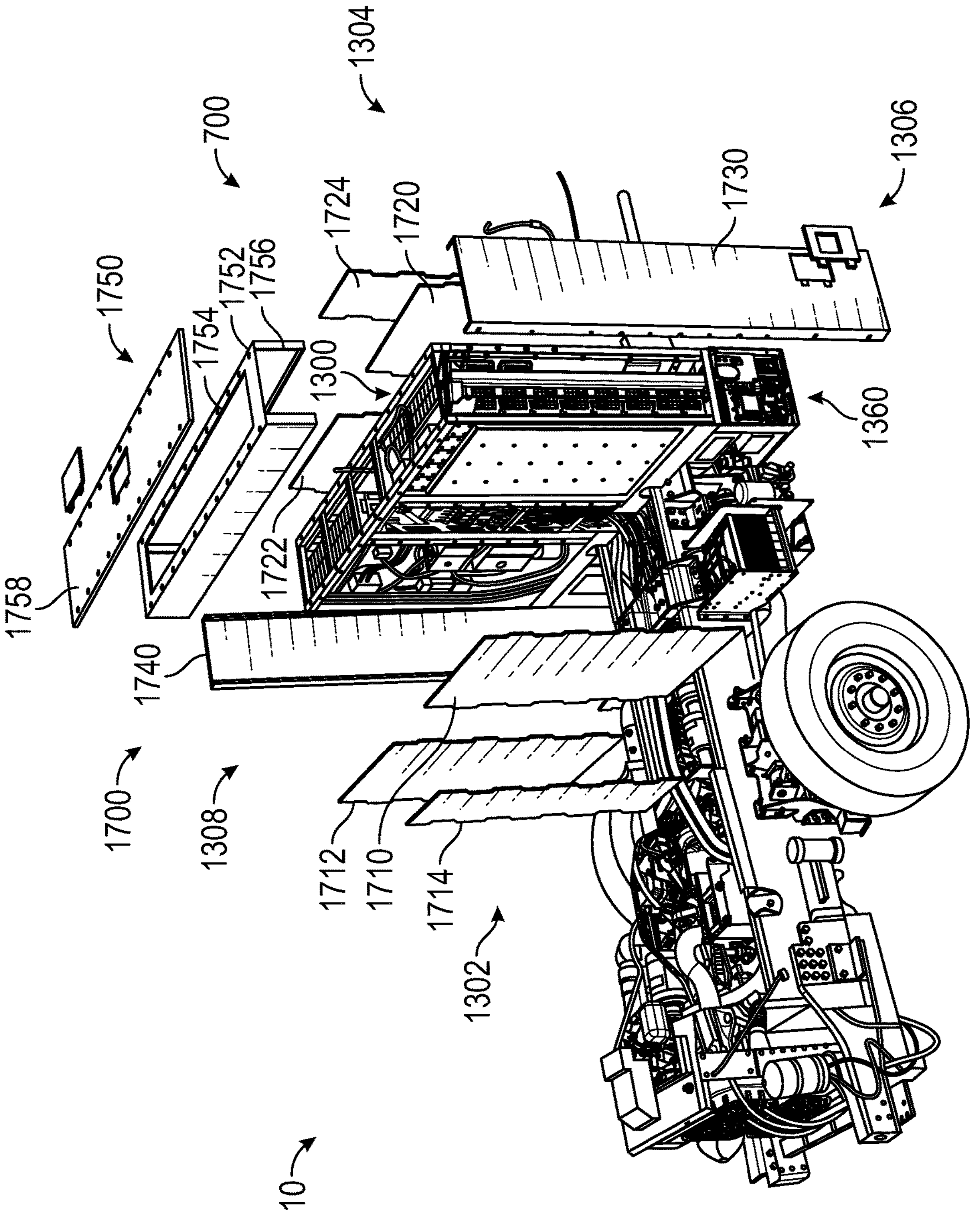
FIGS. 71-75 are various views of a housing assembly of the energy storage system of FIGS. 49-57, according to an exemplary embodiment.
Figure 72:
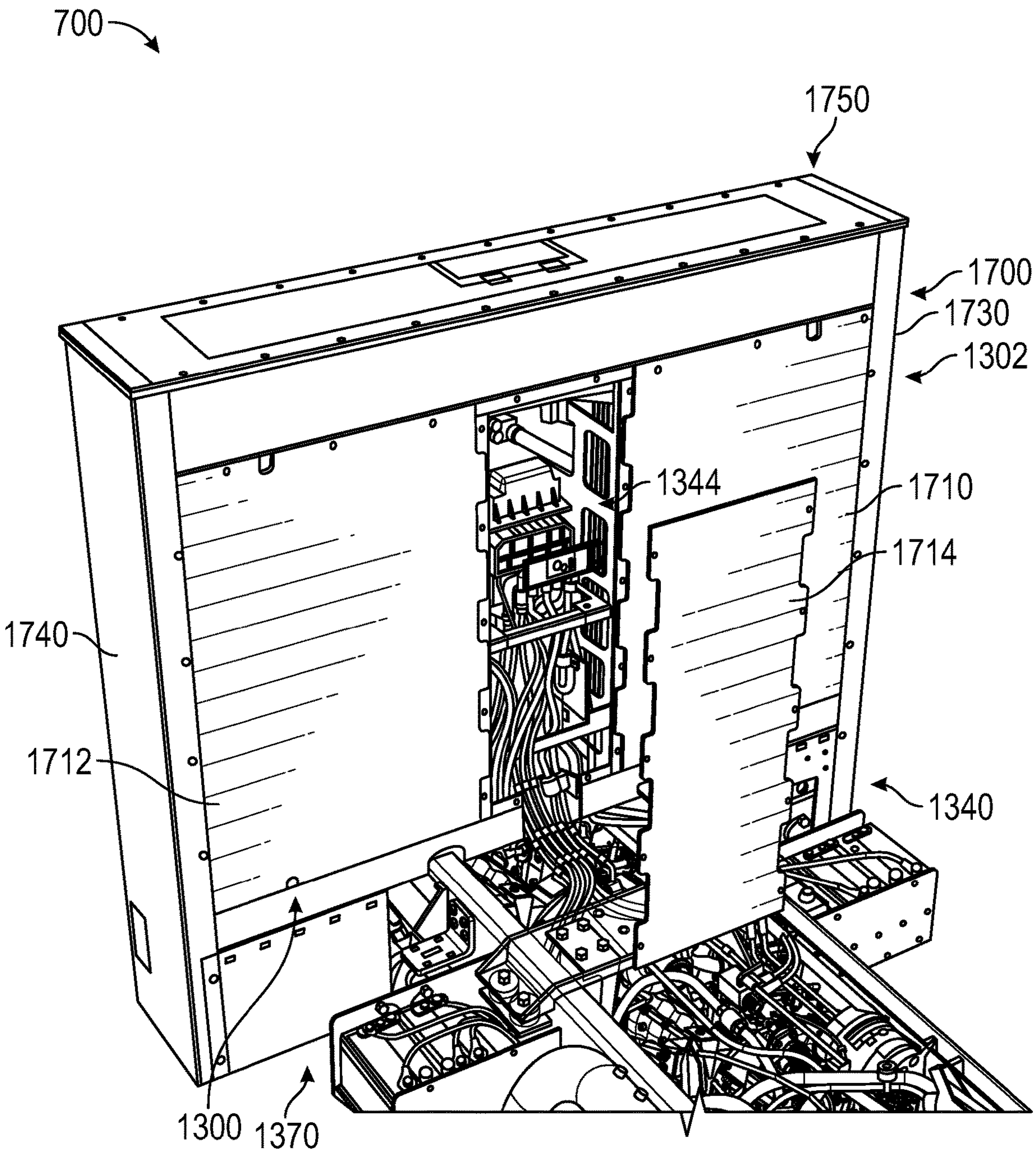
Figure 73:
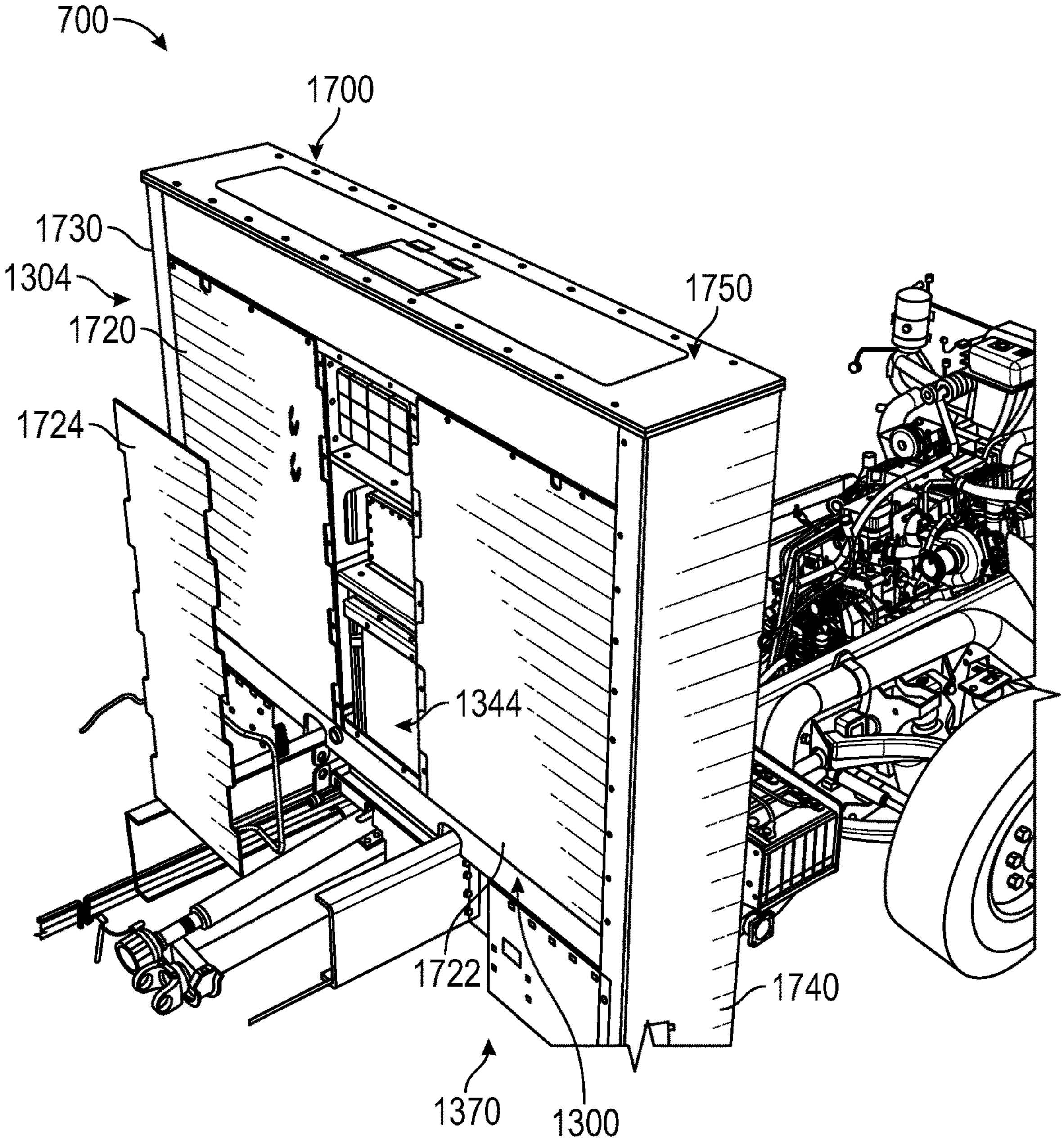
Figure 74:
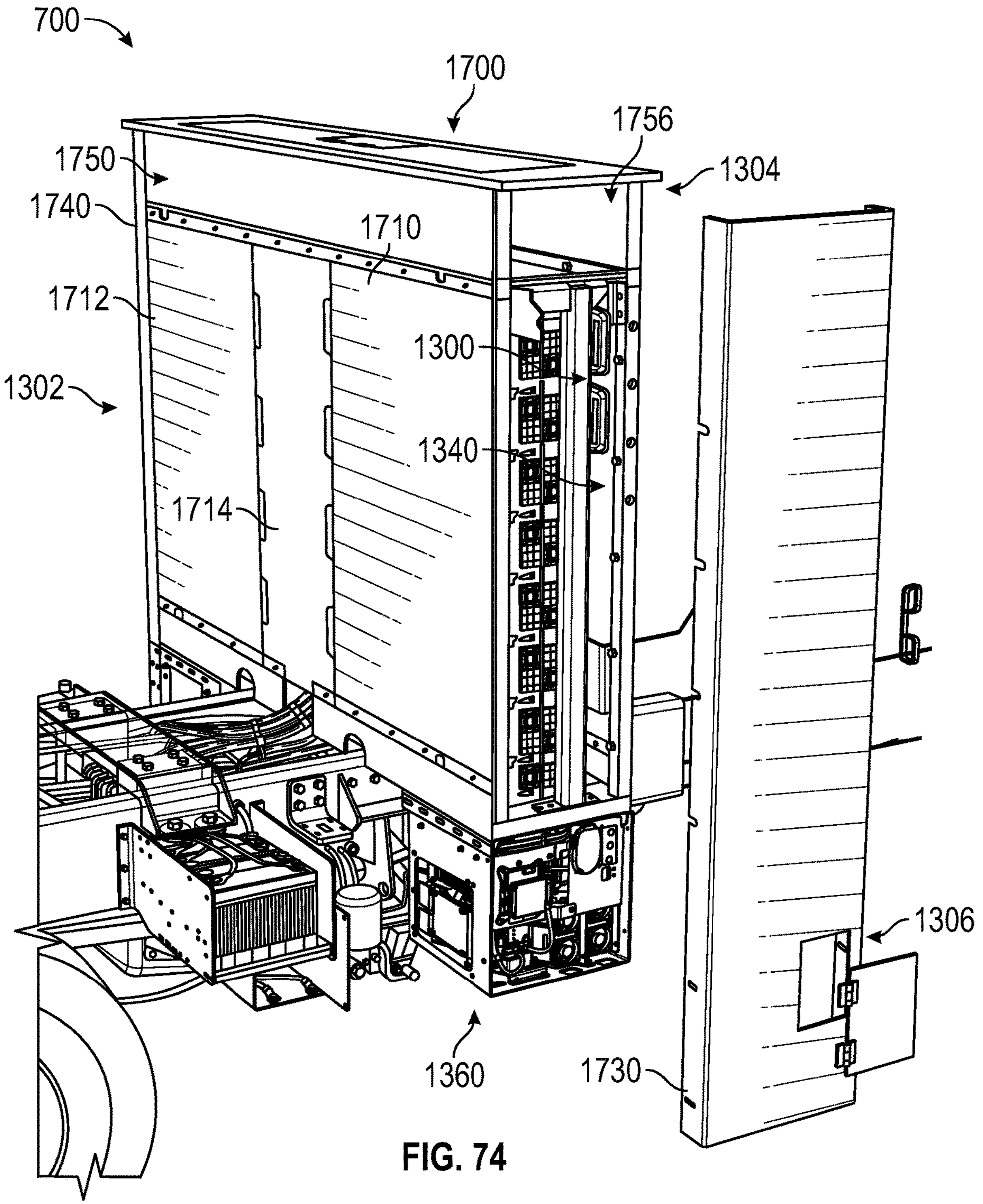

As shown in FIGS. 71-75, the ESS 700 includes a housing, shown as ESS housing 1700, extending around the rack 1300, the left stowage box 1360, and the right stowage box 1370 and enclosing the various high voltage component of the ESS 700 therein. As shown in FIGS. 71, 72, and 74, the ESS housing 1700 has a plurality of front panels including (a) a first panel, shown as front, left panel 1710, that selectively engages with the front side 1302 of the rack 1300 to enclose the front side 1302 of the left portion 1340 thereof, (b) a second panel, shown as front, right panel 1712, that selectively engages with the front side 1302 of the rack 1300 to enclose the front side 1302 of the right portion 1342 thereof, and (c) a third panel, shown as front, center panel 1714, that selectively engages with the front side 1302 of the rack 1300 to enclose the front side 1302 of the center portion 1344 thereof.

Figure 75:
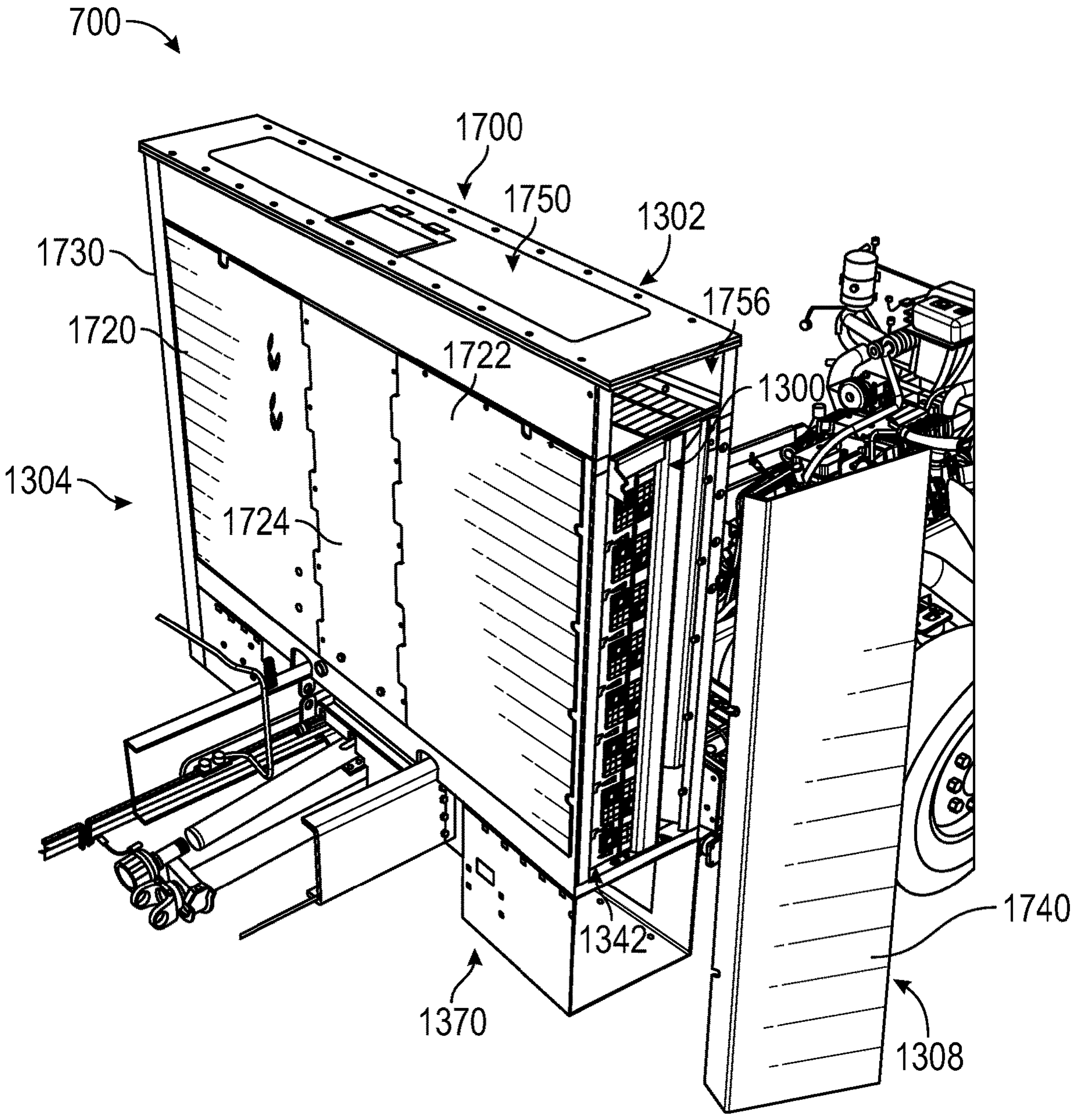

As shown in FIGS. 71, 73, and 75, the ESS housing 1700 has a plurality of rear panels including (a) a fourth panel, shown as rear, left panel 1720, that selectively engages with the rear side 1304 of the rack 1300 to enclose the rear side 1304 of the left portion 1340 thereof, (b) a fifth panel, shown as rear, right panel 1722, that selectively engages with the rear side 1304 of the rack 1300 to enclose the rear side 1304 of the right portion 1342 thereof, and (c) a sixth panel, shown as rear, center panel 1724, that selectively engages with the rear side 1302 of the rack 1300 to enclose the rear side 1302 of the center portion 1344 thereof.

As shown in FIGS. 71-75, the ESS housing 1700 has a seventh panel, shown as left end panel 1730, that selectively engages with the left end 1306 of the rack 1300 and the left stowage box 1360 to enclose the left end 1306 of the left portion 1340 of the rack 1300 and the left stowage box 1360. In some embodiments, the left end panel 1730 has a two-piece construction with a first piece that engages with the rack 1300 and a second piece that engages with the left stowage box 1360 to enclose the left ends 1306 thereof. As shown in FIGS. 71-75, the ESS housing 1700 has an eighth panel, shown as right end panel 1740, that selectively engages with the right end 1308 of the rack 1300 and the right stowage box 1370 to enclose the right end 1308 of the right portion 1342 of the rack 1300 and the right stowage box 1370. In some embodiments, the right end panel 1740 has a two-piece construction with a first piece that engages with the rack 1300 and a second piece that engages with the right stowage box 1370 to enclose the right ends 1308 thereof.

As shown in FIGS. 71-75, the ESS housing 1700 has an upper housing portion, shown as upper housing 1750, that selectively engages with and extends along an upper portion of the rack 1300. As shown in FIGS. 71, 74, and 75, the upper housing 1750 includes a U-shaped body, shown as upper body 1752, that defines an aperture, shown as upper housing aperture 1754, within an upper surface of the upper body 1752 that leads to an elongated chamber or cavity, shown as upper cavity 1756, of the upper body 1752. As shown in FIG. 71, the upper housing 1750 includes a plate, shown as upper plate 1758, that selectively engages with the upper body 1752 to enclose the upper housing aperture 1754. As shown in FIGS. 72-75, the left end panel 1730 and the right end panel 1740 selectively engage with the upper housing 1750 to enclose the upper cavity 1756 at the left end 1306 and the right end 1308, respectively.

According to an exemplary embodiment, the ESS housing 1700 having the various removable panels provides enhanced accessibility, serviceability, and modularity for the ESS 700. By way of example, only certain panels may need to be removed to access specific components of the ESS 700, while the remaining portions of the ESS 700 can remain closed and isolated from the person accessing the ESS 700. By way of another example, the left end panel 1730 and the right end panel 1740 may be removed to directly access individual battery cells of the left battery pack 1462 and the right battery pack 1464 from the left end 1306 and the right end 1308, respectively, of the rack 1300.

Alternative Energy Storage Systems

Figure 76:
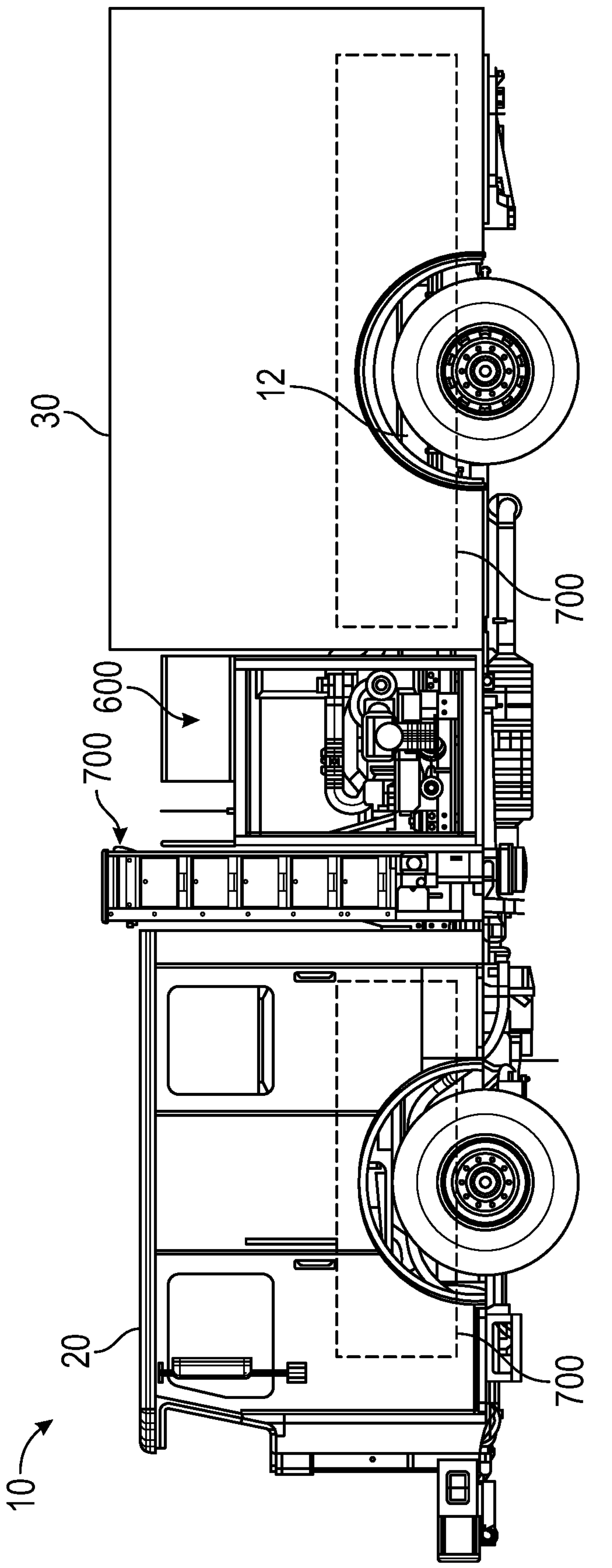
FIGS. 76-78 are various views of the energy storage system of FIG. 7 positioned in various locations on a fire fighting vehicle, according to various exemplary embodiments.
Figure 77:
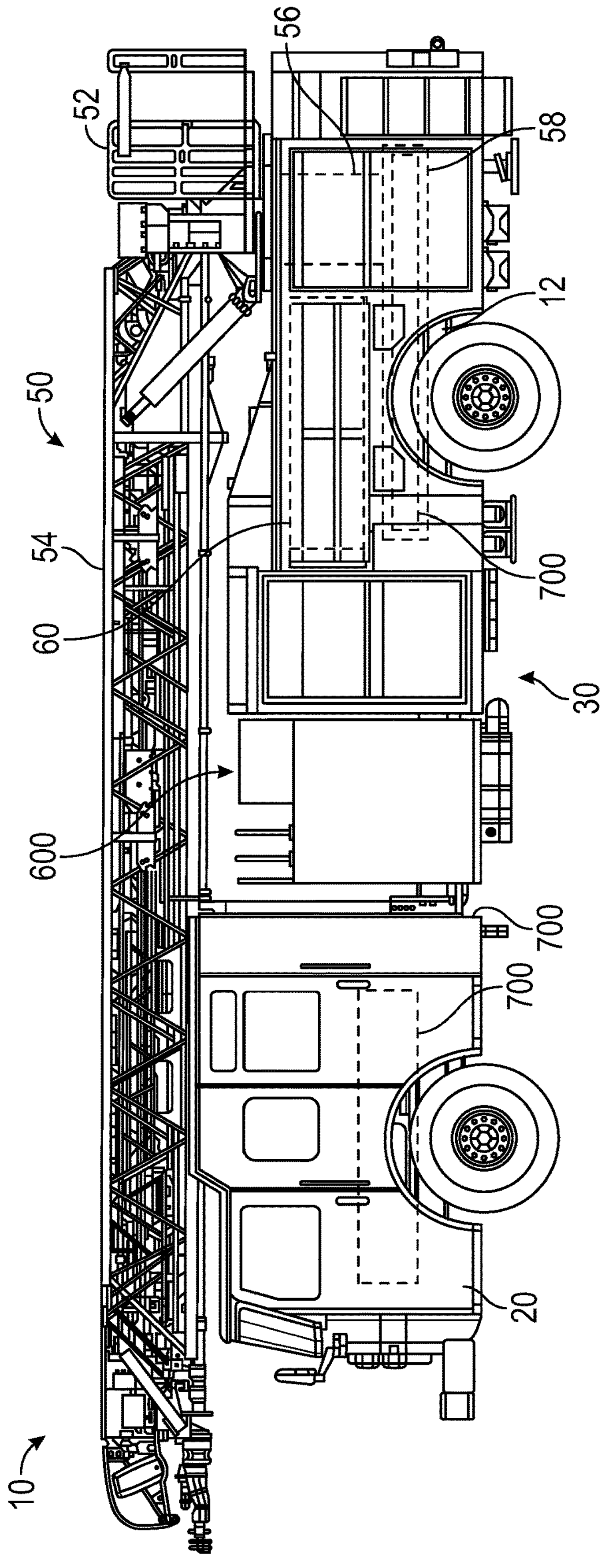
Figure 78:
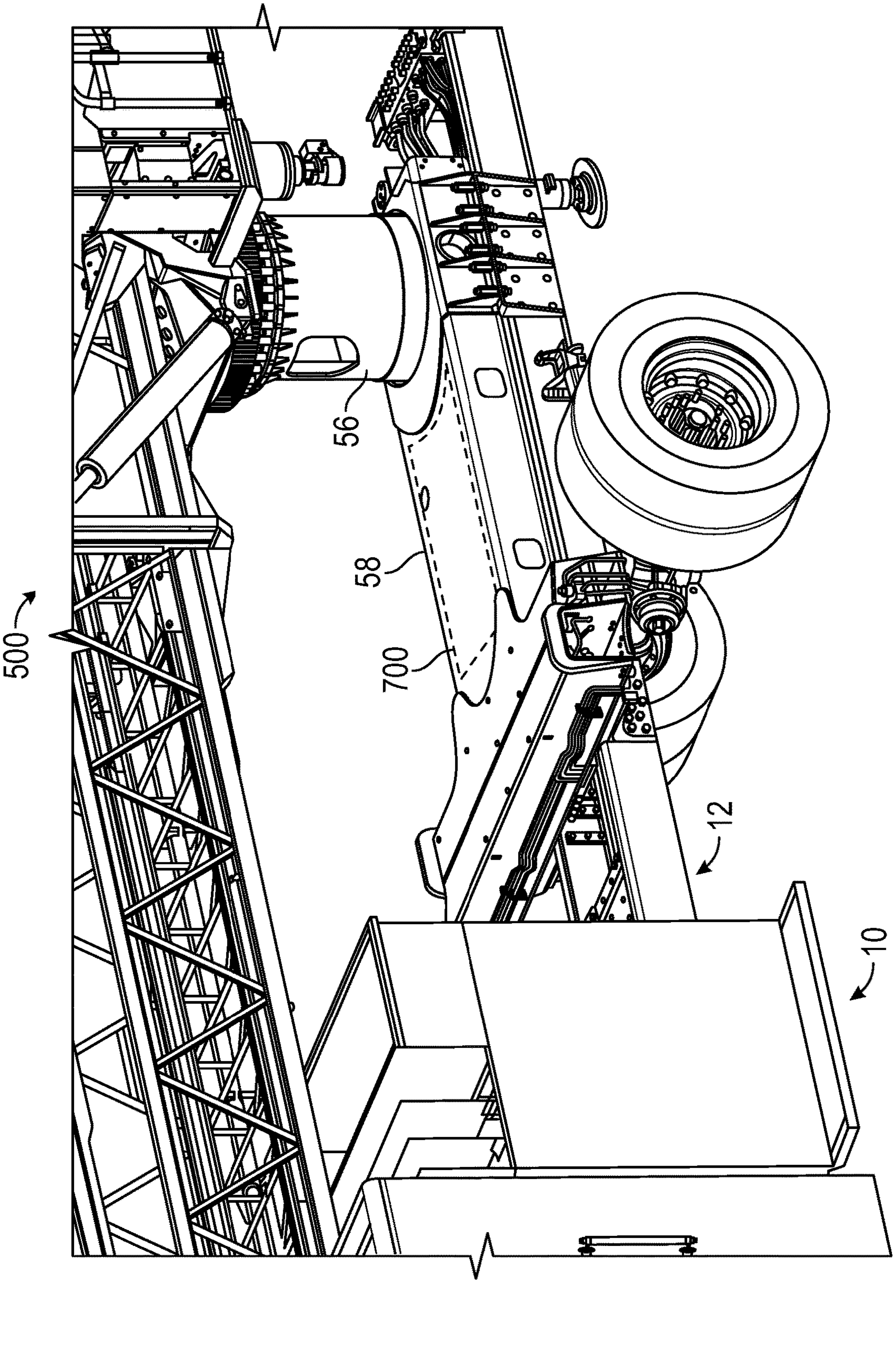

According to the various exemplary embodiments shown in FIGS. 76-78, the ESS 700, or a component thereof (e.g., a battery pack, etc.), is additionally or alternatively positioned at other locations of the vehicle 10. The additional ESS(s) 700 may supplement or replace the ESS 700 that is positioned between the front cabin 20 and the rear section 30. As shown in FIGS. 76 and 77, in addition to or in place of the ESS 700 being positioned between the front cabin 20 and the rear section 30, the ESS 700 (or a component thereof) is positioned within or under the rear section 30 and/or under the front cabin 20. In some embodiments, the ESS 700 under the front cabin 20 is at least partially positioned between and/or on top of the frame 12 where the engine 202 otherwise would be positioned. In such embodiments, the vehicle 10 may not include the engine 202. In some embodiments, as shown in FIG. 77, the ESS 700 positioned within the rear section 30 is disposed beneath a water tank 60 of the vehicle 10. In some embodiments, the ESS 700 is positioned between and/or on top of the frame 12 where the rear section 30 is located.

As shown in FIGS. 77 and 78, the vehicle 10 is configured as a rear-mount aerial ladder truck having a ladder system, shown as aerial ladder system 50. In other embodiments, the vehicle 10 is configured as a mid-mount aerial ladder truck. The aerial ladder system 50 includes a turntable, shown as ladder turntable 52, positioned at a rear portion of the rear section 30, a ladder assembly, shown as ladder 54, extending from the ladder turntable 52, and a support structure including a torque box 58 disposed along the frame 12 and a pedestal 56 extending from the torque box 58 to the ladder turntable 52. As shown in FIGS. 77 and 78, in addition to or in place of the ESS 700 being positioned between the front cabin 20 and the rear section 30, the ESS 700 (or a component thereof such as a battery pack) is positioned within the torque box 58.

Aerial Energy Storage System

Figure 79:
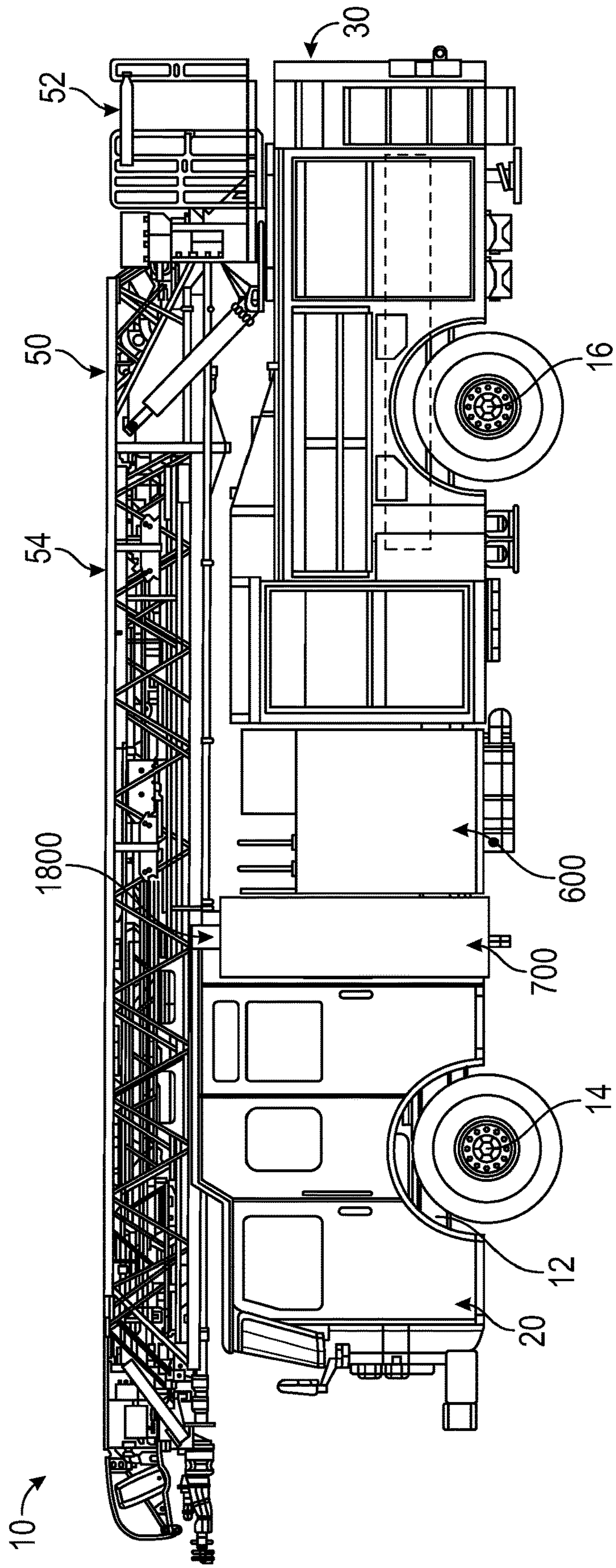
FIG. 79 is a left side view of a fire fighting vehicle having an energy storage system that supports an aerial ladder, according to an exemplary embodiment.

According to the exemplary embodiment shown in FIGS. 77-79, the ladder 54 includes a plurality of extensible ladder sections that facilitate selectively increasing and decreasing the reach of the ladder 54. According to an exemplary embodiment, the ladder turntable 52 is rotatable relative to the rear section 30 and the aerial ladder system 50 includes a first actuator positioned to facilitate pivoting the ladder turntable 52 and, thereby, the ladder 54 about a vertical axis. According to an exemplary embodiment, the ladder 54 is pivotably coupled to the ladder turntable 52 and the aerial ladder system 50 includes a second actuator positioned to facilitate pivoting the ladder 54 relative to the ladder turntable 52 about a horizontal axis.

Figure 80:
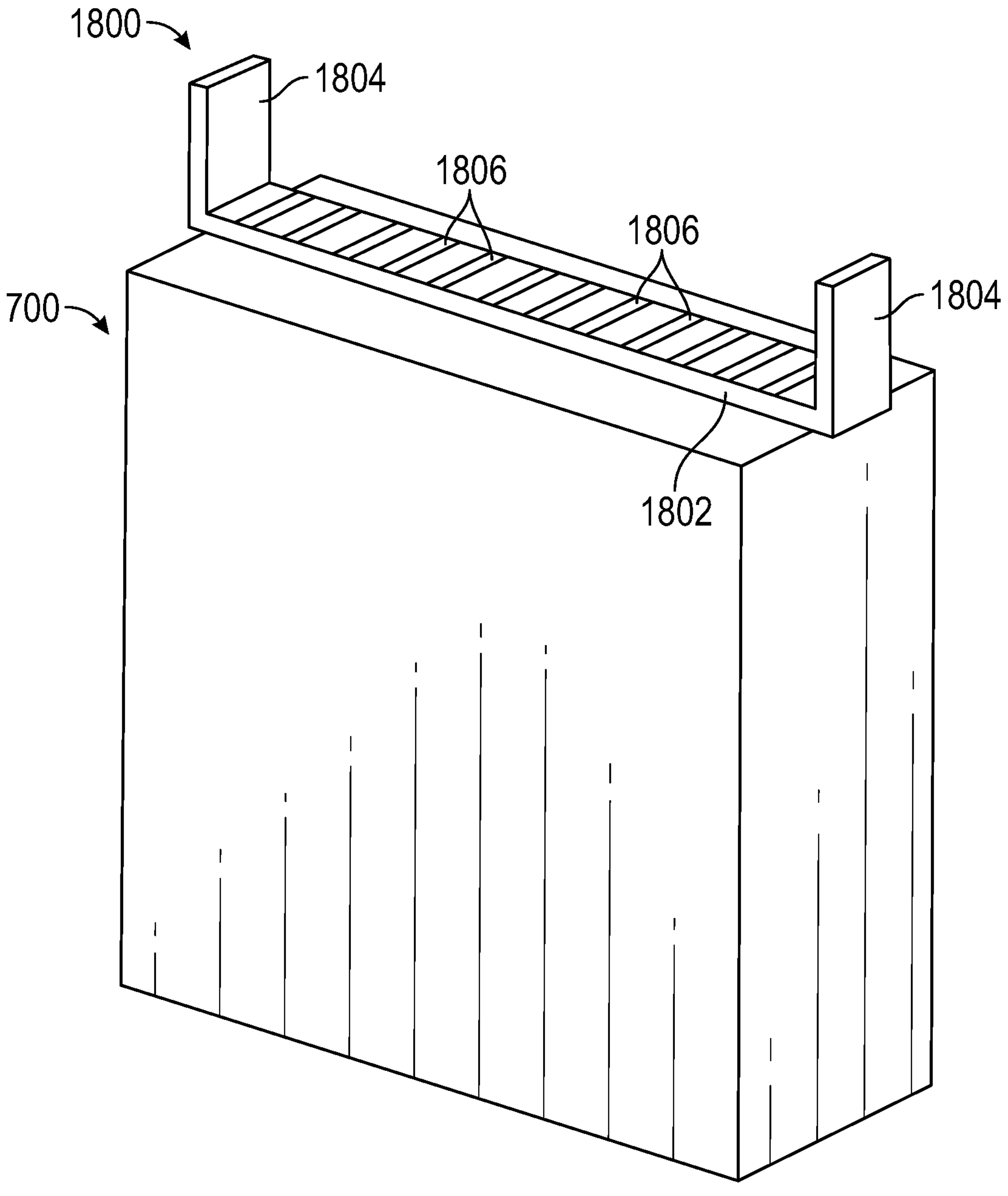
FIG. 80 is a perspective view of the energy storage system of FIG. 79, according to an exemplary embodiment.

As shown in FIGS. 79 and 80, the ESS 700 includes a ladder support system or rack, shown as ladder support assembly 1800, coupled to the top of the ESS 700 (e.g., to the rack 1300, etc.). As shown in FIG. 79, the ladder support assembly 1800 is positioned to receive and support a portion of the ladder 54 (e.g., the frame of the lowermost or base ladder section) when the ladder 54 is in a stowed position or orientation (e.g., oriented horizontal and extending forward). As shown in FIG. 80, the ladder support assembly 1800 includes a base, shown as lower support 1802, coupled to the ESS 700 (e.g., the rack 1300 thereof) and a pair of side flanges or supports, shown as side supports 1804, extending upward from opposing ends of the lower support 1802. According to an exemplary embodiment, the ladder 54 can be set in-between the side supports 1804 and onto the lower support 1802 when in the stowed position or orientation (e.g., to hold the ladder 54 in place while the vehicle 10 is driving, while the ladder 54 is not being used, etc.). In some embodiments, the lower support 1802 is directly coupled to the rack 1300 such that the rack 1300 functions as a structural support for the ladder 54. In some embodiments, the ladder support assembly 1800 includes structural frame members that extend from the lower support 1802 to the frame 12 (e.g., around the rack 1300, through the rack 1300, etc.). As shown in FIG. 80, the ladder support assembly 1800 includes a plurality of rollers, shown as cross-beam rollers 1806, positioned along the lower support 1802. According to an exemplary embodiment, the cross-beam rollers 1806 are configured to engage with a portion (e.g., a cross-beam) of the ladder 54 when the ladder 54 is in engagement with the ladder support assembly 1800 (e.g., to permit slight lateral or side-to-side movement of the ladder 54 as the vehicle 10 is driving).

According to an exemplary embodiment, using the ESS 700 having the ladder support assembly 1800 with the vehicle 10 having the aerial ladder system 50 facilitates a single rear axle implementation and prevents the need for a tandem rear axle. Specifically, the position of the ESS 700 between the front cabin 20 and the rear section 30 distributes the weight along the frame 12 such that a tandem rear axle is not needed to support the aerial ladder system 50 and the ESS 700. On the other hand, if the ESS 700 and the components thereof were positioned further rearward on the frame 12, a tandem rear axle may be needed to support the ESS 700 and the aerial ladder system 50. In some embodiments, however, the vehicle 10 includes a tandem rear axle.

While the features of FIGS. 77 and 79 are shown separately, it should be understood that such features could be included together on a single vehicle (e.g., a vehicle with the ESS 700 having the ladder support assembly 1800 and the ESS 700 within the torque tube 58, etc.).

Look and Feel

According to an exemplary embodiment, the components of the driveline 100 have been integrated into the vehicle 10 in such a way that the vehicle 10 looks, feels, and operates as if it were a traditional, internal combustion engine only driven vehicle. The current approach in the market relating to the electrification of fire fighting vehicles has been to re-design the vehicle entirely to accommodate the electrification components such that the resultant vehicles look substantially different from and are controlled differently from their internal combustion engine driven predecessors. Applicant has identified, however, that consumers, specifically fire fighters, are interested in adding electrified vehicles to their fleets, but they want the vehicles to remain the same as their predecessors in terms of component layout, compartment locations, operations, and aesthetic appearance. Accordingly, Applicant has engaged in an extensive research and development process to design and package the electrified components onto the vehicle 10, with only minor changes relative to its internal combustion engine driven predecessors, such that the vehicle 10 looks and operates like a traditional North American fire apparatus. Doing so provides various advantages, including vehicle operators do not have to be retrained on how to operate a completely new vehicle, technicians know exactly where the driveline components are located, equipment from a decommissioned vehicle can easily be transferred to an identical position on the new, electrified vehicle, etc., all which allow for easy transition and acceptance by the end users, eliminates training, and allows for increased uptime of the vehicle 10.

Specifically, the vehicle 10, according to the exemplary embodiment shown in FIGS. 1-6, looks identical to its internal combustion engine driven predecessor, except for the addition of the support rack 702 and the components supported thereby. The pump house 602 and the engine 202 remain in their usual position, the ETD 500 is in the position where a traditional mechanical transmission would be located, the front cabin 20 and the rear section 30 maintain their typical structure, control layout, compartment layout, etc. However, because of the addition of the ESS 700 to electrify the vehicle 10, the overall length $L_1$ of the vehicle 10 was extended by a length $L_2$ to accommodate the addition of the support rack 702 and the components supported thereby (e.g., the battery packs 710, the cooling radiator 732, the cooling compressor 734, etc.). According to an exemplary embodiment, the length $L_2$ is 20 inches or less (e.g., 20, 18, 16, 12, etc. inches). However, as described herein, in some embodiments, the battery packs 710 are otherwise positioned and, therefore, the support rack 702 may be eliminated. In such embodiments, the vehicle 10 would appear to be identical to its internal combustion engine driven predecessor to an unknowing party.

Figure 27:
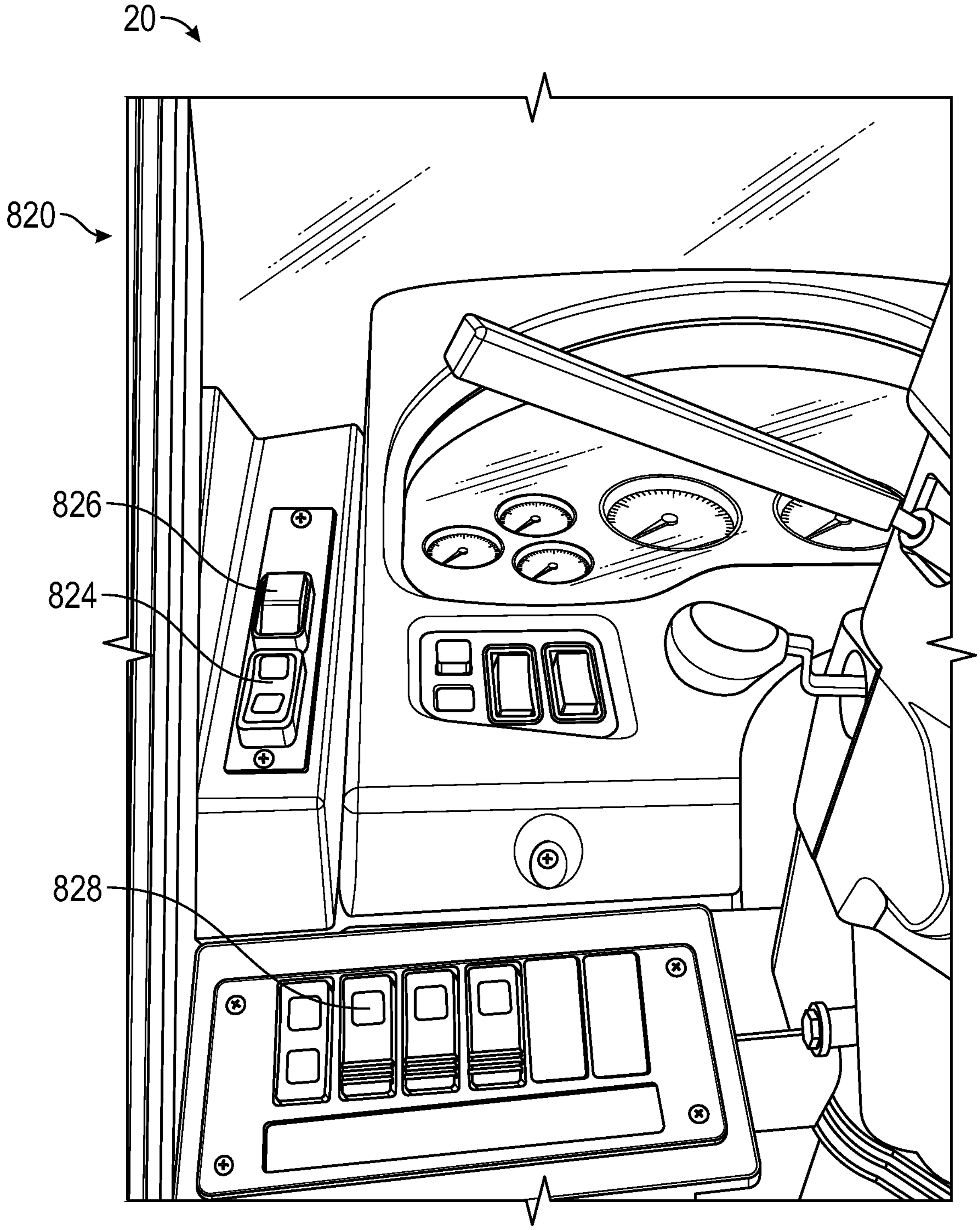
FIGS. 27 and 28 are various views of a user control interface within a cab of the fire fighting vehicle of FIG. 1, according to an exemplary embodiment.
Figure 28:
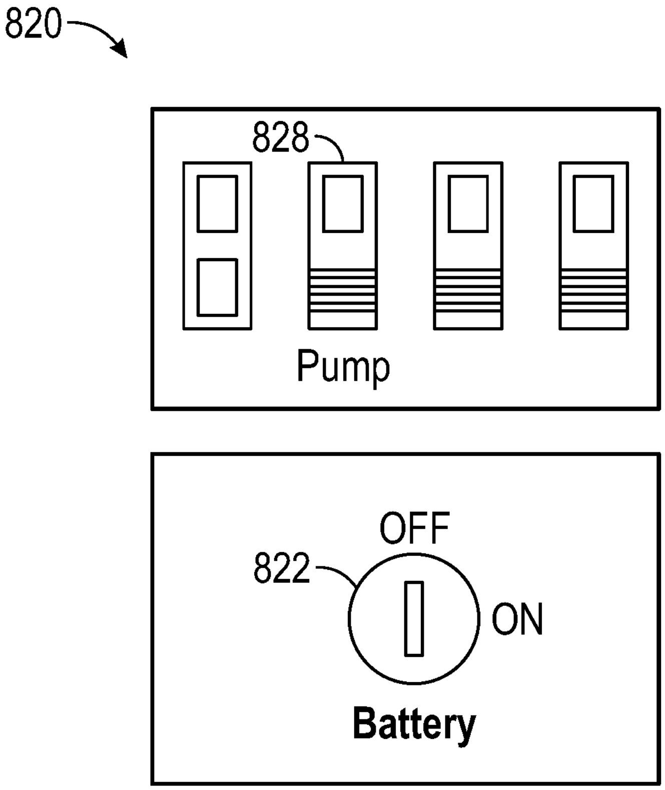

According to an exemplary embodiment, in addition to the overall look of the vehicle 10, the operator controls have been kept as similar to its internal combustion engine driven predecessor such that vehicle starting, vehicle driving, and pumping operations are identical such that the operator has no indication that the vehicle 10 is different (i.e., electrified) and, therefore, eliminates any need for training to get an already experienced operator into a position to drive and operate the vehicle 10 and the components thereof. As shown in FIGS. 27 and 28, the user interface 820 within the front cabin 20 of the vehicle 10 includes a plurality of buttons, dials, switches, etc. that facilitate engaging and operating the driveline 100. Specifically, the user interface 820 includes a first input (e.g., a rotary switch, etc.), shown as battery isolation switch 822, a second input (e.g., a button, a switch, etc.), shown as ignition switch 824, a third input (e.g., a button, a switch, etc.), shown as start switch 826, and a fourth input (e.g., a button, a switch, etc.), shown as pump switch 828. The battery isolation switch 822 can be engaged (e.g., turned, etc.) to allow stored energy within the ESS 700 to be accessed. The ignition switch 824 can then be engaged (e.g., pressed, flipped, etc.) to make low voltage and high voltage contacts engage to activate various electric components of the vehicle 10 (e.g., the front cabin 20 comes to life, the components required to start the engine 202 are activated, etc.). The start switch 826 activates the engine 202 and/or the ETD 500 of the driveline 100 (e.g., based on a mode of operation, based on the current location of the vehicle 10, etc.) that facilitate driving the vehicle 10 and the subsystems thereof (e.g., the pump system 600, the TAD 400, the aerial ladder assembly, etc.). The pump switch 828 (or other subcomponent switch) can then be engaged (e.g., pressed, flipped, etc.) to start the operation thereof (e.g., drive the pump 604 via the ETD 500, drive the aerial ladder assembly via the ETD 500, etc.).

High Voltage Charging System

Figure 29:
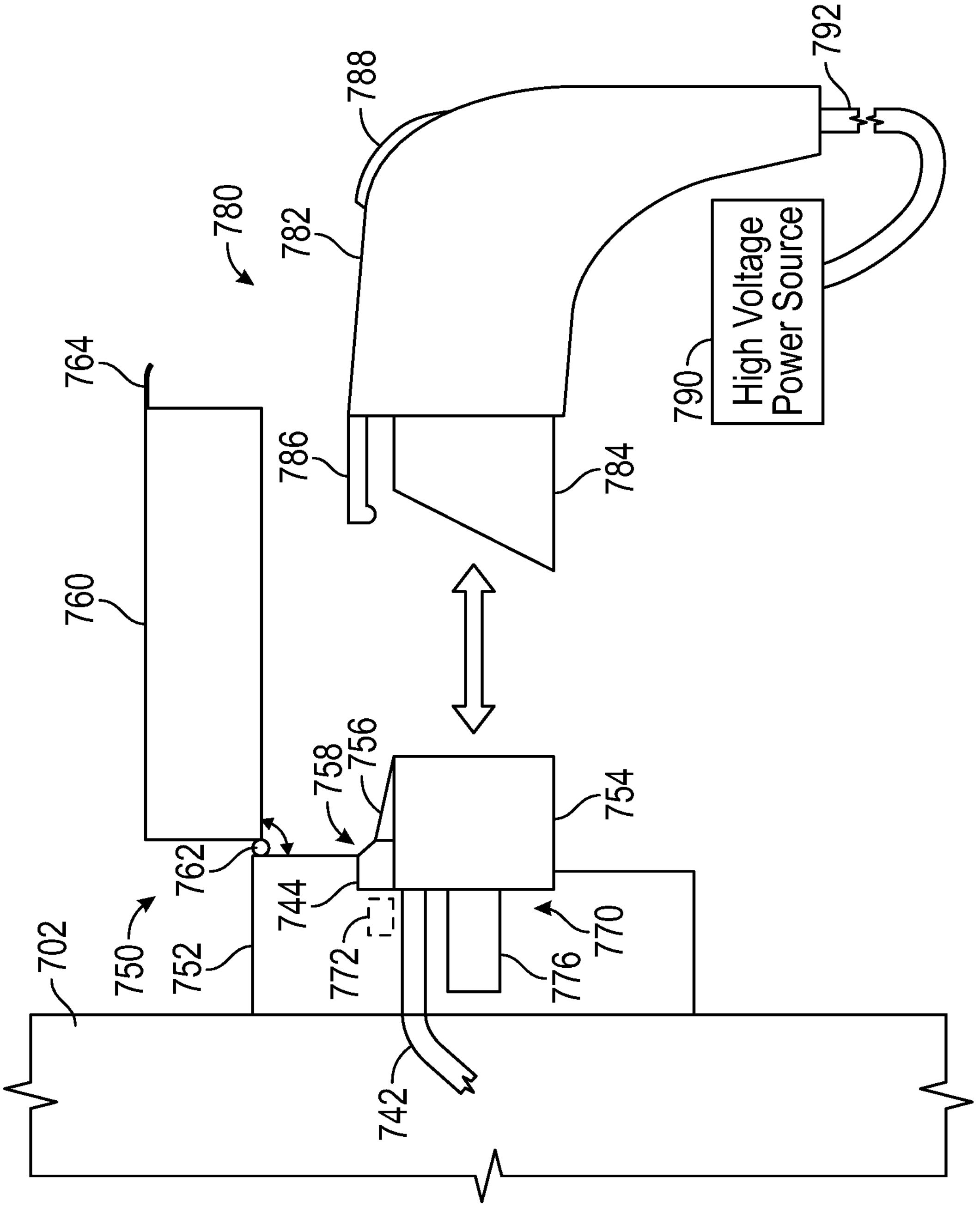
FIG. 29 is a detailed view of a high voltage charging system of the fire fighting vehicle of FIG. 1, according to an exemplary embodiment.

According to the exemplary embodiment shown in FIG. 29, the high voltage charging system 750 is configured to interface with a charging plug, shown as high voltage plug 780, to facilitate charging the battery packs 710 using electricity (e.g., having a voltage between 200 and 800 volts, etc.) received from an external power source (e.g., a wall charger, a charging station, etc.), shown as high voltage power source 790. As shown in FIG. 29, the high voltage charging system 750 includes a body, shown as housing 752, coupled to the support rack 702; a first interface, shown as charging port 754, disposed within the housing 752 and electrically coupled to the battery packs 710 by the high voltage wires 742; a retainer, shown as disconnect retainer 756, positioned along an exterior surface of or proximate the charging port 754; and a second interface, shown as retaining port 758, positioned at an end of the disconnect retainer 756 proximate the housing 752 and defining an aperture or opening that provides a pathway into the housing 752. In other embodiments, the housing 752 is otherwise positioned (e.g., positioned along a side of the front cabin 20, positioned along a side of the rear section 30, etc.). As shown in FIG. 29, the high voltage charging system 750 includes a cover, shown as door 760, pivotally coupled to the housing 752 with a pivoting coupler, shown as hinge 762. The door 760 includes a tab, shown as handle 764, that facilitates repositioning the door 760 relative to the housing 752. The door 760 is positioned to selectively enclose the charging port 754 (e.g., when the charging port 754 is not in use, when the battery packs 710 are not being charged, etc.). In one embodiment, the hinge 762 includes a biasing element (e.g., a torsional spring, etc.) that biases the door 760 into a closed position.

As shown in FIG. 29, the high voltage plug 780 includes a body, shown as plug handle 782, having a first interface, shown as charging interface 784, a second interface, shown as retaining latch 786, a button, shown as latch release button 788, and a charging connector, shown as charging cable 792, connecting the high voltage plug 780 to the high voltage power source 790. The charging interface 784 is configured to interface with the charging port 754 to facilitate charging the battery packs 710 with the high voltage power source 790. The retaining latch 786 is configured to insert into the retaining port 758 when the charging interface 784 engages with the charging port 754. The disconnect retainer 756 is positioned to engage with the retaining latch 786 to prevent the charging interface 784 from disengaging from the charging port 754. The latch release button 788 is configured to facilitate a user with manually repositioning (e.g., pivoting, lifting, etc.) the retaining latch 786 into a position that releases the retaining latch 786 from the disconnect retainer 756 to allow the user to manually withdraw the charging interface 784 and the retaining latch 786 from the charging port 754 and the retaining port 758, respectively, to disconnect the high voltage plug 780 from the high voltage charging system 750.

Figure 30:
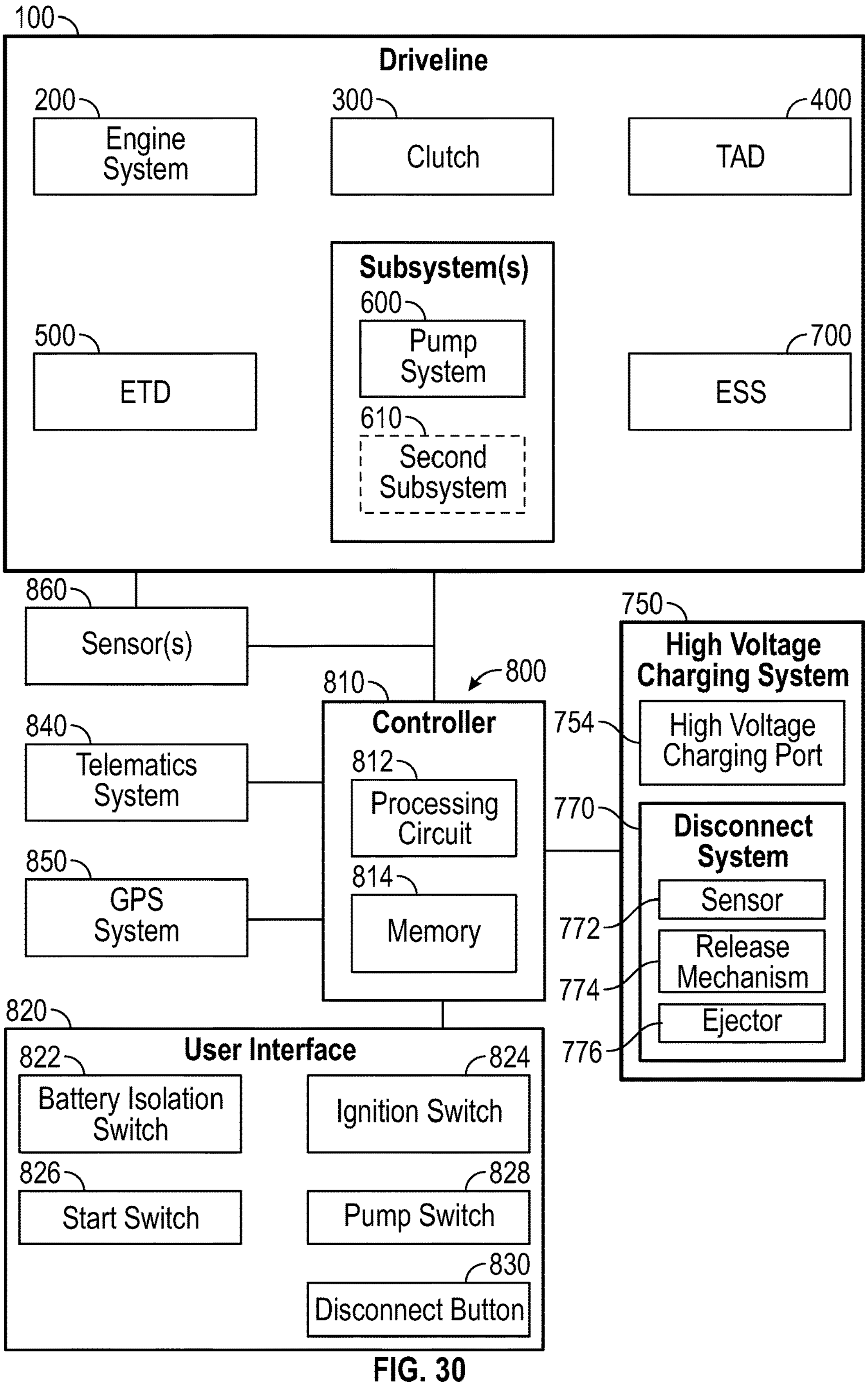
FIG. 30 is a schematic diagram of a control system of the fire fighting vehicle of FIG. 1, according to an exemplary embodiment.

As shown in FIGS. 29 and 30, the high voltage charging system 750 includes a disconnect assembly, shown as disconnect system 770. According to an exemplary embodiment, the disconnect system 770 is configured to facilitate disengaging (e.g., releasing, ejecting, disconnecting, etc.) the high voltage plug 780 from the high voltage charging system 750 without requiring the user to engage the latch release button 788. Specifically, the disconnect system 770 is configured to release the retaining latch 786 from the disconnect retainer 756 and push the high voltage plug 780 such that the charging interface 784 and the retaining latch 786 withdraw from the charging port 754 and the retaining port 758, respectively.

As shown in FIGS. 29 and 30, the disconnect system 770 includes a sensor, shown as sensor 772, a first actuator, shown as release mechanism 774, and a second actuator, shown as ejector 776. According to an exemplary embodiment, the sensor 772 is positioned to detect whether the high voltage plug 780 is engaged with the high voltage charging system 750 and transmit an engagement signal in response to detecting engagement therebetween. In some embodiments, the sensor 772 is or includes a mechanical sensor (e.g., a switch, a contact, etc.) (i) positioned to engage with the charging interface 784 and/or the retaining latch 786 of the high voltage plug 780 when the charging interface 784 is inserted into the charging port 754 and the retaining latch 786 is inserted into the retaining port 758 and (ii) transmit the engagement signal in response to engagement therewith being detected. In some embodiments, the sensor 772 is or includes an electrical sensor (e.g., a current sensor, etc.) (i) positioned to monitor current flow into the charging port 754 and/or through the high voltage wires 742 (i.e., indicating that the charging interface 784 is inserted into the charging port 754) and (ii) transmit the engagement signal in response to detecting the current flow.

According to an exemplary embodiment, the release mechanism 774 is positioned to reposition (e.g., pivot, lift, etc.) the retaining latch 786 into a release position that releases the retaining latch 786 from the disconnect retainer 756 to facilitate withdrawal of the charging interface 784 and the retaining latch 786 from the charging port 754 and the retaining port 758, respectively, to disconnect the high voltage plug 780 from the high voltage charging system 750. The release mechanism 774 may include an actuator, a solenoid, a lever, and/or another component configured to selectively engage with the retaining latch 786 to disengage the retaining latch 786 from the disconnect retainer 756.

According to an exemplary embodiment, the ejector 776 is positioned to push, spit, eject, force, or otherwise disconnect the high voltage plug 780 from the high voltage charging system 750 such that the charging interface 784 and the retaining latch 786 disengage from the charging port 754 and the retaining port 758. The ejector 776 may include an actuator, a solenoid, a plunger, and/or another component configured to selectively force the high voltage plug 780 from engagement with the high voltage charging system 750 following disengagement of the retaining latch 786 from the disconnect retainer 756 by the release mechanism 774.

While the high voltage charging system 750 and the high voltage plug 780 have been described herein as including only one of each of the charging port 754, the disconnect retainer 756, the retaining port 758, the sensor 772, the release mechanism 774, the ejector 776, the charging interface 784, and the retaining latch 786, respectively, in some embodiments, the high voltage charging system 750 and the high voltage plug 780 include two or more of some or all of these components.

Control System

According to the exemplary embodiment shown in FIG. 30, a control system 800 for the vehicle 10 includes a controller 810. In one embodiment, the controller 810 is configured to selectively engage, selectively disengage, control, or otherwise communicate with components of the vehicle 10. As shown in FIG. 30, the controller 810 is coupled to (e.g., communicably coupled to) components of the driveline 100 (e.g., the engine system 200; the clutch 300; the ETD 500; subsystems including the pump system 600 and/or the second subsystem 610 such as, for example, an aerial ladder assembly or another subsystem; the ESS 700; etc.), the high voltage charging system 750, the user interface 820, a first external system, shown as telematics system 840, a second external system, shown as global positioning system ("GPS") 850, and one or more sensors, shown as sensors 860. By way of example, the controller 810 may send and receive signals (e.g., control signals) with the components of the driveline 100, the high voltage charging system 750, the user interface 820, the telematics system 840, the GPS system 850, and/or the sensors 860.

The controller 810 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 30, the controller 810 includes a processing circuit 812 and a memory 814. The processing circuit 812 may include an ASIC, one or more FPGAs, a DSP, circuits containing one or more processing components, circuitry for supporting a microprocessor, a group of processing components, or other suitable electronic processing components. In some embodiments, the processing circuit 812 is configured to execute computer code stored in the memory 814 to facilitate the activities described herein. The memory 814 may be any volatile or non-volatile computer-readable storage medium capable of storing data or computer code relating to the activities described herein. According to an exemplary embodiment, the memory 814 includes computer code modules (e.g., executable code, object code, source code, script code, machine code, etc.) configured for execution by the processing circuit 812. In some embodiments, the controller 810 may represent a collection of processing devices. In such cases, the processing circuit 812 represents the collective processors of the devices, and the memory 814 represents the collective storage devices of the devices.

The user interface 820 includes a display and an operator input, according to one embodiment. The display may be configured to display a graphical user interface, an image, an icon, or still other information. In one embodiment, the display includes a graphical user interface configured to provide general information about the vehicle 10 (e.g., vehicle speed, fuel level, battery level, pump performance/status, aerial ladder information, warning lights, agent levels, water levels, etc.). The graphical user interface may also be configured to display a current mode of operation, various potential modes of operation, or still other information relating to the vehicle 10, the driveline 100, and/or the high voltage charging system 750. By way of example, the graphical user interface may be configured to provide specific information regarding the operation of the driveline 100 (e.g., whether the clutch 300 is engaged, whether the engine 202 is on, whether the pump 604 is in operation, etc.).

The operator input may be used by an operator to provide commands to the components of the vehicle 10, the driveline 100, the high voltage charging system 750, and/or still other components or systems of the vehicle 10. As shown in FIG. 30, the operator input includes the battery isolation switch 822, the ignition switch 824, the start switch 826, the pump switch 828, and a fifth input (e.g., a button, a switch, a soft key, etc.), shown as disconnect button 830. The disconnect button 830 may be positioned within the front cabin 20 and/or external to the front cabin 20 (e.g., on or proximate the high voltage charging system 750). Therefore, the vehicle 10 may include multiple disconnect buttons 830. The operator input may include one or more additional buttons, knobs, touchscreens, switches, levers, joysticks, pedals, or handles. In some instances, an operator may be able to press a button and/or otherwise interface with the operator input to command the controller 810 to change a mode of operation for the driveline 100. The operator may be able to manually control some or all aspects of the operation of the driveline 100, the high voltage charging system 750, and/or other components of the vehicle 10 using the display and the operator input. It should be understood that any type of display or input controls may be implemented with the systems and methods described herein.

The telematics system 840 may be a server-based system that monitors various telematics information and provides telematics data based on the telematics information to the controller 810 of the vehicle 10. The GPS system 850 may similarly be a server-based system that monitors various GPS information and provides GPS data based on the GPS information to the controller 810 of the vehicle 10. The telematics data may include an indication that the vehicle 10 is being dispatched to a scene. The telematics data may additionally or alternatively include details regarding the scene such as the location of the scene, characteristics of the scene (e.g., the type of fire, the current situation, etc.), and the like. The GPS data may include an indication of a current location of the vehicle 10. The GPS data and/or the telematics data may additionally or alternatively include route details between the current location of the vehicle 10 and the location of the scene such as route directions, emissions regulations along the route, noise restrictions along the route, a proximity of the vehicle 10 to a predetermined geofence (e.g., a roll-out geofence, a roll-in geofence, a noise restriction geofence, an emissions limiting geofence, etc.), and the like. Such telematics data and/or GPS data may be utilized by the controller 810 to perform one or more functions described herein.

In some embodiments, the telematics system 840 and the GPS system 850 are integrated into a single system. In some embodiments, the controller 810 is configured to function as an intermediary between the telematics system 840 and the GPS system 850. By way of example, the controller 810 may receive the telematics data from the telematics system 840 when the vehicle 10 is assigned to be dispatched to a scene and, then, the controller 810 may use the telematics data to acquire the GPS data from the GPS system 850. In some embodiments, the telematics system 840 and the GPS system 850 are configured to communicate directly with each other (e.g., the GPS system 850 may acquire scene location information from the telematics system 840 to provide the GPS data to the controller 810, etc.) such that the controller 810 does not need to function as an intermediary. The controller 810 may receive or acquire the telematics data and/or the GPS data from the telematics system 840 and/or GPS system 850 on a periodic basis, automatically, upon request, and/or in another suitable way.

The sensors 860 may include one or more sensors that are configured to acquire sensor data to facilitate monitoring operational parameters/characteristics of the components of the driveline 100 with the controller 810. By way of example, the sensors 860 may include one or more engine sensors (e.g., a speed sensor, an exhaust gas sensor, a $NO_x$ sensor, an $O_2$ sensor, etc.) that are configured to facilitate monitoring operational parameters/characteristics of the engine system 200 (e.g., engine speed, exhaust gas composition, $NO_x$ levels, $O_2$ levels, etc.). By way of another example, the sensors 860 may additionally or alternatively include one or more ETD sensors (e.g., speed sensors, voltage sensors, current sensors, etc.) that are configured to facilitate monitoring operational parameters/characteristics of the ETD 500 (e.g., input speed; output speed; voltage, current, and/or power of incoming power from the ESS 700; voltage, current, and/or power generated by the ETD 500; etc.). By way of still another example, the sensors 860 may additionally or alternatively include one or more subsystem sensors (e.g., speed sensors, flow rate sensors, pressure sensors, water level sensors, agent level sensors, position sensors, etc.) that are configured to facilitate monitoring operational parameters/characteristics of the pump system 600 (e.g., pump speed, output fluid flow rate, output fluid pressure, water level, agent level, etc.) and/or the second subsystem 610 (e.g., aerial ladder rotational position, aerial ladder horizontal length, aerial ladder vertical height, etc.). By way of still another example, the sensors 860 may additionally or alternatively include one or more ESS sensors (e.g., voltage sensors, current sensors, state-of-charge ("SOC") sensors, etc.) that are configured to facilitate monitoring operational parameters/characteristics of the ESS 700 (e.g., voltage, current, and/or power of incoming power from the ETD 500 and/or the high voltage charging system 750; voltage, current, and/or power being output to the electrically-operated components of the vehicle 10; a SOC of the ESS 700; etc.). In some embodiments, the controller 810 is configured to automatically change a mode of operation for the driveline 100 and/or recommend to an operator via the user interface 820 to approve a change to the mode of operation of the driveline 100 based on the telematics data, the GPS data, and/or the sensor data.

Charging System Controls

In some embodiments, the controller 810 is configured to perform an auto-start sequence in response to receiving an indication that the high voltage plug 780 is manually disconnected from the high voltage charging system 750 of the vehicle 10. By way of example, the sensor 772 may transmit a disengagement signal to the controller 810 when the sensor 772 detects that the high voltage plug 780 is manually disconnected from the high voltage charging system 750 by the operator. The auto-start sequence may be or include the start sequence described herein in relation to the battery isolation switch 822, the ignition switch 824, and the start switch 826. The vehicle 10 may, therefore, be ready for responding shortly after the high voltage plug 780 is disconnected and without requiring the operator to manually perform the start sequence, providing easier operation for the operator and quicker response times.

In some embodiments, the controller 810 is configured to eject the high voltage plug 780 from the high voltage charging system 750 in response to receiving an eject command from the operator via the disconnect button 830. Specifically, the controller 810 is configured to (i) activate the release mechanism 774 to reposition the retaining latch 786 of the high voltage plug 780 into a release position that releases the retaining latch 786 from the disconnect retainer 756 and then (ii) activate the ejector 776 to push, spit, eject, force, or otherwise disconnect the high voltage plug 780 from the high voltage charging system 750 such that the charging interface 784 and the retaining latch 786 disengage from the charging port 754 and the retaining port 758. In some embodiments, the controller 810 is configured to perform the auto-start sequence following the ejection of the high voltage plug 780 in response to the eject command.

In some embodiments, the controller 810 is configured to prevent the vehicle 10 from moving while the high voltage plug 780 is connected to the high voltage charging system 750. In such embodiments, the controller 810 may be configured to provide a warning notification to the operator via the user interface 820 instructing the operator to manually disconnect the high voltage plug 780 or eject the high voltage plug 780 via the disconnect button 830 in response to the vehicle 10 being started or put into gear (e.g., drive, reverse, etc.) with the high voltage plug 780 still connected to the high voltage charging system 750.

In some embodiments, the controller 810 is configured to automatically eject the high voltage plug 780 from the high voltage charging system 750 via the disconnect system 770 in response the operator performing the start sequence (e.g., via the battery isolation switch 822, the ignition switch 824, and the start switch 826) and/or in response to the operator putting the vehicle 10 into gear (e.g., drive, reverse, etc.) with the high voltage plug 780 still connected to the high voltage charging system 750.

In some embodiments, the controller 810 is configured to perform the auto-start sequence and/or automatically eject the high voltage plug 780 from the high voltage charging system 750 via the disconnect system 770 based on the telematics data received from the telematics system 840. By way of example, the telematics data may indicate that the vehicle 10 is being dispatched to a scene. The controller 810 may be configured to perform the auto-start sequence and/or automatically eject the high voltage plug 780 based on the telematics data to prepare the vehicle 10 for scene response without requiring the operator to perform the start sequence, manually disconnect the high voltage plug 780, and/or eject the high voltage plug 780 using the disconnect button 830. In embodiments where the controller 810 is configured to perform both the auto-start sequence and automatically eject the high voltage plug 780 based on the telematics data, the controller 810 may (i) perform the auto-start sequence first and then eject the high voltage plug 780, (ii) eject the high voltage plug 780 first and then perform the auto-start sequence, or (iii) perform the auto-start sequence and eject the high voltage plug 780 simultaneously.

In some embodiments, the controller 810 is configured to stop the draw of power by the battery packs 710 from the high voltage power source 790 prior to ejecting the high voltage plug 780. This may be performed by transmitting a signal to the high voltage power source 790 to stop providing power and/or by stopping the flow of power at a location between the battery packs 710 and the charging port 754, at the charging port 754, or at the battery packs 710.

Operational Modes

As a general overview, the controller 810 is configured to operate the driveline 100 in various operational modes. In some embodiments, the controller 810 is configure to generate control signals for one or more components of the driveline 100 to transition the driveline 100 between the various operational modes in response to receiving a user input, a command, a request, etc. from the user interface 820. In some embodiments, the controller 810 is configure to generate control signals for one or more components of the driveline 100 to transition the driveline 100 between the various operational modes based on the telematics data, the GPS data, and/or the sensor data. The various operational modes of the driveline 100 may include a pure engine mode, a pure electric mode, a charging mode, an electric generation drive mode, a boost mode, a distributed drive mode, a roll-out mode, a roll-in mode, a stop-start mode, a location tracking mode, a scene mode, a pump-and-roll mode, and/or still other modes. In some embodiments, two or more modes may be active simultaneously. In some embodiments (e.g., in embodiments where the driveline 100 is a "dual drive" driveline that is not operable as a "hybrid" driveline, etc.), the driveline 100 is not operable in the charging mode of operation.

Pure Engine Mode

The controller 810 may be configured to operate the vehicle 10 in a pure engine mode of operation. To initiate the pure engine mode of operation, the controller 810 is configured to engage the clutch 300 to couple (i) the engine 202 to the TAD 400 and (ii) the engine 202 to the ETD 500. The engine 202 may, therefore, provide a mechanical output (e.g., based on a control signal from the controller 810, based on an input received from an accelerator pedal, etc.) to the TAD 400 to operate the accessories 412 and/or the ETD 500. During the pure engine mode of operation, the controller 810 is configured to control the ETD 500 such that the ETD 500 functions as a mechanical conduit or power divider between (i) the engine 202 and (ii) one or more other components of the driveline 100 including (a) the front axle 14 and/or the rear axle 16 and/or (b) the vehicle subsystem(s) including the pump system 600 and/or the second subsystem 610 (e.g., an aerial ladder assembly, etc.). In some embodiments, the ETD 500 is not configured to generate electricity based on a mechanical input received from the engine 202. In some embodiments, the ETD 500 is configured to generate electricity based on a mechanical input received from the engine 202, however, the controller 810 is configured to control the ETD 500 such that the ETD 500 does not generate electricity (e.g., for storage in the ESS 700, for use by the ETD 500, etc.) during the pure engine mode of operation.

In some embodiments, the controller 810 is configured to implement the pure engine mode of operation in response to a request from the operator of the vehicle 10 via the user interface 820. In some embodiments, the controller 810 is configured to implement the pure engine mode of operation in response to the SOC of the ESS 700 reaching or falling below a SOC threshold. In one embodiment, the SOC threshold is determined based on an amount of stored energy needed to perform one or more of the other modes of operation along the route of the vehicle 10 (e.g., the roll-out mode, the roll-in mode, the location tracking mode, etc.). In another embodiment, the SOC threshold is manufacturer or owner set (e.g., 10%, 20%, 25%, 30%, 40%, etc.). In some embodiments, the controller 810 is configured to prevent the pure engine mode of operation from being engaged (e.g., when the vehicle 10 is within a roll-out geofence, when the vehicle 10 is within a roll-in geofence, when the vehicle 10 is within a noise restriction geofence, when the vehicle 10 is within an emissions limiting geofence, regardless of the SOC of the ESS 700, etc.).

Pure Electric Mode

The controller 810 may be configured to operate the vehicle 10 in a pure electric mode of operation. To initiate the pure electric mode of operation, the controller 810 is configured to (i) turn off the engine 202 (if the engine 202 is on) and (ii) disengage the clutch 300 (if the clutch 300 is engaged) to decouple the engine 202 from the remainder of the driveline 100 (e.g., the TAD 400, the ETD 500, etc.). During the pure electric mode of operation, the ETD 500 is configured to draw and use power from the ESS 700 to provide a mechanical output (e.g., based on a control signal from the controller 810, based on an input received from an accelerator pedal, etc.) to (i) the TAD 400 to operate the accessories 412 and/or (ii) one or more other components of the driveline 100 including (a) the front axle 14 and/or the rear axle 16 and/or (b) the vehicle subsystem(s) including the pump system 600 and/or the second subsystem 610 (e.g., an aerial ladder assembly, etc.).

In some embodiments, the controller 810 is configured to implement the pure electric mode of operation in response to a request from the operator of the vehicle 10 via the user interface 820. In some embodiments, the controller 810 is configured to implement the pure electric mode of operation in response to the SOC of the ESS 700 being above the SOC threshold (e.g., to provide increased fuel efficiency, to reduce noise pollution, etc.). In one embodiment, the SOC threshold is determined based on an amount of stored energy needed to perform one or more of the other modes of operation along the route of the vehicle 10 (e.g., the roll-out mode, the roll-in mode, the location tracking mode, etc.). In some embodiments, the controller 810 is configured to implement the pure electric mode of operation regardless of the SOC of the ESS 700 (e.g., when the vehicle 10 is within a roll-out geofence, when the vehicle 10 is within a roll-in geofence, when the vehicle 10 is within a noise restriction geofence, when the vehicle 10 is within an emissions limiting geofence, etc.).

Charging Mode

The controller 810 may be configured to operate the vehicle 10 in a charging mode of operation. To initiate the charging mode of operation, the controller 810 is configured to engage the clutch 300 to couple (i) the engine 202 to the TAD 400 and (ii) the engine 202 to the ETD 500. The engine 202 may, therefore, provide a mechanical output (e.g., based on a control signal from the controller 810, based on an input received from an accelerator pedal, etc.) to the TAD 400 to operate the accessories 412 and/or the ETD 500. During the charging mode of operation, the controller 810 is configured to control the ETD 500 such that the ETD 500 functions at least partially as a generator. Specifically, the engine 202 provides a mechanical input to the ETD 500 and the ETD 500 converts the mechanical input into electricity. The ETD 500 may be configured to provide the generated electricity to the ESS 700 to charge the ESS 700 and, optionally, (i) provide the generated electricity to power one or more electrically-operated accessories or components of the vehicle 10 and/or (ii) use the generated electricity to operate the ETD 500 at least partially as a motor to drive one or more component of the driveline 100 including the front axle 14, the rear axle 16, the pump system 600, and/or the second subsystem 610.

In some embodiments, the controller 810 is configured to implement the charging mode of operation in response to a request from the operator of the vehicle 10 via the user interface 820. In some embodiments, the controller 810 is configured to implement the charging mode of operation in response to the SOC of the ESS 700 being below the SOC threshold. In some embodiments, the controller 810 is configured to implement the charging mode of operation only when the vehicle 10 is stationary and/or parked (e.g., at a scene, at the fire house, etc.). In such embodiments, the ETD 500 may not function as a motor during the charging mode of operation. Alternatively, the ETD 500 may function as a motor during the charging mode of operation to drive the subsystems (e.g., the pump system 600, the second subsystem 610, etc.).

Electric Generation Drive Mode

The controller 810 may be configured to operate the vehicle 10 in an electric generation drive mode of operation. In the electric generation drive mode of operation, (i) the engine 202 is configured to consume fuel from a fuel tank to drive one or more components of the driveline 100 and (ii) the ETD 500 is configured to generate electricity to drive one or more components of the driveline 100. To initiate the electric generation drive mode of operation, the controller 810 is configured to engage the clutch 300 to couple (i) the engine 202 to the TAD 400 and (ii) the engine 202 to the ETD 500. During the electric generation drive mode, (i) the engine 202 drives the TAD 400 and the ETD 500 through the clutch 300 using fuel and (ii) the ETD 500 (a) generates electricity based on the mechanical input from the engine 202 and (b) uses the generated electricity to drive the front axle 14, the rear axle 16, the pump system 600, and/or the second subsystem 610.

In some embodiments, the controller 810 is configured to implement the electric generation drive mode of operation in response to a request from the operator of the vehicle 10 via the user interface 820. In some embodiments, the controller 810 is configured to implement the electric generation drive mode of operation in response to the SOC of the ESS 700 being below the SOC threshold.

Boost Mode

The controller 810 may be configured to operate the vehicle 10 in a boost mode of operation. To initiate the boost mode of operation, the controller 810 is configured to engage the clutch 300 to couple (i) the engine 202 to the TAD 400 and (ii) the engine 202 to the ETD 500. During the boost mode, (i) the engine 202 drives the TAD 400 and the ETD 500 through the clutch 300 using fuel and (ii) the ETD 500 (a) generates electricity based on the mechanical input from the engine 202 and (b) uses the generated electricity and the stored energy in the ESS 700 to drive the front axle 14, the rear axle 16, the pump system 600, and/or the second subsystem 610. Such combined energy generation and energy draw facilitates "boosting" the output capabilities of the ETD 500.

In some embodiments, the controller 810 is configured to implement the boost mode of operation in response to a request from the operator of the vehicle 10 via the user interface 820. In some embodiments, the controller 810 is configured to implement the boost mode of operation in response to a need for additional output from the ETD 500 (and if there is sufficient SOC in the ESS 700) to drive the front axle 14, the rear axle 16, the pump system 600, and/or the second subsystem 610.

Distributed Drive Mode

In some embodiments, the ETD 500 includes an ETD clutch that facilitates decoupling the ETD 500 from the TAD 400 and, therefore, decoupling the ETD 500 from the engine 202 when the clutch 300 is engaged. In such embodiments, the controller 810 may be configured to operate the vehicle 10 in a distributed drive mode of operation. To initiate the distributed drive mode of operation, the controller 810 is configured to engage the clutch 300 to couple the engine 202 to the TAD 400 and disengage the ETD clutch to disengage the ETD 500 from the engine 202 and the TAD 400. During the distributed drive mode, (i) the engine 202 drives the TAD 400 through the clutch 300 using fuel and (ii) the ETD 500 drives the front axle 14, the rear axle 16, the pump system 600, and/or the second subsystem 610 using stored energy in the ESS 700.

In some embodiments, the controller 810 is configured to implement the distributed drive mode of operation in response to a request from the operator of the vehicle 10 via the user interface 820. In some embodiments, the controller 810 is configured to implement the distributed drive mode of operation to reduce a load on the engine 202 and/or the ETD 500 by distributing component driving responsibilities.

Roll-Out Mode

The controller 810 may be configured to operate the vehicle 10 in a roll-out mode of operation. For the roll-out mode of operation, the controller 810 is configured to operate the driveline 100 similar to the pure electric mode of operation. More specifically, the controller 810 is configured to start the vehicle 10 and operate the components of the driveline 100 (e.g., the TAD 400, the front axle 14, the rear axle 16, the pump system 600, the second subsystem 610, etc.) with the ETD 500 while the engine 202 is off until a roll-out condition it met. Once the roll-out condition is met, the controller 810 is configured to transition the driveline 100 to the pure electric mode, the pure engine mode, the charging mode, the electric generation drive mode, the boost mode, the distributed drive mode, the scene mode, or still another suitable mode depending on the current state of the vehicle 10 (e.g., SOC of the ESS 700, etc.) and/or the location of the vehicle 10 (e.g., en route to the scene, at the scene, in a noise reduction zone, in an emission free/reduction zone, etc.). The roll-out condition may be or include (i) the vehicle 10 traveling a predetermined distance or being outside of a roll-out geofence (e.g., indicated by the telematics data, the GPS data, etc.), (ii) the vehicle 10 reaching a certain speed, (iii) the vehicle 10 reaching a certain location (e.g., a scene, etc.; indicated by the telematics data, the GPS data, etc.), (iv) the vehicle 10 being driven for a period of time, (v) the SOC of the ESS 700 reaching or falling below the SOC threshold, and/or (vi) the operator selecting a different mode of operation. The roll-out mode of operation may facilitate preventing combustion emissions of the engine 202 filling the fire station, hanger, or other indoor or ventilation-limited location where the vehicle 10 may be located upon startup and take-off. For example, when in the roll-out mode of operation, the vehicle 10 may begin transportation to the scene without requiring startup of the engine 202. The engine 202 may then be started after the vehicle 10 has already begun transportation to the scene (if necessary).

In some embodiments, the controller 810 is configured to implement the roll-out mode of operation in response to a request from the operator of the vehicle 10 via the user interface 820. In some embodiments, the controller 810 is configured to implement the roll-out mode of operation in response to the telematics data and/or the GPS data indicating that (i) the vehicle 10 has been selected to respond to a scene and/or (ii) the vehicle 10 is inside of a roll-out geofence (e.g., inside or proximate a fire station, a hanger, another vehicle storage location that is indoors, a location with limited ventilation, etc.). In some embodiments, the controller 810 is configured to implement the roll-out mode of operation regardless of the SOC of the ESS 700, so long as the SOC of the ESS 700 is sufficient to complete the roll-out operation (e.g., which may be to simply drive out of the fire house or other minimal distance). In some embodiments, the controller 810 is configured to implement the roll-out mode only if the SOC of the ESS 700 is above a first SOC threshold and maintain operating the driveline 100 in the pure electric mode of the operation until the SOC of the ESS 700 reaches or falls below a second SOC threshold that is different than (e.g., greater than, less than, etc.) the first SOC threshold. By way of example, the first SOC threshold may be 40% and the second SOC threshold may be 20%.

Roll-In Mode

The controller 810 may be configured to operate the vehicle 10 in a roll-in mode of operation. For the roll-in mode of operation, the controller 810 is configured to operate the driveline 100 similar to the pure electric mode of operation. More specifically, the controller 810 is configured to turn off the engine 202 (if already on) and operate the components of the driveline 100 (e.g., the TAD 400, the front axle 14, the rear axle 16, the pump system 600, the second subsystem 610, etc.) with the ETD 500 while the engine 202 is off when a roll-in condition is present. When the roll-in condition is present, the controller 810 is configured to transition the driveline 100 from whatever mode the driveline 100 is currently operating in to the roll-in mode. The roll-in condition may be or include (i) the vehicle 10 entering a roll-in geofence (e.g., indicated by the telematics data, the GPS data, etc.), (ii) the vehicle 10 reaching a certain location (e.g., a fire house, a hanger, a location where the vehicle 10 is indoors or where ventilation to the outside is limited, etc.; indicated by the telematics data, the GPS data, etc.), and/or (iii) the operator selecting the roll-in mode of operation. The roll-in mode of operation may facilitate preventing combustion emissions of the engine 202 filling the fire station or other location where ventilation may be limited.

In some embodiments, the controller 810 is configured to implement the roll-in mode of operation in response to a request from the operator of the vehicle 10 via the user interface 820. In some embodiments, the controller 810 is configured to implement the roll-in mode of operation in response to the telematics data and/or the GPS data indicating that the vehicle 10 is inside of a roll-in geofence (e.g., inside or proximate a fire station, a hanger, another vehicle storage location that is indoors, a location with limited ventilation, etc.). In some embodiments, the controller 810 is configured to implement the roll-in mode of operation regardless of the SOC of the ESS 700, so long as the SOC of the ESS 700 is sufficient to complete the roll-in operation (e.g., which may be to simply drive into the fire house or other minimal distance).

Location Tracking Mode

The controller 810 may be configured to operate the vehicle 10 in a location tracking mode of operation. For the location tracking mode of operation, the controller 810 is configured to (i) monitor the telematics data and/or the GPS data as the vehicle 10 is driving and (ii) switch the driveline 100 between (a) a first mode of operation where the engine 202 is used (e.g., the pure engine mode of operation, the electric generation drive mode of operation, the charging mode of operation, the boost mode of operation, the distributed drive mode of operation, etc.) and (b) a second mode of operation where the engine 202 is not used (e.g., the pure electric mode of operation, the roll-out mode of operation, the roll-in mode of operation, etc.) based on the telematics data and/or the GPS data.

By way of example, the GPS data and/or the telematics data may include route details (i) between the current location of the vehicle 10 and a location ahead of the vehicle 10 or (ii) along a planned route of the vehicle 10. The route details may indicate emissions regulations and/or noise restriction information ahead of the vehicle 10 and/or along the planned route of the vehicle 10. The controller 810 may, therefore, be configured to monitor the location of the vehicle 10 and transition the driveline 100 from the first mode of operation where the engine 202 is used to the second mode of operation where the engine 202 is not used in response to the vehicle 10 approaching and/or entering an emission-restricted and/or noise-restricted zone (e.g., a roll-out geofence, a roll-in geofence, a noise restriction geofence, an emissions limiting geofence, etc.) to reduce or eliminate emissions and/or noise pollution emitted from the vehicle 10 due to operation of the engine 202. The controller 810 may then be configured to transition the driveline 100 back to the first mode of operation where the engine 202 is used after leaving the emission-restricted and/or noise-restricted zone. During the location tracking mode of operation, the controller 810 may, therefore, forecast future electric consumption needs and manage the SOC of the ESS 700 to ensure enough SOC is saved or regenerated to accommodate the electric consumption needs of the vehicle 10 along the route.

In some embodiments, the controller 810 is configured to implement the location tracking mode of operation in response to a request from the operator of the vehicle 10 via the user interface 820. In some embodiments, the controller 810 is configured to implement the location tracking mode of operation each time the vehicle 10 is turned on (e.g., if approved by the owner, etc.).

Stop-Start Mode

The controller 810 may be configured to operate the vehicle 10 in a stop-start mode of operation. For the stop-start mode of operation, the controller 810 is configured to transition the driveline 100 between (i) a first mode of operation where the engine 202 is used (e.g., the pure engine mode of operation, the electric generation drive mode of operation, the charging mode of operation, the boost mode of operation, the distributed drive mode of operation, etc.) and (ii) a second mode of operation where the engine 202 is not used (e.g., the pure electric mode of operation, etc.) in response to a stopping event. By way of example, the controller 810 may be configured to monitor for stopping events and then, if the vehicle 10 stays stationary for more than a time threshold (e.g., one, two, three, four, etc. seconds), turn off the engine 202 if the driveline 100 is currently operating in the first mode of operation where the engine 202 is used. The controller 810 may then be configured to initiate the second mode of operation where the engine 202 is not used (e.g., the pure electric mode of the operation, etc.) for the subsequent take-off (e.g., in response to an accelerator pedal input, etc.). The controller 810 may be configured to transition the driveline 100 back to the first mode of operation in response to a transition condition. The transition condition may be or include (i) the vehicle 10 traveling a predetermined distance, (ii) the vehicle 10 reaching a certain speed, (iii) the vehicle 10 being driven for a period of time, (iv) the SOC of the ESS 700 reaching or falling below the SOC threshold, and/or (v) the operator selecting the first mode of operation.

In some embodiments, the controller 810 is configured to implement the stop-start mode of operation in response to a request from the operator of the vehicle 10 via the user interface 820. In some embodiments, the controller 810 is configured to implement the stop-start mode of operation each time the vehicle 10 is turned on (e.g., if approved by the owner, etc.). In some embodiments, the controller 810 is configured to implement the stop-start mode of operation only if the SOC of the ESS 700 is above the SOC threshold.

Scene Mode

The controller 810 may be configured to operate the vehicle 10 in a scene mode of operation. For the scene mode of operation, the controller 810 is configured to control the ETD 500 to drive the subsystems including the pump system 600 and/or the second subsystem 610. In one embodiment, the controller 810 is configured to operate the driveline 100 in the pure engine mode of operation to provide the scene mode of operation. In some embodiments, the pure engine mode of operation is used regardless of the level of SOC of the ESS 700. In another embodiment, the controller 810 is configured to operate the driveline 100 in the pure electric mode of operation to provide the scene mode of operation. In such an embodiment, the use of the pure electric mode may be dependent upon the SOC of the ESS 700 being above a SOC threshold. In other embodiments, the controller 810 is configured to operate the driveline 100 in the electric generation drive mode of operation, the boost mode of operation, the distributed drive mode of operation, or the charging mode of operation to provide the scene mode of operation.

In some embodiments, the controller 810 is configured to implement the scene mode of operation in response to a request from the operator of the vehicle 10 via the user interface 820 (e.g., to engage the pump system 600, the second subsystem 610, etc.). In some embodiments, the controller 810 is configured to implement the scene mode of operation automatically upon detecting that the vehicle 10 arrived at the scene (e.g., based on the GPS data, etc.). In some embodiments, the controller 810 is configured to implement the scene mode of operation only if the vehicle 10 is in a park state. When leaving the scene, the controller 810 may be configured to implement the roll-out mode of operation, the pure electric mode of operation, the pure engine mode of operation, the electric generation drive mode of operation, the boost mode of operation, the distributed drive mode of operation, or the charging mode of operation dependent upon operational needs along the route back to the station and/or the current state of the vehicle 10 (e.g., the SOC of the ESS 700, roll-in requirements, noise restrictions, emissions restrictions, etc.).

Pump-And-Roll Mode

The controller 810 may be configured to operate the vehicle 10 in a pump-and-roll mode of operation. For the pump-and-roll mode of operation, the controller 810 is configured to control the ETD 500 to (i) drive the subsystems including the pump system 600 and/or the second subsystem 610 and (ii) the front axle 14 and/or the rear axle 16, simultaneously. In one embodiment, the controller 810 is configured to operate the driveline 100 in the pure engine mode of operation to provide the pump-and-roll mode of operation. In some embodiments, the pure engine mode of operation is used regardless of the level of SOC of the ESS 700. In another embodiment, the controller 810 is configured to operate the driveline 100 in the pure electric mode of operation to provide the pump-and-roll mode of operation. In such an embodiment, the use of the pure electric mode may be dependent upon the SOC of the ESS 700 being above a SOC threshold. In other embodiments, the controller 810 is configured to operate the driveline 100 in the electric generation drive mode of operation, the boost mode of operation, the distributed drive mode of operation, or the charging mode of operation to provide the pump-and-roll mode of operation. In some embodiments, the controller 810 is configured to implement the pump-and-roll mode of operation in response to a request from the operator of the vehicle 10 via the user interface 820 (e.g., to engage the pump system 600 and/or the second subsystem 610 while driving the vehicle 10, an accelerator pedal input while pumping, etc.).

Transition Between Electric Drive and Engine Drive Operations

The controller 810 may be configured to operate the vehicle 10 to seamlessly transition between (i) a first mode of operation where the engine 202 is not providing an input to the ETD 500 (e.g., the pure electric mode, the distributed drive mode, etc.) and (ii) a second mode of operation where the engine 202 is providing an input to the ETD 500 (e.g., the pure engine mode, the charging mode, the electric generation drive mode, the boost mode, etc.). Specifically, the controller 810 may be configured to control the mode transition to provide seamless power delivery, whether to the ground (e.g., the front axle 14 and/or the rear axle 16) or to PTO driven components (e.g., the pump system 600, the second subsystem 610, the aerial ladder assembly, etc.) to allow continuous, uninterrupted operation. The ability to seamlessly transition modes on the vehicle 10 is particularly important to meet the operational mission profile that such a vehicle is expected to deliver.

By way of example, the controller 810 may be configured transition from the first mode of operation (i.e., where no input is provided by the engine 202 to the ETD 500) to the second mode of operation (i.e., where an input is provided by the engine 202 to the ETD 500), or vice versa, in response to a transition condition. As described above, the transition condition(s) may be or include the SOC of the ESS 700 reaching a minimum SOC threshold, an operator transition command, a roll-out geofence, a roll-in geofence, an emissions limiting geofence, a noise restriction geofence, and/or still other conditions. In response to the transition condition and to provide seamless transition from the first mode to the second mode, the controller 810 may be configured to (i) start the engine 202 (if off), (ii) adjust the speed of the engine 202 to match the speed of the ETD 500 at the input thereof, and (iii) once the speed is matched, engage the clutch 300 to couple the engine 202 to the ETD 500. In embodiments where the ETD 500 includes the ETD clutch, the controller 810 may be configured to engage the clutch 300 (if not already engaged) and the ETD clutch when the speed is matched. In some embodiments (e.g., embodiments where the ETD 500 does not charge the ESS 700 based on the mechanical input received from the engine 202), at the moment when the clutch 300 and/or the ETD clutch are engaged, the controller 810 may be configured to control the ETD 500 to prevent energy from being transferred to the ESS 700 (if the ETD 500 is being operated to generate electricity in the second mode). In some embodiments, the controller 810 is configured to physically disconnect the ESS 700 from the ETD 500 (e.g., by opening ESS contactors) to provide a physical barrier between the ESS 700 and the ETD 500. However, such physical disconnection would prevent charging the ESS 700 with the ETD 500 during a regenerative braking event.

Alternative Drivelines

Referring to FIGS. 31-48, alternatives to the driveline 100 are shown, according to various embodiments. Any of the drivelines shown in FIGS. 31-48 can be implemented in the vehicle 10 in place of the driveline 100. The drivelines shown in FIGS. 31-48, may be similar to the driveline 100 (e.g., including front and rear axles, etc.) and can be configured to transfer mechanical energy from a source (e.g., an electric motor, an internal combustion engine, etc.) to one or more wheels, axles, systems (e.g., a pump system), ESS, etc. of the vehicle 10. In some embodiments, any of the drivelines shown in FIGS. 31-48 include an internal combustion engine configured to provide mechanical energy.

Any of the drivelines shown in FIGS. 31-48 can include a clutched TAD for providing power or mechanical energy to any of an air conditioning ("AC") compressor, an air compressor, a power steering system or pump, an alternator, etc. Any of the drivelines shown in FIGS. 31-48 can be integrated with a battery (e.g., a 155 kW battery at a 2 Coulomb max discharge). Any of the drivelines shown in FIGS. 31-48 can be integrated with an electrical or controller area network ("CAN") of the vehicle 10. Any of the drivelines of FIGS. 31-48 can be integrated with pump operation or controls of the vehicle 10, operator interface controls of the vehicle 10, or power management controls of the vehicle 10.

Alternative 1—E-Axle Driveline

Figure 31:
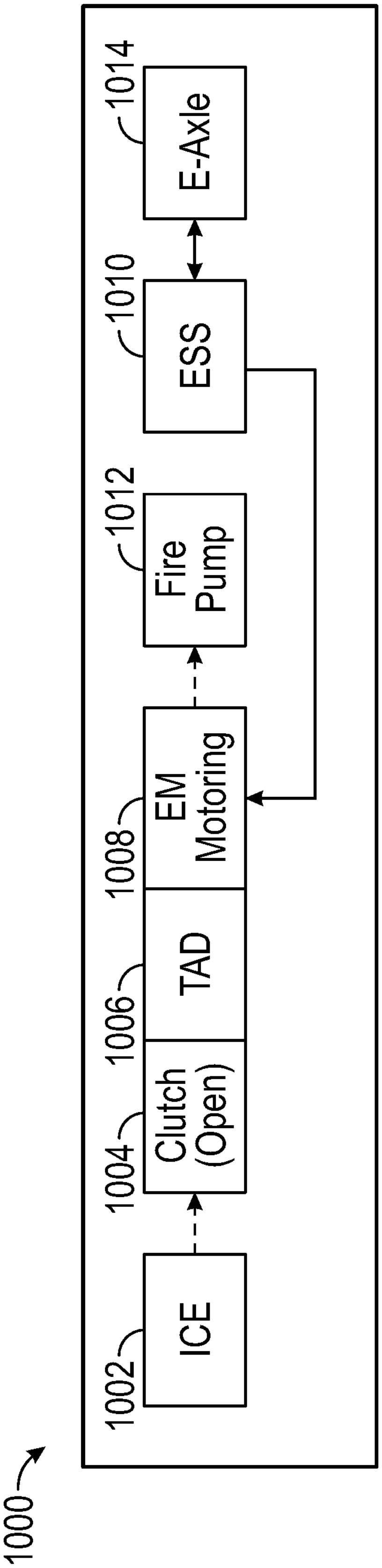
FIG. 31 is a schematic diagram of an E-axle driveline in a first mode, according to an exemplary embodiment.
Figure 32:
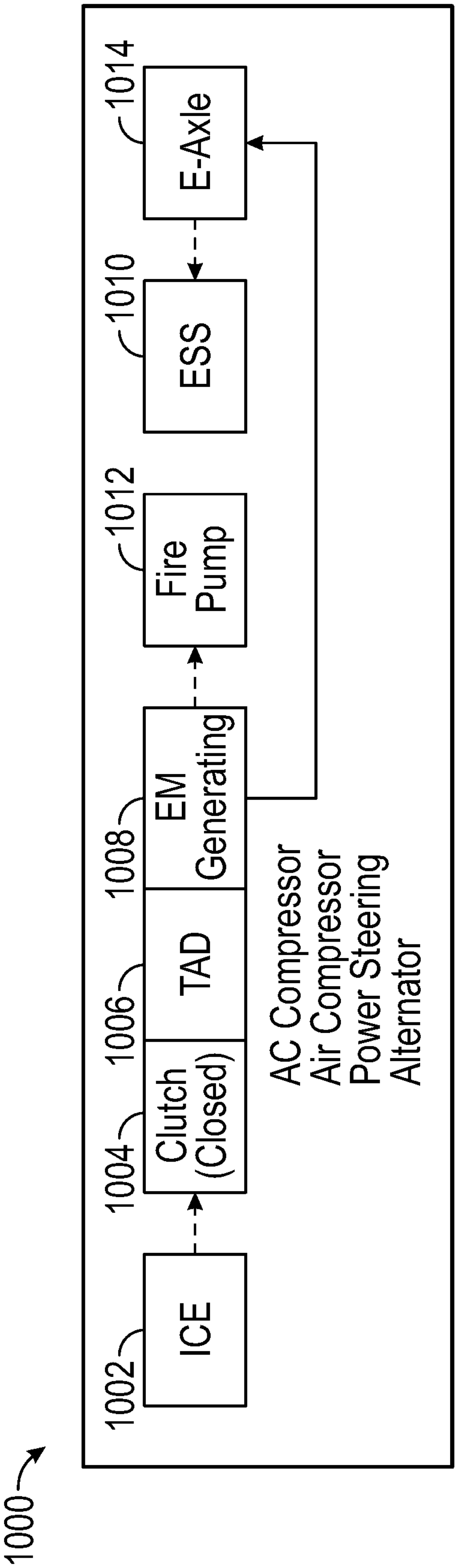
FIG. 32 is a schematic diagram of the E-axle driveline of FIG. 31 in a second mode, according to an exemplary embodiment.
Figure 33:
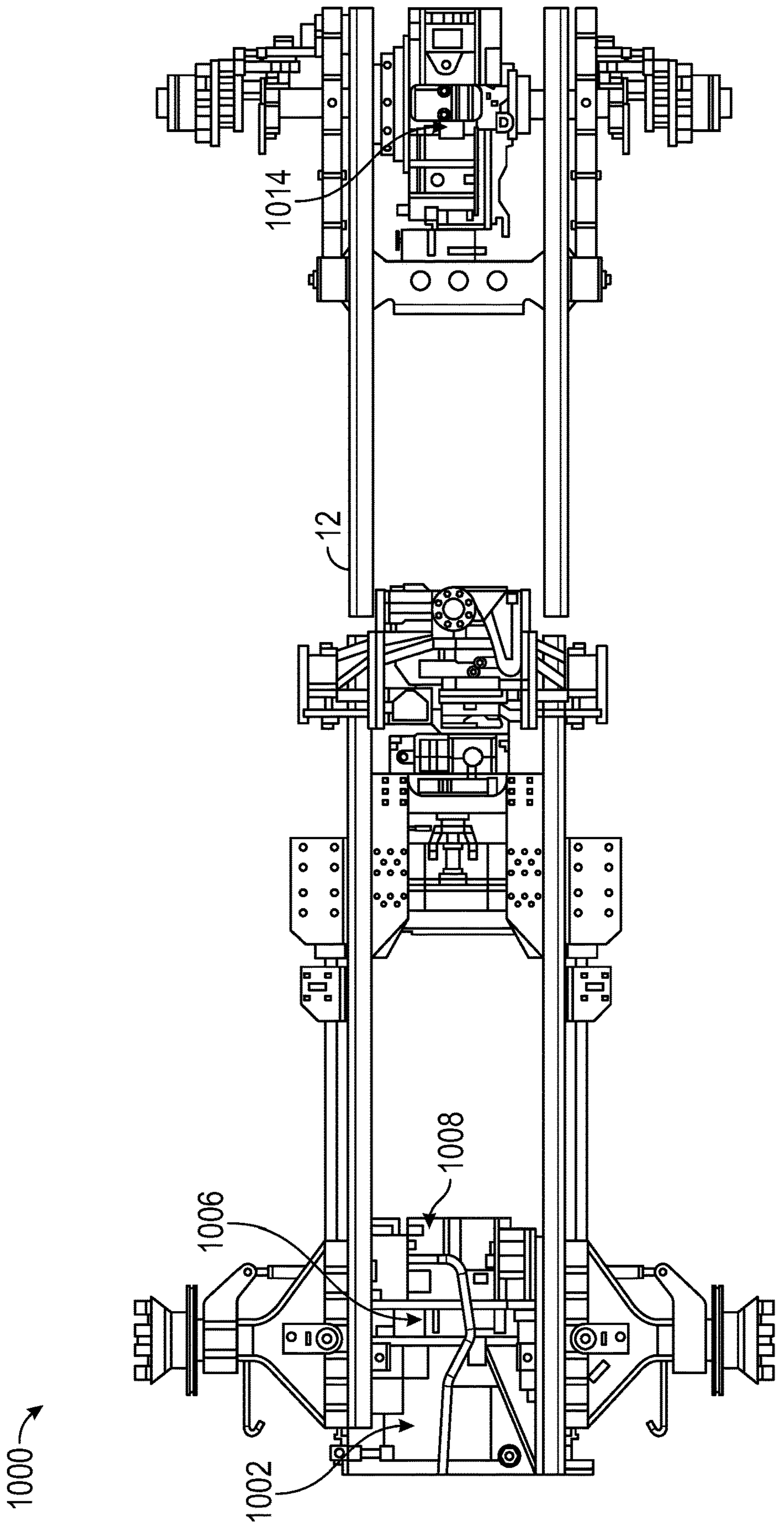
FIG. 33 is a top view of the E-axle driveline of FIG. 31 implemented in the fire fighting vehicle of FIG. 1, according to an exemplary embodiment.

Referring to FIGS. 31-33, an E-axle driveline 1000 includes an internal combustion engine ("ICE") 1002, a TAD 1006 including a clutch 1004, an electric motor 1008, a fire pump 1012, an ESS 1010, and an E-axle 1014, according to an exemplary embodiment. The ICE 1002 may be the same as or similar to the engine 202 as described in greater detail above. The clutch 1004 and the TAD 1006 may be the same as or similar to the TAD 400 as described in greater detail above. The fire pump 1012 may be the same as or similar to the pump 604 as described in greater detail above. The ESS 1010 may be the same as or similar to the ESS 700 as described in greater detail above. The E-axle driveline 1000 is transitionable between an electric vehicle (EV) mode (shown in FIG. 31) and an ICE mode (shown in FIG. 32). The E-axle 1014 may be between a 200 to a 400 kilowatt (kW) E-axle. In some embodiments, the E-axle 1014 is a Meritor or an Allison E-axle. For example, the E-axle 1014 may be an Allison AXE100D E-axle (e.g., a 310 kW E-axle). In some embodiments, the electric motor 1008 is an Avid AF240 electric motor.

Referring particularly to FIG. 31, the E-axle driveline 1000 is shown in the EV mode, according to an exemplary embodiment. The E-axle driveline 1000 can be transitioned into the EV mode by transitioning the clutch 1004 into an open position or mode (e.g., a disengaged mode). When the E-axle driveline 1000 is in the EV mode, the ESS 1010 is configured to provide electrical power to the electric motor 1008. The electric motor 1008 consumes the electrical energy and can drive the fire pump 1012 when the E-axle driveline 1000 is in the EV mode. The electric motor 1008 can also drive one or more accessories (e.g., through a power take-off) such as an AC compressor, an air compressor, a power steering system, an alternator, etc. When the E-axle driveline 1000 is in the EV mode, the E-axle 1014 receives electrical energy from the ESS 1010 and uses the electrical energy to drive the wheels 18 of the vehicle 10 (e.g., for transportation). In this way, the vehicle 10 can operate using electrical energy for transportation, accessories, the fire pump 1012, etc.

Referring particularly to FIG. 32, the E-axle driveline 1000 is shown in the ICE mode, according to an exemplary embodiment. The clutch 1004 can be transitioned into the closed mode or position (e.g., an engaged mode or position) to transition the E-axle driveline 1000 into the ICE mode. When the E-axle driveline 1000 is in the ICE mode, the ICE 1002 is configured to drive the electric motor 1008 through the clutch 1004 and the TAD 1006 so that the electric motor 1008 generates electrical energy. The ICE 1002 can also drive one or more accessories of the vehicle 10 (e.g., the air conditioner compressor, the air compressor, the power steering system, the alternator, etc.) through a power take-off. The E-axle 1014 can use electrical energy generated by the electric motor 1008 to drive the wheels 18 of the vehicle 10. The E-axle 1014 can also provide electrical energy to the ESS 1010 for storage and later use (e.g., for use when the E-axle driveline 1000 is transitioned into the EV mode shown in FIG. 31).

Advantageously, the E-axle driveline 1000 as shown in FIGS. 31-33 can have a reduced size or a smaller footprint compared to other drivelines. In some embodiments, the E-axle driveline 1000 facilitates in-frame battery packaging of various battery cells of the ESS 1010. The E-axle driveline 1000 can also facilitate pump and roll operations.

Referring to FIG. 34, a table 1020 provides various possible embodiments of the E-axle driveline 1000 and corresponding properties resulting from each possible embodiment. For example, the E-axle driveline 1000 can include an X12-500 Cummins engine for the ICE 1002, thereby providing an 82% startability, a 49.7 mph speed on a 6% grade, a 74.9 mph speed on a 0.25% grade, a 5.9% grade at 50 mph, a 18.6% grade at 20 mph, and a 9.6 second time to accelerate from 0 mph to 35 mph for the vehicle 10. In another exemplary embodiment, the E-axle driveline 1000 can include an L9-450 Cummins engine for the ICE 1002, which results in the vehicle 10 having a 44% startability, a 43.8 mph speed on a 6% grade, a 70.4 mph speed on a 0.25% grade, a 5.1% grade at 50 mph, a 14% grade at 20 mph, and an 11.1 second acceleration time from 0 to 35 mph. In another exemplary embodiment, the E-axle driveline 1000 includes an AXE100D 310 kW 550 volt continuous E-axle, an AXE100D 310 kW 550 volt peak E-axle, an AXE100D continuous E-axle, or an AXE100D peak E-axle having the startability, speed on a 6% grade, speed on a 0.25% grade, % grade at 50 mph, % grade at 20 mph, and 0-35 mph acceleration time as shown in table 1120.

Figure 35:
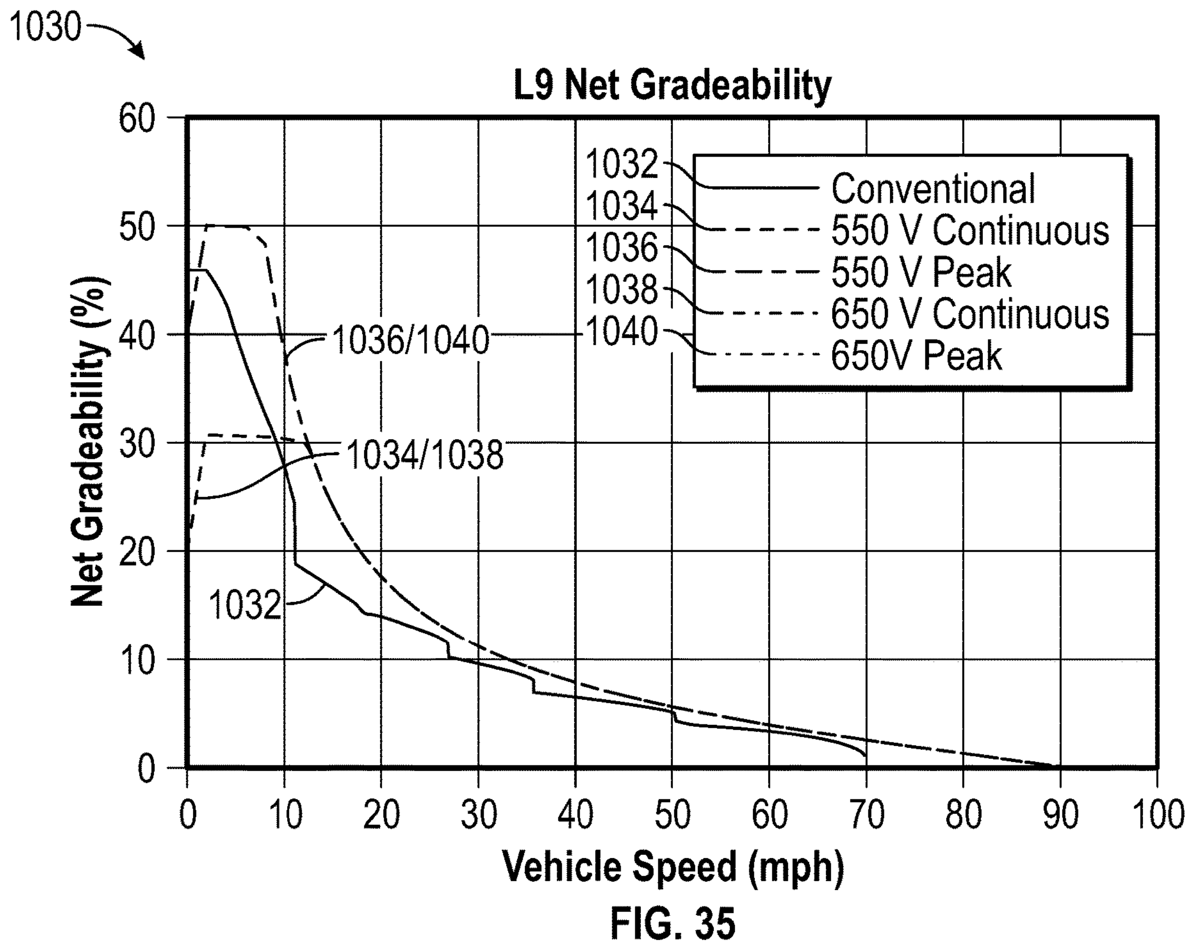
FIG. 35 is a graph showing grade versus vehicle speed for the E-axle driveline of FIGS. 31-33, according to an exemplary embodiment.

Referring to FIG. 35, a graph 1030 of net gradeability (in %) versus vehicle speed (in mph) is shown for a conventional axle (series 1032), the E-axle driveline 1000 with a 550 volt continuous E-axle (series 1034), the E-axle driveline 1000 with a 550 volt peak E-axle (series 1036), the E-axle driveline 1000 with a 650 volt continuous E-axle (series 1038), and the E-axle driveline 1000 with a 650 volt peak E-axle (series 1040).

Figures 36, 37:
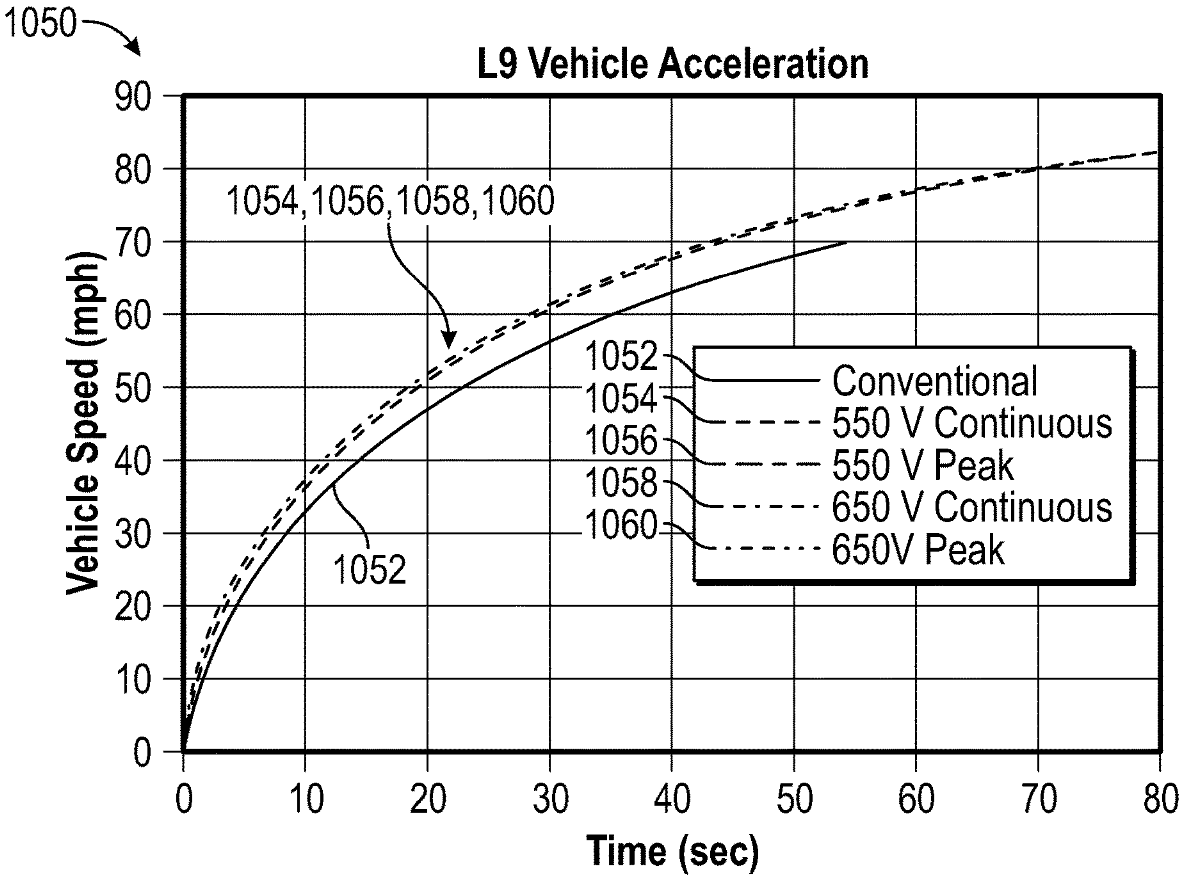
FIG. 36 is a graph showing vehicle speed versus time for the E-axle driveline of FIGS. 31-33, according to an exemplary embodiment.
FIG. 37 is a table providing performance properties of the fire fighting vehicle of FIG. 1 having the E-axle driveline of FIGS. 31-33, according to an exemplary embodiment.

Referring to FIG. 36, a graph 1050 of vehicle speed (in mph) versus time (in seconds) is shown for the conventional axle (series 1052), the E-axle driveline 1000 with a 550 volt continuous E-axle (series 1054), the E-axle driveline 1000 with a 550 volt peak E-axle (series 1056), the E-axle driveline 1000 with a 650 volt continuous E-axle (series 1058), and the E-axle driveline 1000 with a 650 volt peak E-axle (series 1060). As shown in FIG. 36, the E-axle driveline 1000 with the 550 peak or continuous E-axle have similar operating characteristics to the E-axle driveline 1000 with the 650 peak or continuous E-axle, and both configurations have improved speed versus time when compared to the conventional axle (series 1052).

Referring to FIG. 37, a table 1070 provides different startabilities (in %), acceleration times from 0 to 35 mph, and acceleration times from 0 to 65 mph for various implementations of the E-axle 1014 in the vehicle 10. For example, the E-axle 1014 may result in the vehicle 10 having a startability of 82%, with a 0 to 35 mph acceleration time of 9.6 seconds (e.g., under 10 seconds), and a 0 to 65 mph acceleration time of 36 seconds (e.g., under 40 seconds). The E-axle 1014 can also result in the vehicle 10 having a startability of 44%, with a 0 to 35 mph acceleration time of 11.1 seconds, and a 0 to 65 mph acceleration time of 44 seconds. The E-axle 1014 can also result in the vehicle 10 having a startability of 15%, with a 0 to 35 mph acceleration time of 18.9 seconds, and a 0 to 65 mph acceleration time of 92.7 seconds. The E-axle 1014 can also result in the vehicle 10 having a startability of 30%, with a 0 to 35 mph acceleration time of 11.2 seconds, and a 0 to 65 mph acceleration time of 53.5 seconds.

Figure 38:
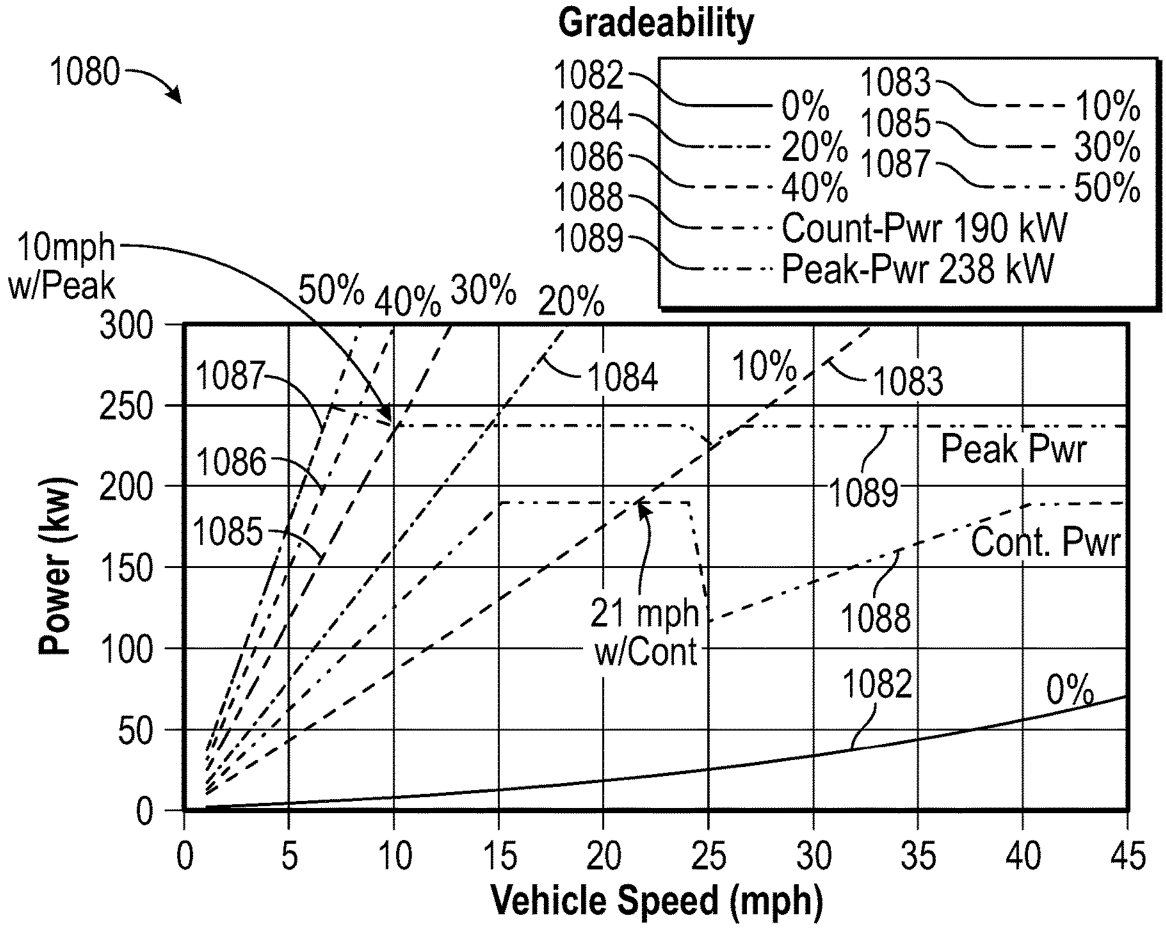
FIG. 38 is a graph showing power versus vehicle speed for different grades and power consumption of the E-axle driveline of FIGS. 31-33, according to an exemplary embodiment.

Referring to FIG. 38, a graph 1080 shows gradeability for power (in kW) versus vehicle speed (in mph) for the vehicle 10 with the E-axle driveline 1000, according to an exemplary embodiment. The graph 1080 incudes a series 1082 for 0% grade, a series 1083 for 10% grade, a series 1084 for 20% grade, a series 1085 for 30% grade, a series 1086 for 40% grade, a series 1087 for 50% grade, a series 1088 for continuous power consumption of the E-axle driveline 1000 (e.g., 190 kW), and a series 1089 for peak power consumption of the E-axle driveline 1000 (e.g., 238 kW). As shown in FIG. 38, the vehicle 10 implemented with the E-axle driveline 1000 can operate at continuous power consumption for a 10% grade at 21 mph, or at peak power consumption on a 30% grade at 10 mph.

Figure 39:
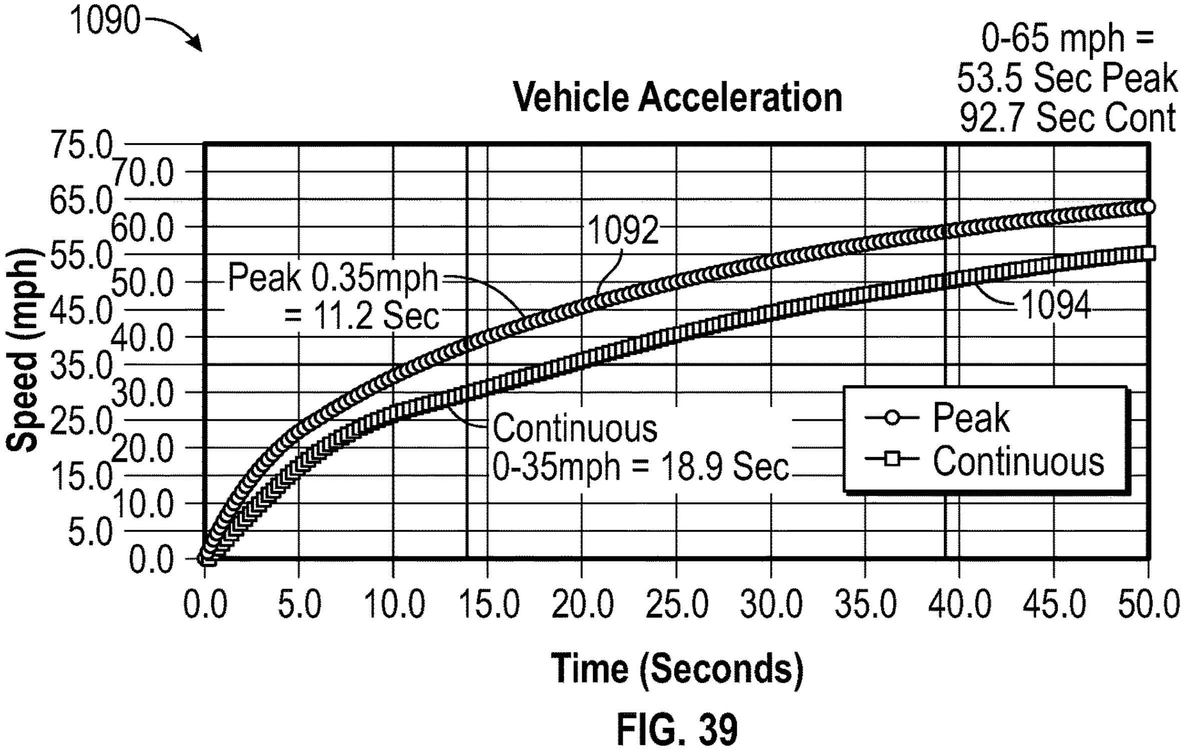
FIG. 39 is a graph showing vehicle speed versus time for the fire fighting vehicle of FIG. 1 having the E-axle driveline of FIGS. 31-33, according to an exemplary embodiment.

Referring to FIG. 39, a graph 1090 shows vehicle acceleration of the vehicle 10 with the E-axle driveline 1000 implemented, according to an exemplary embodiment. The graph 1090 shows speed (in mph) versus time (in seconds). The graph 1090 includes a series 1092 and a series 1094. The series 1092 shows vehicle speed with respect to time for peak power consumption. As shown in FIG. 39, the vehicle 10 can achieve an acceleration time from 0 to 65 seconds of 53.5 seconds when operating at peak electric energy consumption. The vehicle 10 can also achieve an acceleration time from 0 to 35 mph of 11.2 seconds when operating at peak electric energy consumption. The series 1094 shows vehicle speed with respect to time for continuous energy consumption of the E-axle driveline 1000. As shown in FIG. 39, the vehicle 10 can achieve an acceleration time from 0 to 65 mph of 92.7 seconds when operating at continuous energy consumption. The vehicle 10 can also achieve an acceleration time from 0 to 35 mph of 18.9 seconds when operating at continuous energy consumption.

Alternative 2—EV Transmission

Figure 40:
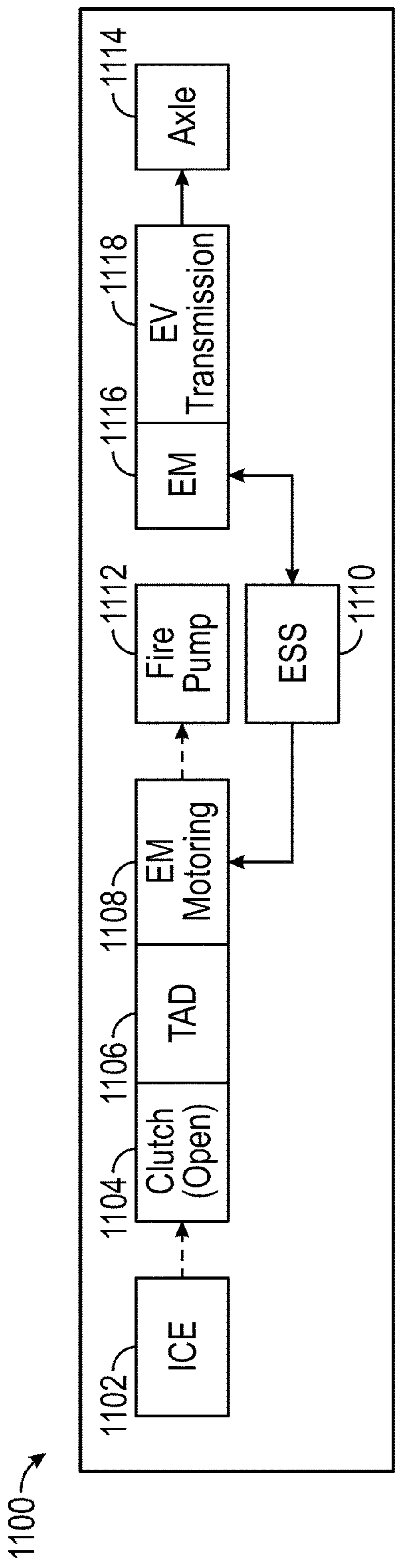
FIG. 40 is a schematic diagram of an EV transmission driveline in a first mode, according to an exemplary embodiment.
Figure 41:
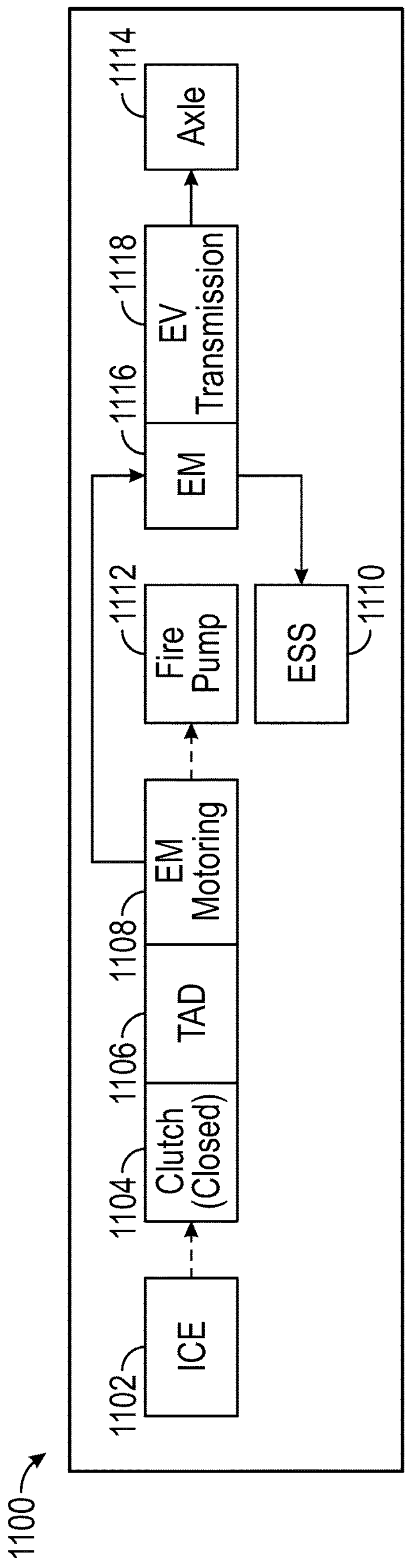
FIG. 41 is a schematic diagram of the EV transmission driveline of FIG. 40 in a second mode, according to an exemplary embodiment.
Figure 42:
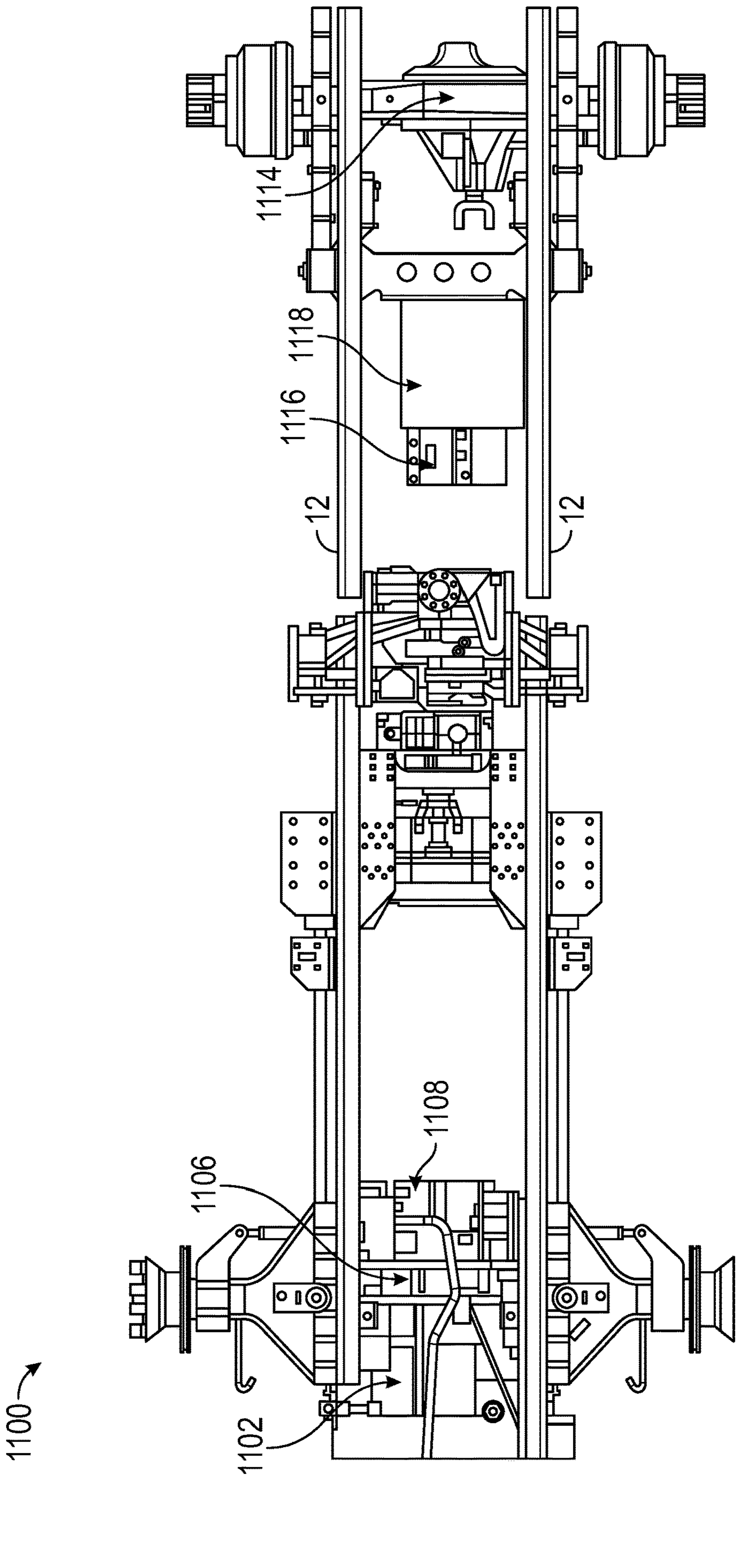
FIG. 42 is a top view of the EV transmission driveline of FIG. 40 implemented in the fire fighting vehicle of FIG. 1, according to an exemplary embodiment.

Referring to FIGS. 40-42, an EV transmission driveline 1100 includes an ICE 1102, a TAD 1106 including a clutch 1104, a first electric motor 1108, a fire pump 1112, an ESS 1110, a second electric motor 1116, an EV transmission 1118, and an axle 1114. The ICE 1102 can be the same as or similar to the engine 202 and/or the ICE 1002. The TAD 1106 can be the same as or similar to the TAD 400 and/or TAD 1006. The first electric motor 1108 can be the same as or similar to the electric motor 1008. The fire pump 1112 and the ESS 1110 can be the same as or similar to the pump 604 and/or the fire pump 1012 and the ESS 700 and/or the ESS 1010.

FIG. 38 shows the EV transmission driveline 1100 operating in an EV mode. FIG. 39 shows the EV transmission driveline 1100 operating in an ICE mode. The EV transmission driveline 1100 is transitionable between the EV mode and the ICE mode by operation of the clutch 1104. For example, the clutch 1104 can be transitioned into an open mode or configuration in order to transition the EV transmission driveline 1100 into the EV mode or into a closed mode or configured in order to transition the EV transmission driveline 1100 into the ICE mode. When the EV transmission driveline 1100 is in the EV mode, the first electric motor 1108 can draw electrical energy from the ESS 1110 and use the electrical energy to drive the fire pump 1112 (e.g., the pump system 600, a pump system for pumping water, etc.). When the EV transmission driveline 1100 is in the EV mode, the second electric motor 1116 can also draw energy from the ESS 1110 and use the energy to drive the EV transmission 1118. The EV transmission 1118 can receive mechanical energy output from the electric motor 1116 and output mechanical energy having a different speed or torque than the received mechanical input. The EV transmission 1118 provides a mechanical output to the axle 1114 for driving the tractive elements or the wheels 18 of the vehicle 10. In some embodiments, the second electric motor 1116 can be back-driven in an opposite direction (e.g., when the axle 1114 drives the electric motor 1116 through the EV transmission 1118 when the vehicle 10 rolls down a grade or due to regenerative braking) so that the second electric motor 1116 function as a generator, and generates electrical energy that is stored in the ESS 1110.

When the EV transmission driveline 1100 is in the ICE mode, the clutch 1104 is transitioned into the closed mode or configuration. The ICE 1102 is configured to drive the TAD 1106 through the closed clutch 1104 (e.g., while consuming fuel). The TAD 1106 is driven by the ICE 1102 and drives the first electric motor 1108. The first electric motor 1108 can drive the fire pump 1112 and/or can generate electrical energy (e.g., functioning as a generator) when driven by the TAD 1106 and the ICE 1102. The electrical energy generated by the first electric motor 1108 can be provided to the second electric motor 1116. The second electric motor 1116 can use some of the electrical energy to drive the EV transmission 1118 and the axle 1114. In some embodiments, some of the electrical energy generated by the first electric motor 1108 is provided to the ESS 1110 when the EV transmission driveline 1100 operates in the ICE mode to charge the ESS 1110 and store electrical energy for later use (e.g., when the EV transmission driveline 1100 is in the EV mode).

The EV transmission 1118 can be a four gear EV transmission that is configured to operate with the electric motor 1116 based on peak electrical energy or continuous electrical energy (e.g., different power thresholds). The EV transmission 1118 can be transitioned between different gears to provide a different gear ratio between the electric motor and the axle 1114.

Figures 43, 44:
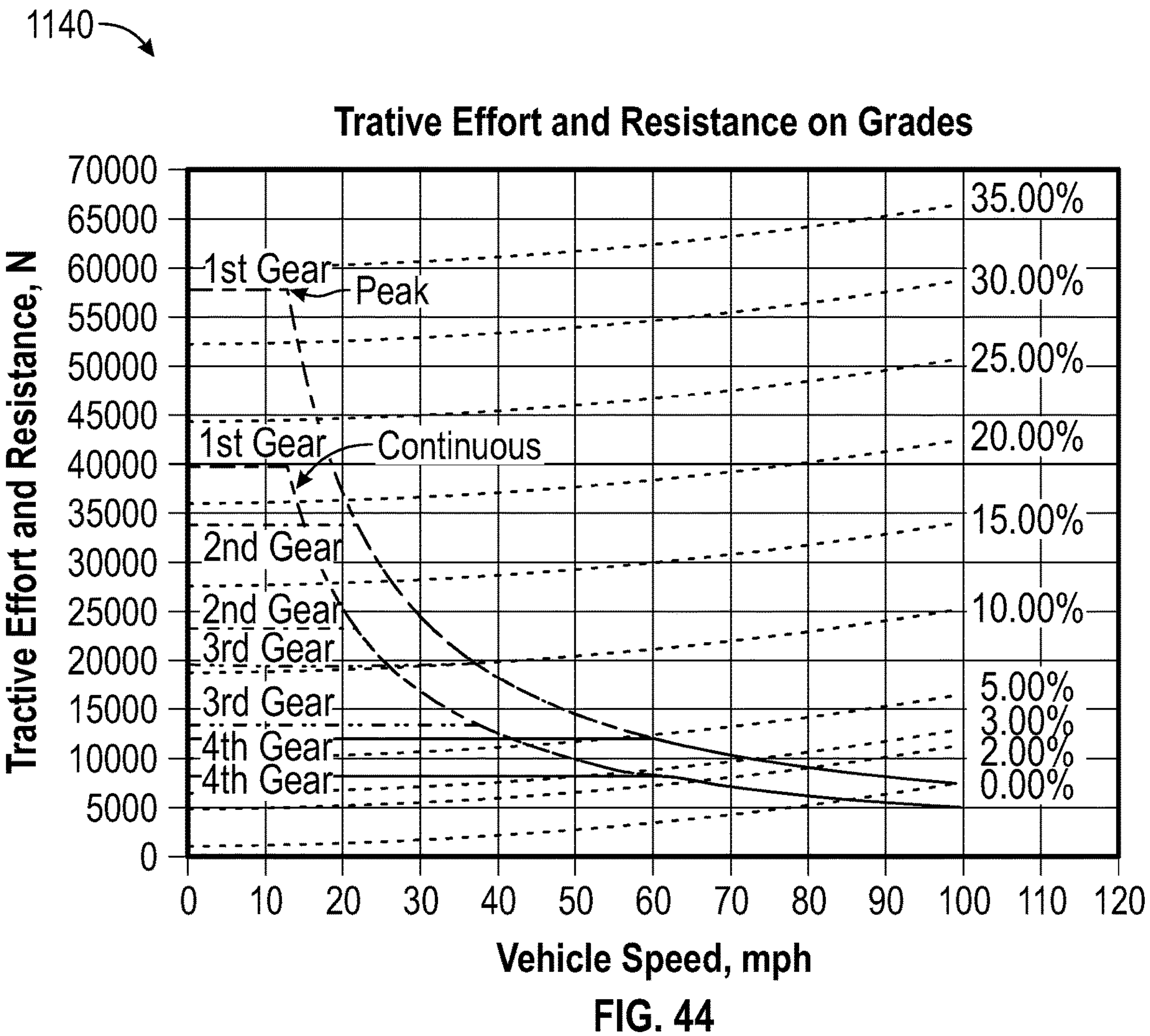
FIG. 43 is a table providing different properties of the fire fighting vehicle of FIG. 1 having the EV transmission driveline of FIGS. 40-42, according to an exemplary embodiment.
FIG. 44 is a graph showing tractive effort and resistance versus vehicle speed for different grades and gears of the EV transmission driveline of FIGS. 40-42, according to an exemplary embodiment.

Referring to FIG. 43, a table 1130 provides different properties of the vehicle 10 resulting from the EV transmission driveline 1100 for different implementations of the second electric motor 1116 and the EV transmission 1118. For example, in a first embodiment of the EV transmission driveline 1100, the vehicle 10 has a startability of 82% with a corresponding acceleration time from 0 to 35 mph of 9.6 seconds, and an acceleration time from 0 to 65 mph of 36 seconds (e.g., if the EV transmission driveline 1100 includes an Enforcer X12-500). In a second embodiment of the EV transmission driveline 1100, the vehicle 10 has a startability of 44% with an acceleration time from 0 to 35 mph of 11.1 seconds, and an acceleration time from 0 to 65 mph of 44 seconds (e.g., if the EV transmission driveline 1100 includes an Enforcer L9-450). In a third embodiment of the EV transmission driveline 1110, the vehicle 10 has a storability of 33% with an acceleration time from 0 to 35 mph of 13.5 seconds, and an acceleration time from 0 to 65 mph of 55 seconds (e.g., if the EV transmission driveline 1100 includes an Eaton transmission and 250 kW electric motor).

Figure 45:
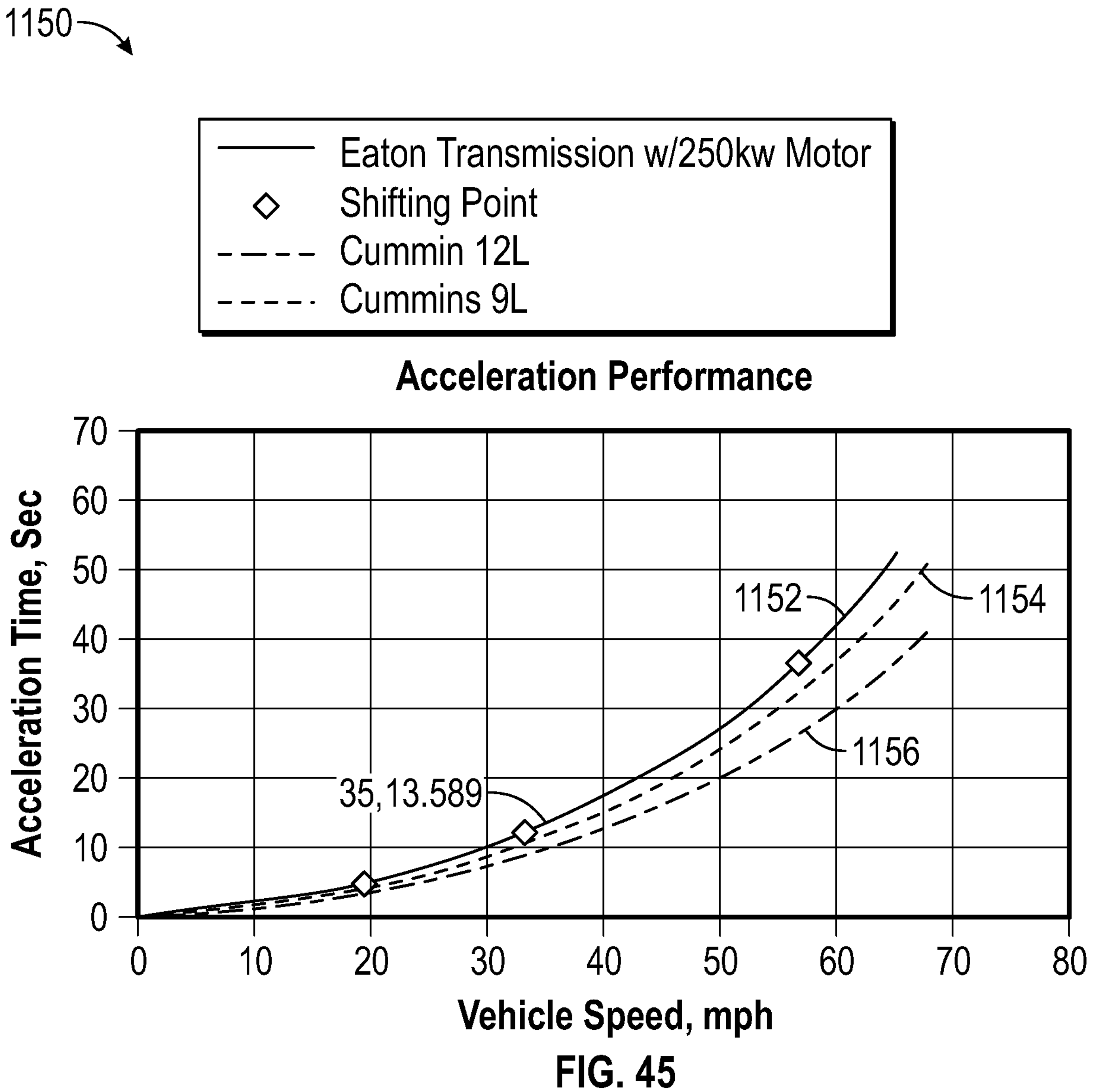
FIG. 45 is a graph showing acceleration time versus vehicle speed for the fire fighting vehicle of FIG. 1 having the EV transmission driveline of FIGS. 40-42, according to an exemplary embodiment.

Referring to FIGS. 44 and 45, a graph 1140 and a graph 1150 show estimated performance for the vehicle 10 based on a notional motor curve. Graph 1140 shows tractive effort and resistance (N, the Y-axis) with respect to vehicle speed (in mph, the X-axis). Graph 1140 shows the tractive effort and resistance versus vehicle speed for different grades for operation in a first gear, a second gear, a third gear, and a fourth gear for both peak power consumption and continuous (or nominal) power consumption.

Graph 1150 shows acceleration time in seconds (the Y-axis) with respect to vehicle speed in mph (the X-axis). Graph 1150 includes a series 1152 illustrating acceleration time versus speed for an EV transmission (e.g., an Eaton transmission) with a 250 kW electric motor, and series 1154-1156 showing acceleration time versus speed for different internal combustion engines. As shown in FIG. 45, the acceleration time with respect to vehicle speed for series 1152 is comparable to series 1154 and series 1156.

Advantageously, the EV transmission driveline 1100 can retrofit existing electric motors with a 4 speed EV transmission. In some embodiments, the EV transmission driveline 1100 can use a non-powered (e.g., a non-electric) axle. For example, the axle 1114 may be the same as used on a driveline that is powered by an internal combustion engine only. Advantageously, the EV transmission driveline 1100 facilitates pump and roll as an option. The EV transmission driveline 1100 can also facilitate scalable performance.

Alternative 3—Integrated Generator/Motor

Figure 46:
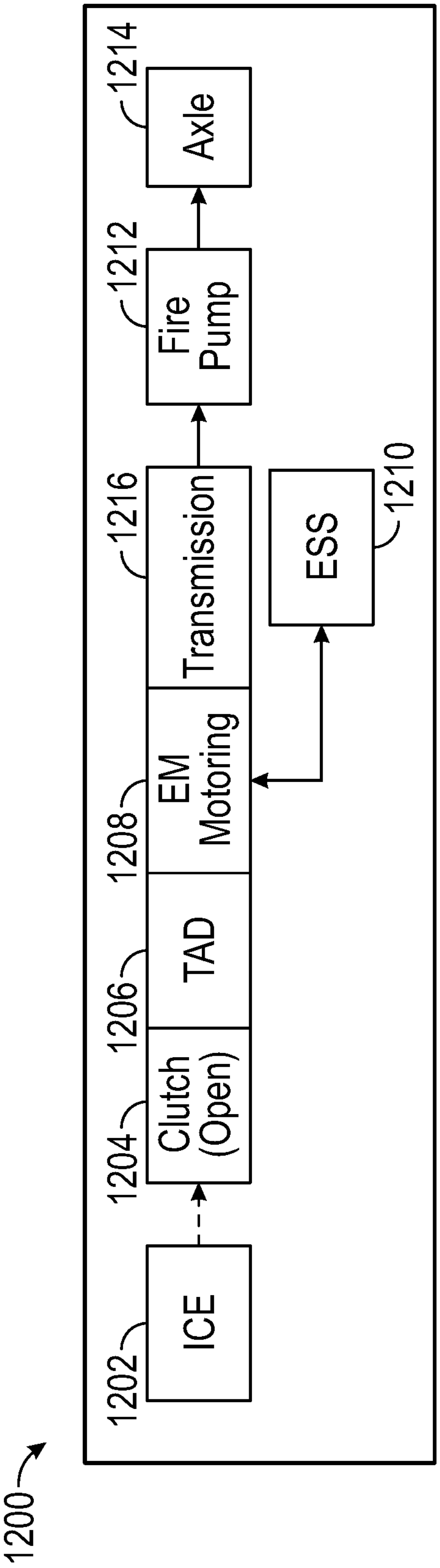
FIG. 46 is a schematic diagram of an integrated generator/motor driveline in a first mode, according to an exemplary embodiment.
Figure 47:
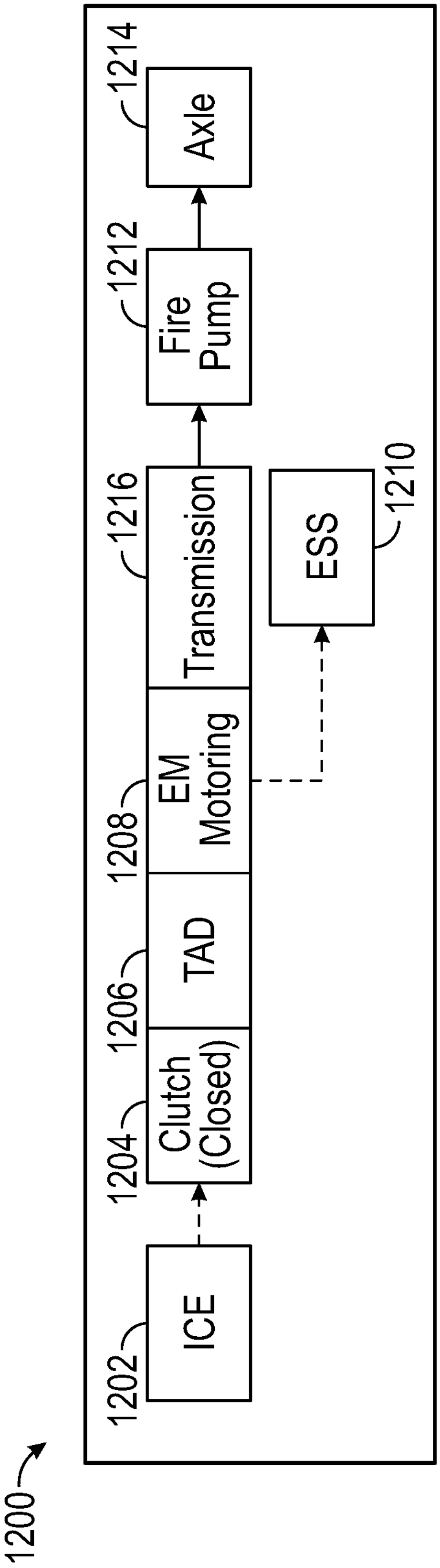
FIG. 47 is a schematic diagram of the integrated generator/motor driveline of FIG. 46 in a second mode, according to an exemplary embodiment.
Figure 48:
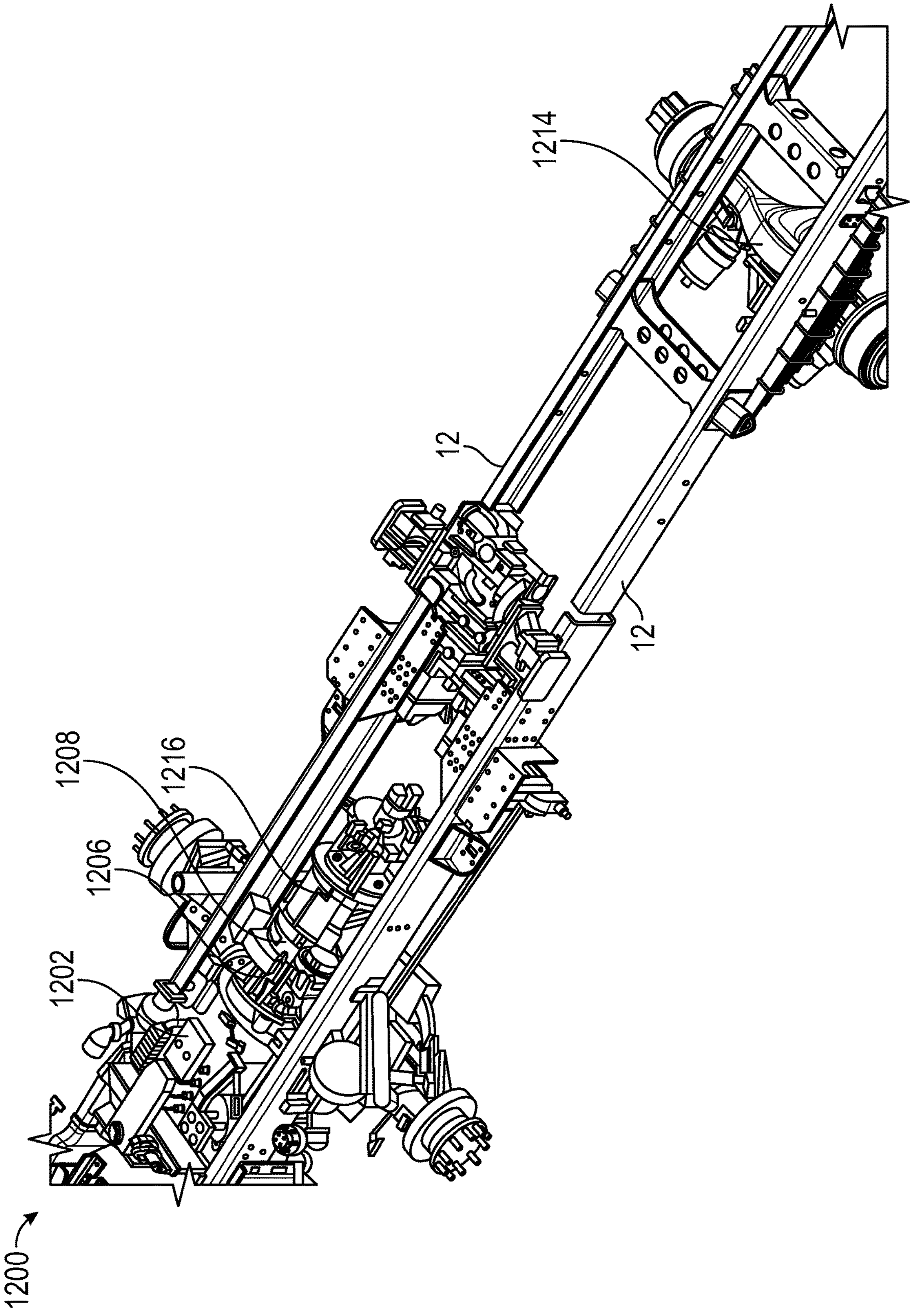
FIG. 48 is a top view of the integrated generator/motor driveline of FIG. 46 implemented in the fire fighting vehicle of FIG. 1, according to an exemplary embodiment.

Referring to FIGS. 46-48, an integrated generator/motor driveline 1200 includes an ICE 1202, a clutch 1204, a TAD 1206, an electric motor 1208, a transmission 1216, a fire pump 1212, an ESS 1210, and an axle 1214. The ICE 1202 may be the same as or similar to the engine 202, the ICE 1002, and/or the ICE 1102. The clutch 1204 can be the same as or similar to the clutch 300, the clutch 1004, and/or the clutch 1104. The TAD 1206 can be the same as or similar to the TAD 400, the TAD 1006, and/or the TAD 1106. The electric motor 1208 can be the same as or similar to the electric motor 1008 and/or the electric motor 1108. The fire pump 1212 can be the same as or similar to the pump 604, the fire pump 1012, and/or the fire pump 1112. The ESS 1210 and the axle 1214 can also be the same as or similar to the ESS 700, the ESS 1010, and/or ESS 1110 and the axle 1114.

FIG. 46 shows the integrated generator/motor driveline 1200 operating in an EV mode. FIG. 47 shows the integrated generator/motor driveline 1200 operating in an ICE mode. The integrated generator/motor driveline 1200 can be transitioned between the EV mode shown in FIG. 46 and the ICE mode shown in FIG. 47 by operation of the clutch 1204 (e.g., transitioning the clutch 1204 into an open position, state, or mode to transition the integrated generator/motor driveline 1200 into the EV mode and transitioning the clutch 1204 into a closed position, state, or mode to transition the integrated generator/motor driveline 1200 into the ICE mode).

When the integrated generator/motor driveline 1200 is transitioned into the EV mode, the clutch 1204 is transitioned into the open position. When the integrated generator/motor driveline 1200 operates in the EV mode, the axle 1214 is driven electrically (e.g., using an electric motor). The electric motor 1208 draws electrical energy from the ESS 1210 and drives the fire pump 1212 and the axle 1214 through the transmission 1216. The electric motor 1208 can be back-driven (e.g., as a form of regenerative braking, when the vehicle 10 rolls down a hill, etc.) through the axle 1214 and the transmission 1216. When the electric motor 1208 is back-driven, the electric motor 1208 generates electrical energy and provides the electrical energy to the ESS 1210 for storage and later use.

When the integrated generator/motor driveline 1200 is transitioned into the ICE mode, the clutch 1204 is transitioned into the closed position. The ICE 1202 can consume fuel and operate to drive the TAD 1206 through the clutch 1204. The TAD 1206 can drive the electric motor 1208 so that the electric motor 1208 operates to generate electricity. Electrical energy generated by the electric motor 1208 is provided to the ESS 1210 where the electrical energy can be stored and discharged at a later time (e.g., for use by the electric motor 1208 when operating in the EV mode). The TAD 1206 can also transfer mechanical energy to the transmission 1216. The transmission 1216 receives the mechanical energy from the TAD 1206 or the electric motor 1208 and provides mechanical energy to both the fire pump 1212 and the axle 1214 (e.g., at a reduced or increased speed, and/or a reduced or increased torque). The transmission 1216 can be transitionable between multiple different gears or modes to adjust a gear ratio across the transmission 1216. In some embodiments, the transmission 1216 is an Allison 3000 series transmission. Operating the integrated generator/motor driveline 1200 in the ICE mode facilitates driving the axle 1214 using energy generated by the ICE 1202 (rather than by the electric motor 1208 as when the integrated generator/motor driveline 1200 operates in the EV mode).

Advantageously, the integrated generator/motor driveline 1200 facilitates retaining transmission and direct drive in case of electrical failure (e.g., failure of the electric motor 1208). For example, even if the electric motor 1208 fails, the ICE 1202 can still be operated to drive the fire pump 1212 and the axle 1214. The integrated generator/motor driveline 1200 may also use a non-electric axle 1214 (e.g., a mechanical axle, a same axle as used on a vehicle that only uses an internal combustion engine to drive the axle, etc.).

As used herein, "low voltage" may refer to voltages of 24 volts ("V") or less (e.g., 5 V, 12 V, 24 V, etc.), whereas "high voltage" may refer to voltages greater than 24 V (e.g., 700 V, 480 V, 240 V, 220 V, 120 V, etc.).

As utilized herein with respect to numerical ranges, the terms "approximately," "about," "substantially," and similar terms generally mean +/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein.

The invention claimed is:

1. An electrified fire fighting vehicle comprising:
- a chassis;
- a cab coupled to the chassis;
- a body coupled to the chassis rearward of the cab;
- an aerial ladder; and
- an energy storage system positioned between the cab and the body, the energy storage system including:
  - a rack coupled to and extending upward from the chassis, the rack defining an interior chamber; and
  - a battery pack positioned within the interior chamber; and
- a ladder support positioned above the rack, the ladder support configured to engage with the aerial ladder when the aerial ladder is in a stowed orientation.

2. The electrified fire fighting vehicle of claim 1, wherein the ladder support is directly coupled to the rack such that the rack functions as a structural support for the aerial ladder.

3. The electrified fire fighting vehicle of claim 1, wherein the ladder support includes a plurality of rollers.

4. The electrified fire fighting vehicle of claim 1, wherein the energy storage system includes a power distribution system positioned within the interior chamber.

5. The electrified fire fighting vehicle of claim 4, wherein the battery pack is a first battery pack, wherein the energy storage system includes a second battery pack positioned within the interior chamber, and wherein the power distribution system is positioned between the first battery pack and the second battery pack.

6. The electrified fire fighting vehicle of claim 4, further comprising an electric motor coupled to the chassis, wherein the energy storage system includes:
- a first power cable running from the battery pack to the power distribution system, the first power cable configured to provide direct current power from the battery pack to the power distribution system; and
- a second power cable running from the power distribution system to the electric motor, the second power cable configured to provide alternating current power from the power distribution system to the electric motor, wherein the second power cable extends out of the rack to the electric motor.

7. The electrified fire fighting vehicle of claim 6, wherein the second power cable extends out of the rack proximate a lower edge thereof.

8. The electrified fire fighting vehicle of claim 6, wherein the second power cable extends out of the rack between a pair of frame rails of the chassis to the electric motor without crossing over or under the pair of frame rails.

9. The electrified fire fighting vehicle of claim 7, wherein a length of an external portion of the second power cable positioned external to the rack is less than seventy-two inches.

10. The electrified fire fighting vehicle of claim 1, further comprising a torque box coupled to the chassis and the aerial ladder, wherein the battery pack is a first battery pack, further comprising a second battery pack positioned within the torque box.

11. The electrified fire fighting vehicle of claim 10, further comprising a water tank, wherein the second battery pack is positioned beneath the water tank.

12. The electrified fire fighting vehicle of claim 1, wherein the battery pack is a first battery pack, further comprising a second battery pack positioned beneath the cab and positioned at least partially between a pair of frame rails of the chassis.

13. An electrified fire fighting vehicle comprising:
- a chassis;
- a cab coupled to the chassis;
- a body coupled to the chassis rearward of the cab;
- an electric motor coupled to the chassis;
- a torque box coupled to the chassis;
- an aerial ladder coupled to the torque box; and
- an energy storage system positioned between the cab and the body, the energy storage system including:
  - a rack coupled to and extending upward from the chassis, the rack defining an interior chamber;
  - a battery pack positioned within the interior chamber;
  - a power distribution system positioned within the interior chamber, the power distribution system electrically coupled to the battery pack and the electric motor; and
  - a ladder support coupled to an upper end of the rack, the ladder support positioned to engage with the aerial ladder when the aerial ladder is in a stowed orientation, the ladder support including a plurality of rollers.

14. The electrified fire fighting vehicle of claim 13, wherein a power cable extends from the power distribution system, out of the rack between a pair of frame rails of the chassis, and to the electric motor without crossing over or under the pair of frame rails.

15. The electrified fire fighting vehicle of claim 14, wherein a length of an external portion of the power cable positioned external to the rack is less than seventy-two inches.

16. The electrified fire fighting vehicle of claim 13, wherein the battery pack is a first battery pack, wherein the energy storage system includes a second battery pack positioned within the interior chamber, and wherein the power distribution system is positioned between the first battery pack and the second battery pack.

17. The electrified fire fighting vehicle of claim 13, wherein the battery pack is a first battery pack, further comprising a second battery pack positioned within the torque box.

18. An electrified fire fighting vehicle comprising:
- a chassis;
- a cab coupled to the chassis;
- a body coupled to the chassis rearward of the cab;
- an electric motor coupled to the chassis;
- a torque box coupled to the chassis;
- an aerial ladder coupled to the torque box;

an energy storage system positioned between the cab and the body, the energy storage system including:

a rack coupled to and extending upward from the chassis, the rack defining an interior chamber;

a first battery pack positioned within the interior chamber;

a second battery pack positioned within the interior chamber; and a power distribution system positioned within the interior chamber between the first battery pack and the second battery pack, the power distribution system electrically coupled to the first battery pack, the second battery pack, and the electric motor; and a ladder support positioned above the rack, the ladder support configured to engage with the aerial ladder when the aerial ladder is in a stowed orientation.

19. The electrified fire fighting vehicle of claim 18, wherein a power cable extends from the power distribution system, out of the rack between a pair of frame rails of the chassis, and to the electric motor without crossing over or under the pair of frame rails, and wherein a length of an external portion of the power cable positioned external to the rack is less than seventy-two inches.

* * * * *